United States Patent
Wakisawa et al.

(10) Patent No.: US 6,587,602 B2
(45) Date of Patent: Jul. 1, 2003

(54) RESOLUTION CONVERSION SYSTEM AND METHOD

(75) Inventors: Shinji Wakisawa, Ebina (JP); Naruhiko Kasai, Yokohama (JP); Hiroko Sato, Yokohama (JP); Youichi Watanabe, Chiba-ken (JP); Hiroyuki Koizumi, Tokyo (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 0 days.

(21) Appl. No.: 10/099,951

(22) Filed: Mar. 19, 2002

(65) Prior Publication Data

US 2002/0097921 A1 Jul. 25, 2002

Related U.S. Application Data

(63) Continuation of application No. 09/636,059, filed on Aug. 10, 2000, now Pat. No. 6,389,180, and a continuation-in-part of application No. 09/452,169, filed on Dec. 1, 1999, now Pat. No. 6,151,425, and a continuation-in-part of application No. 08/633,310, filed on Apr. 15, 1996, now Pat. No. 6,002,810.

(30) Foreign Application Priority Data

Apr. 14, 1995 (JP) .............................................. 7-89610
Apr. 14, 1995 (JP) .............................................. 7-89612

(51) Int. Cl.[7] .................................................. G06K 9/32
(52) U.S. Cl. ........................ 382/298; 382/237; 382/299; 382/300; 345/660; 345/670; 345/671; 348/561; 348/581; 358/445; 358/451; 358/525; 708/208
(58) Field of Search ................................. 382/237, 293, 382/298, 299, 300; 345/660, 667, 670, 671; 348/561, 581, 582, 704; 358/445, 451, 525; 708/208

(56) References Cited

U.S. PATENT DOCUMENTS

| | | | |
|---|---|---|---|
| 5,237,432 A | 8/1993 | Calarco et al. | 358/451 |
| 5,280,365 A | 1/1994 | Nannichi et al. | 358/445 |
| 5,282,057 A | 1/1994 | Mailloux et al. | 358/445 |
| 5,299,028 A | 3/1994 | Kwarta | 358/445 |
| 5,511,137 A | 4/1996 | Okada | 382/298 |
| 5,528,704 A | 6/1996 | Parker et al. | 382/237 |
| 5,579,418 A | 11/1996 | Williams et al. | 382/300 |
| 5,586,227 A | 12/1996 | Kawana et al. | 395/112 |
| 5,608,856 A | 3/1997 | McInally | 345/442 |
| 5,611,000 A | 3/1997 | Szeliski et al. | 382/294 |
| 5,654,734 A | 8/1997 | Orlen et al. | 345/98 |
| 5,754,710 A | 5/1998 | Sekine et al. | 382/300 |
| 5,841,430 A | 11/1998 | Kurikko | 345/213 |
| 6,213,653 B1 * | 4/2001 | Borg et al. | 345/606 |

FOREIGN PATENT DOCUMENTS

JP        61-24189        5/1994

* cited by examiner

*Primary Examiner*—Daniel G. Mariam
(74) *Attorney, Agent, or Firm*—Antonelli, Terry, Stout & Kraus, LLP

(57) ABSTRACT

There is disclosed a resolution conversion apparatus for converting an original digital image into a digital image having a different number of pixels in accordance with an instructed conversion magnification factor. In the apparatus, a determination circuit determines the number of pixels to be interpolated in each block of the original image and positions where they are interpolated in accordance with the conversion magnification factor. The block includes a predetermined number of pixels of the original image. A converted image generation circuit generates pixel data for the interpolation pixels at the positions where they are interpolated in accordance with a predetermined interpolation equation whose coefficients are determined with the positions and data values of the pixels in the block, and combines the pixel data for the digital original image and the generated pixel data to output a converted digital image. The interpolation equation includes spline functions and Bezier functions.

22 Claims, 36 Drawing Sheets

FIG. 5

HORIZONTAL INTERPOLATION PIXEL GENERATION TABLE

| HORIZONTAL MAGNIFICATION | INPUT PIXELS | OUTPUT PIXELS | NUMBER OF PIXELS TO BE GENERATED |
|---|---|---|---|
| 1 | 8 | 8 | 0 |
| 1.125 | 8 | 9 | 1 |
| 1.25 | 8 | 10 | 2 |
| 1.375 | 8 | 11 | 3 |
| 1.5 | 8 | 12 | 4 |
| 1.625 | 8 | 13 | 5 |
| 1.75 | 8 | 14 | 6 |
| 1.875 | 8 | 15 | 7 |
| 2 | 8 | 16 | 8 |
| 2.125 | 8 | 17 | 9 |
| 2.25 | 8 | 18 | 10 |
| 2.375 | 8 | 19 | 11 |
| 2.5 | 8 | 20 | 12 |
| 2.625 | 8 | 21 | 13 |
| 2.75 | 8 | 22 | 14 |
| 2.875 | 8 | 23 | 15 |
| 3 | 8 | 24 | 16 |
| 3.125 | 8 | 25 | 17 |
| 3.25 | 8 | 26 | 18 |
| 3.375 | 8 | 27 | 19 |
| 3.5 | 8 | 28 | 20 |
| 3.625 | 8 | 29 | 21 |
| 3.75 | 8 | 30 | 22 |
| 3.875 | 8 | 31 | 23 |
| 4 | 8 | 32 | 24 |
| 4.125 | 8 | 33 | 25 |
| 4.25 | 8 | 34 | 26 |

FIG. 6

VERTICAL INTERPOLATION PIXEL GENERATION TABLE

| VERTICAL MAGNIFICATION | INPUT LINES | OUTPUT LINES | NUMBER OF LINES TO BE GENERATED |
|---|---|---|---|
| 1 | 8 | 8 | 0 |
| 1.125 | 8 | 9 | 1 |
| 1.25 | 8 | 10 | 2 |
| 1.375 | 8 | 11 | 3 |
| 1.5 | 8 | 12 | 4 |
| 1.625 | 8 | 13 | 5 |
| 1.75 | 8 | 14 | 6 |
| 1.875 | 8 | 15 | 7 |
| 2 | 8 | 16 | 8 |
| 2.125 | 8 | 17 | 9 |
| 2.25 | 8 | 18 | 10 |
| 2.375 | 8 | 19 | 11 |
| 2.5 | 8 | 20 | 12 |
| 2.625 | 8 | 21 | 13 |
| 2.75 | 8 | 22 | 14 |
| 2.875 | 8 | 23 | 15 |
| 3 | 8 | 24 | 16 |
| 3.125 | 8 | 25 | 17 |
| 3.25 | 8 | 26 | 18 |
| 3.375 | 8 | 27 | 19 |
| 3.5 | 8 | 28 | 20 |
| 3.625 | 8 | 29 | 21 |
| 3.75 | 8 | 30 | 22 |
| 3.875 | 8 | 31 | 23 |
| 4 | 8 | 32 | 24 |
| 4.125 | 8 | 33 | 25 |
| 4.25 | 8 | 34 | 26 |

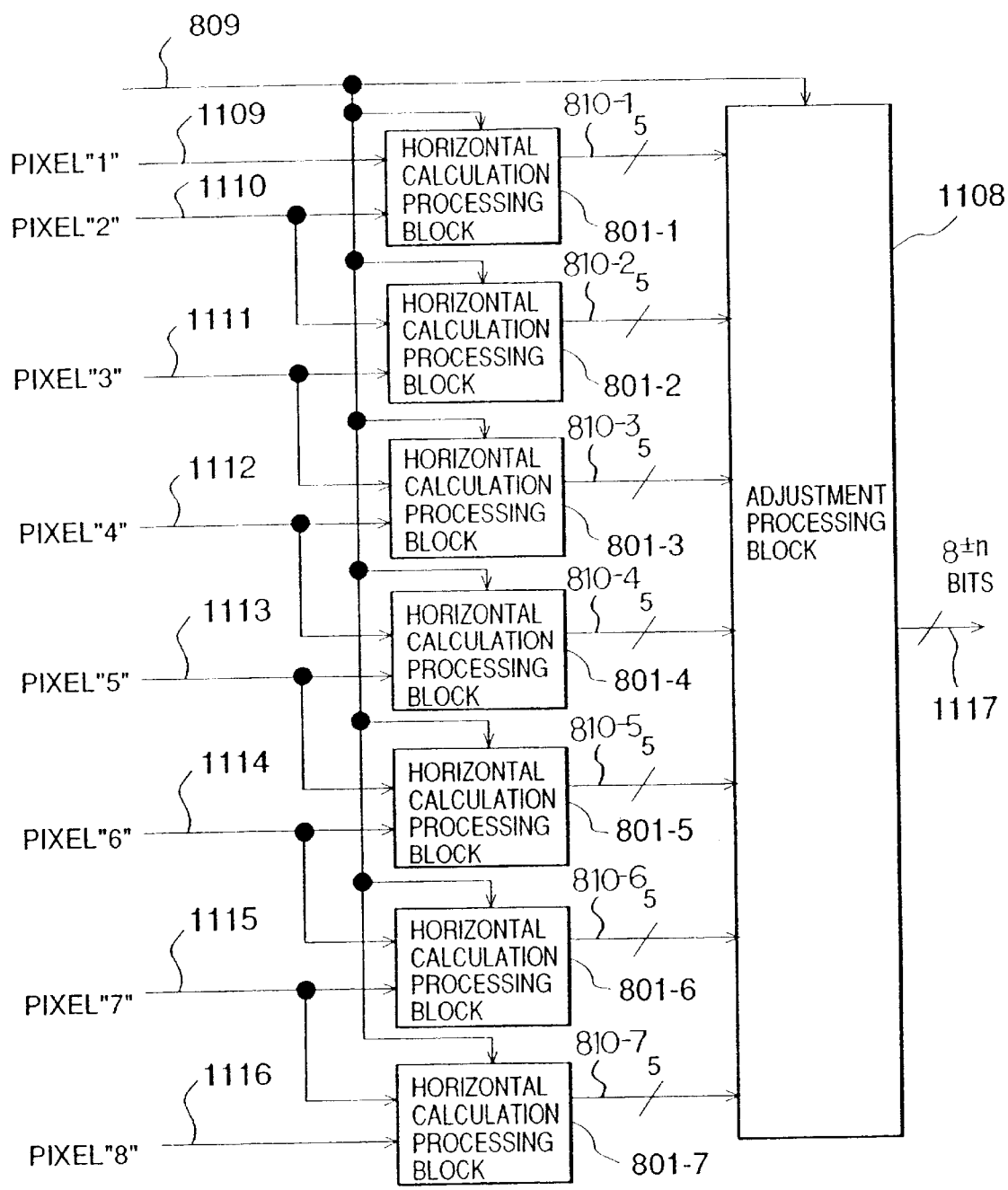

6TH LINE

FIG.32
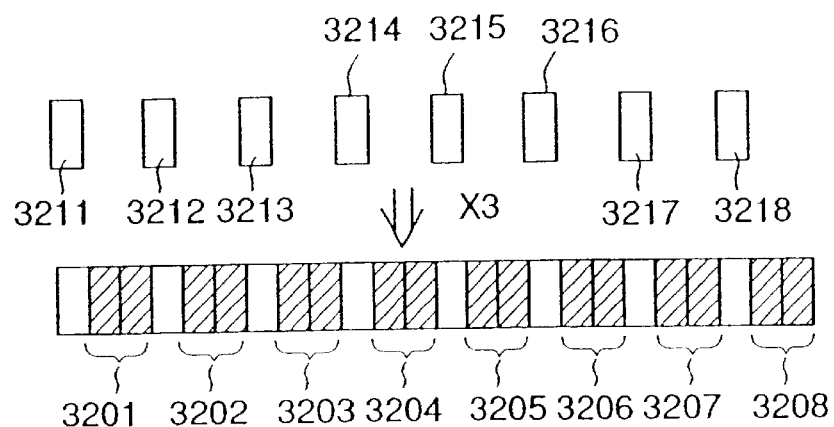
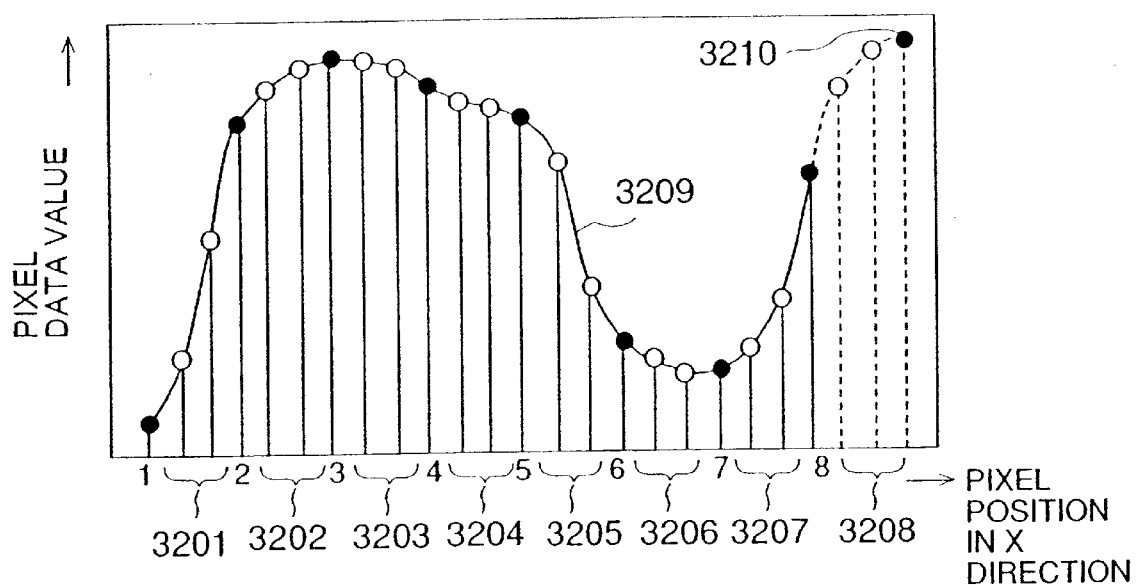

SPLINE FUNCTION OF mTH ORDER $$S(x) = P_m(x) + \sum_{i=1}^{u} C_i(x-x_i)^m$$

$P_m(x)$: POLINOMIAL OF mTH ORDER
$C_i$: CONSTANT

CUBIC BEZIER CURVE S(x)

$$S(x) = t^3 X_0 + 3t^2(1-t)X_1 + 3t(1-t)^2 X_2 + (1-t)^3 X_3$$
$$(0 \leq t \leq 1)$$

| 0 | 0 | 0 | 255 | 0 | 0 | 0 | 0 |
|---|---|---|---|---|---|---|---|
| 0 | 0 | 255 | 0 | 255 | 0 | 0 | 0 |
| 0 | 0 | 255 | 0 | 255 | 0 | 0 | 0 |
| 0 | 255 | 0 | 0 | 0 | 255 | 0 | 0 |
| 0 | 255 | 255 | 255 | 255 | 255 | 0 | 0 |
| 0 | 255 | 0 | 0 | 0 | 255 | 0 | 0 |
| 255 | 0 | 0 | 0 | 0 | 0 | 255 | 0 |
| 255 | 0 | 0 | 0 | 0 | 0 | 255 | 0 |

| 0 | 0 | 0 | 0 | 255 | 0 | 0 | 0 | 0 | 0 |
|---|---|---|---|---|---|---|---|---|---|
| 0 | 0 | 0 | 168 | 128 | 128 | 64 | 0 | 0 | 0 |
| 0 | 0 | 0 | 255 | 0 | 255 | 128 | 0 | 0 | 0 |
| 0 | 0 | 0 | 255 | 0 | 255 | 128 | 0 | 0 | 0 |
| 0 | 128 | 255 | 0 | 0 | 0 | 128 | 255 | 0 | 0 |
| 0 | 128 | 255 | 255 | 255 | 255 | 255 | 255 | 0 | 0 |
| 0 | 128 | 255 | 128 | 128 | 128 | 192 | 255 | 0 | 0 |
| 0 | 128 | 255 | 0 | 0 | 0 | 128 | 255 | 0 | 0 |
| 255 | 0 | 0 | 0 | 0 | 0 | 0 | 0 | 255 | 0 |
| 255 | 0 | 0 | 0 | 0 | 0 | 0 | 0 | 255 | 0 |

| 0 | 0 | 0 | 0 | 255 | 0 | 0 | 0 | 0 | 0 |
|---|---|---|---|---|---|---|---|---|---|
| 0 | 0 | 0 | 159 | 0 | 159 | 98 | 0 | 0 | 0 |
| 0 | 0 | 0 | 255 | 0 | 255 | 143 | 0 | 0 | 0 |
| 0 | 0 | 0 | 255 | 0 | 255 | 143 | 0 | 0 | 0 |
| 0 | 239 | 255 | 0 | 0 | 0 | 143 | 255 | 0 | 0 |
| 0 | 175 | 255 | 255 | 255 | 255 | 255 | 255 | 0 | 0 |
| 0 | 218 | 255 | 143 | 143 | 143 | 215 | 255 | 0 | 0 |
| 0 | 239 | 255 | 0 | 0 | 0 | 143 | 255 | 0 | 0 |
| 255 | 0 | 0 | 0 | 0 | 0 | 0 | 0 | 255 | 0 |
| 255 | 0 | 0 | 0 | 0 | 0 | 0 | 0 | 255 | 0 |

RESOLUTION CONVERSION SYSTEM AND METHOD

REFERENCE TO EARLIER FILED APPLICATIONS

This application is a continuation of the following earlier filed applications: Ser. No. 09/636,059, filed Aug. 10, 2000 (which is now U.S. Pat. No. 6,389,180 issued May 14, 2002) and; Ser. No. 09/452,169, filed Dec. 1, 1999 (now U.S. Pat. No. 6,151,425, issued Nov. 21, 2000); and Ser. No. 08/633,310, filed Apr. 15, 1996 (now U.S. Pat. No. 6,002,810, issued Dec. 14, 1999).

TECHNICAL BACKGROUND

This invention is related to a resolution conversion system for converting digital graphical information of still pictures and moving pictures including characters, line drawings, natural pictures and the like into another graphical information having a different number of pixels so as to display converted pictures on a display device. More specifically, the invention is related to a resolution conversion system and the method thereof which allows input image information of a particular number of pixels to be displayed on the display device or a screen in a window environment having a different resolution when displaying the multimedia moving pictures.

DESCRIPTION OF BACKGROUND ART

In the conversion of digital images, when the number of pixels of an original image is reduced, another image of a reduced scale from the original image can be obtained on the same display device. Accordingly, it is useful when displaying a reduced image in a window or the like to reduce the number of the pixels of the original image. In addition, it is possible to display images on a screen of a display device capable of lower resolution than that of the original image.

In order to reduce the number of pixels of the original image, the simplest way is to thin some pixels out. Alternatively, there is another way to reduce the number of the pixels of the original image by simply calculating the mean of luminance values of 3×3=9 pixels (e.g. if each pixel has 8 bits of luminance information, the luminance value falls within a 256 level gray scale) and by assigning it to a luminance of one pixel.

Furthermore, in Japanese Patent Application Laid-Open No. Hei 6-124189, there is disclosed a method for reducing the number of the pixels of the original image by taking averages of the image data of the original image in a horizontal direction and a vertical direction. In this method, lines are drawn using a line drawing algorithm known as a conventional art, and the horizontal line of the original image is shown as a set of a plural dots (y dots) of a horizontal component. The length of each horizontal line may be considered to be indicative of the number of input pixel data sets corresponding to one pixel data set after scaling-down to be stored in VRAM. Although the lengths of the horizontal lines may be different from each other or they may be identical to each other, the horizontal scaling-down is accomplished by taking the average of the pixel data for n dots. The vertical scaling-down can also be similarly accomplished.

On the contrary, if the number of pixels of the original image is increased, an enlarged image of the original image can be obtained on the same display device. Accordingly, it is useful for displaying an enlarged image in a window or the like to increase the number of the pixels of the original image. In addition, it is possible to display images on a screen of a display device capable of higher resolution than that of the original image.

In order to increase the number of the pixels of the original image, the simplest way is to surround a pixel in the original image, in horizontal and vertical directions, with pixels of the same gray scale level.

Alternatively, instead of simply placing the pixels having the same gray scale level, there is another way of increasing the number of pixels of the original image by calculating interpolation pixels whose gray scale level is positioned on a line extending between adjacent pixels of the original image between which the pixels are interpolated so as to use the calculated interpolation pixels.

Furthermore, a method for arbitrarily converting the resolution of the original image is shown in FIG. 1. In FIG. 1, 2001 designates original image data, 2002 designates a process for multiplying the original data by $L_1$ in a vertical direction and by $M_1$ in a horizontal direction, and 2003 designates the image data subjected to the $L_1 \times M_1$ multiplication processing. Reference numeral 2004 designates a process for multiplying the enlarged image data by $1/L_2$ in the vertical direction and by $1/M_2$ in the horizontal direction, and 2005 designates the image data subjected to the $(1/L_2) \times (1/M_2)$ multiplication processing, wherein $L_1$, $L_2$, $M_1$ and $M_2$ are positive integers. In the multiplication processes of $L_1 \times M_1$ and $(1/L_2) \times (1/M_2)$, if $L_1 > L_2$ and $M_1 > M_2$, then the image is enlarged, whereas if $L_1 < L_2$ and $M_1 < M_2$, then the image is reduced. In this way, the size of the image are arbitrarily modified in accordance with the combination of the enlarging and reducing processes.

If the same pixels as one pixel of the original image are placed in the horizontal and vertical directions so as to increase the number of pixels in accordance with the above mentioned method, the obtained image may include very noticeable aliasing, and therefore the quality of the obtained image may be degraded.

Instead of simply placing the same pixels, if the number of pixels are increased using the interpolation pixels whose gray scale levels are positioned on the line which links gray scale levels of the adjacent pixels of the original image, a very noticeable aliasing mosaic image is prevented from occurring. However, since high frequency components in a portion of the original image where a boundary between light and shade is clearly recognized may be reduced so as to smooth that portion, the obtained image becomes faded or blurred.

Furthermore, according to the method for arbitrarily converting the size of the image using the combination of the enlarging and reducing processes, since the reducing processing is executed after the completion of the enlarging processing, the processing is time consuming. In addition, according to this method, since the image is enlarged prior to the reducing processing, it is necessary to provide a memory for storing data of the enlarged image, which makes the hardware large.

SUMMARY OF THE INVENTION

The first object of the present invention is to prevent an image having noticeable mosaic aliasing so as to realize a high quality image, in resolution conversion increasing the number of pixels of an original image.

In addition, the second object of the present invention is to store a high frequency component of a contour portion of an original image where a boundary between light and shade is clearly recognized, so as to realize a high quality image, in resolution conversion increasing the number of pixels of the original image.

Furthermore, the third object of the present invention is to realize a high speed resolution conversion processing which can be used for a digital moving picture processing, in a resolution conversion increasing the number of pixels of an original image.

In addition, the fourth object of the present invention is to realize arbitrary resolution conversion processing in a minimum size of hardware, in resolution conversion increasing the number of pixels of an original image.

The above and the other objects of the present invention are accomplished by a resolution conversion apparatus for converting an original digital image into a digital image having a different number of pixels in accordance with an instructed conversion magnification factor comprising a determination circuit for determining, for each block including a predetermined number of pixels of the original digital image, the number of interpolation pixels and positions where the interpolation pixels are interpolated in the block of the original digital image, and a converted image generation circuit for generating pixel data for the interpolation pixels to be interpolated in each of the blocks in accordance with the number of interpolation pixels and the positions, so as to obtain a converted digital image based upon pixel data for the pixels in the original digital image and of the generated pixels to be interpolated, wherein the converted image generation circuit is arranged such that when a difference between two pixel values in the original digital image adjacent to each other at each of the positions where a pixel will be interpolated is equal to, or less than, a predetermined threshold, the values of the pixels to be interpolated are generated on the basis of the pixel values of the two pixels in the original image and a predetermined first interpolation equation, while when the difference is greater than the threshold, the values of the pixels to be interpolated are generated on the basis of the pixel data values of the two pixels in the original image and a predetermined second equation.

According to the present invention, in an area in an image including more high frequency components, where light and shade of the image is clearly visible, attention is paid to the fact that an absolute value d of a difference between values (for example, gray scale levels) of two pixel data sets is greater than a predetermined value. In a case where the absolute value d being the difference between image data of two pixels is less than the predetermined value, as in a case of an area in an image including more low frequency components, where light and shade of the image is not particularly discernible, a set of values for interpolation pixels are generated, which are positioned on the first interpolation equation (for example, a linear equation passing through values of pixel data for two pixels) which does not maintain, that is, which eliminates, the high frequency components of the image.

On the other hand, in an area in an image including more high frequency components, where light and shade of the image is clearly visible, when an absolute value d of the difference between two pixel values is greater than a predetermined value, a set of values for interpolation pixels are generated, which are positioned on the second interpolation equation (for example, a curve equation of a spline function passing through values of pixel data for two pixels) which maintains the high frequency components of the image, by comparing with the first interpolation equation.

According to this process, generation of an image having noticeable mosaic aliasing is prevented so that a high quality image can be realized. In addition, even in a case of converting a natural image whose contours are blurred, a high quality image can be realized, and in a case of converting letters or line drawings whose contours are clearly visible, a high quality image which has a clear boundary of light and shade can be obtained.

In a preferred aspect of the present invention, the converted image generation circuit includes a difference calculation circuit for obtaining a difference between values of two pixels, a pixel data calculation circuit for calculating pixel data values for pixels to be interpolated based on the first and second equations, and a selection circuit for selecting the pixel values calculated by the pixel data calculation circuit based on the first equation when the difference obtained by the difference calculation means is equal to, or less than, a predetermined threshold, and for selecting the pixel values calculated by the pixel data calculation circuit based on the second equation when the difference is greater than the threshold.

In another preferred aspect of the present invention, the converted image generation circuit includes a difference calculation circuit for obtaining a difference between values of two pixels, a selection circuit for generating a first selection signal indicating that the pixel values are to be generated based on the first equation when the difference obtained by the difference calculation circuit is equal to, or less than, a predetermined threshold, and for generating a second selection signal indicating that the pixel values are to be generated based on the second equation when the difference obtained by the difference calculation means is greater than the threshold, and a pixel data calculation circuit for calculating pixel values for pixels to be interpolated based on one of the first and second equations in accordance with one of the first and second selection signals.

In a further preferred aspect of the present invention, the determination circuit determines the conversion magnification factor as conversion magnification factors of a horizontal direction and a vertical direction, and the generation circuit includes a horizontal generation circuit for generating the pixel values of pixels to be interpolated in the horizontal direction and a vertical generation circuit for generating the pixel values of pixels to be interpolated in the vertical direction.

According to this aspect of the invention, since it is possible to execute resolution conversions in the horizontal and vertical directions, respectively, it allows the hardware necessary for resolution conversion processing to be reduced in size.

In another aspect of the present invention, the resolution conversion apparatus for converting an original digital image into a digital image having a different number of pixels in accordance with an instructed conversion magnification factor comprises a determination circuit for determining, for each block including a predetermined number of pixels of the original digital image, the number of interpolation pixels and positions where the interpolation pixels are interpolated in the block of the original digital image; and a generation circuit for generating, for the block of the original digital image, pixel values for the interpolation pixels to be interpolated in the block in accordance with the number of interpolation pixels and the positions where the pixels are interpolated, which have been determined by the determination circuit, so as to obtain the converted digital image, using pixel data values of the pixels in the original digital image and of the generated pixels to be interpolated as a basis.

Furthermore, in another further aspect of the present invention, an image information processing system comprises an image input circuit for receiving image data, a storage circuit for storing pixel data values inputted from the image input circuit, a magnification factor receiving circuit for receiving a conversion magnification factor used for converting the number of pixels constituting the pixel data values into another different number of pixels, an image processing circuit for reading out the image data stored in the storage circuit, and for converting the read out image data in accordance with the conversion magnification factor provided by the magnification factor receiving circuit, and an output circuit for outputting image data values converted by the image processing circuit, wherein the image processing circuit includes a determination circuit for determining, for each block including a predetermined number of pixels of the original digital image, the number of interpolation pixels and positions where the interpolation pixels are interpolated in the block of the original digital image; and a converted image generation circuit for generating pixel data values for the interpolation pixels to be interpolated in each of the block in accordance with the number of interpolation pixels and the positions where the pixels are interpolated so as to obtain the converted digital image, using pixel data values of the pixels in the original digital image and of the generated pixels to be interpolated as a basis, wherein the converted image generation circuit is arranged such that when a difference between values of two pixels of the original digital image adjacent to each other at each of the position where the pixels are interpolated is equal to, or less than, a predetermined threshold, the pixel data values of the pixels to be interpolated are generated using the values of the two pixels in the original image and a predetermined first interpolation equation as a basis, while when the difference is greater than the threshold, the pixel data values of the pixels to be interpolated are generated using the values of the two pixels in the original image and a second interpolation equation which is different from the first interpolation equation as a basis.

Furthermore, the objects of the present invention are accomplished by a resolution conversion apparatus for converting an original digital image into a digital image having a different number of pixels in accordance with an instructed conversion magnification factor comprising a determination circuit for determining, for each block including a predetermined number of pixels of the original image, positions where interpolation pixels are to be interpolated, in the block of the original digital image, in accordance with the conversion magnification factor, and a converted image generation circuit for generating pixel data value for the interpolation pixels to be interpolated in the determined positions in the block in accordance with a predetermined interpolation equation whose coefficient is determined with respect to positions of each pixel included in the block and values of the pixels for every block of the original digital image so as to obtain the converted digital image based upon pixel data values of the pixels in the original digital image and of the generated pixels to be interpolated.

According to the present invention, the determination circuit determines positions, in the block, of interpolation pixels to be interpolated in the block of the original digital image, for every block having a predetermined number of pixels of the original digital image. In this case, it is possible, for example, to store positions determined corresponding to respective conversion magnification factors in tables, and determine positions according to the conversion magnification factor by making reference to the tables. In addition, a pixel block unit may be a block of 8×8 pixels.

Furthermore, the converted image generation circuit generates pixel data for the interpolation pixels to be interpolated in the positions in the block, which were determined by the determination circuit, in accordance with a predetermined interpolation equation whose coefficient is determined with respect to positions of each pixel included in the block and values of the pixel data sets for every block of the original digital image so as to obtain the converted digital image in accordance with values of the pixels in the original digital image and of the generated pixels to be interpolated. The interpolation equation may be a spline function or a Bezier function. According to this, values of the interpolation pixels can be optimized.

In a preferred aspect of the present invention, the determination circuit determines at least one of the interpolation positions to be provided between a block where interpolation pixels are to be interpolated and a block adjacent thereto, and the generation circuit determines a coefficient of the interpolation equation based on positions and values of pixels adjacent to the block where the interpolation pixels are to be interpolated, so as to generate values of the pixels to be interpolated.

According to the aspect, it is possible to provide interpolation positions between a block where the pixels are interpolated and a block adjacent thereto and to determine a coefficient of an interpolation equation by further using positions and values of pixels in the adjacent block, in addition to positions and values of pixels in the block where the pixels are to be interpolated. Accordingly, the interpolation pixels can be generated at a portion where one block is adjacent to another, that is, outside of the blocks, so that it is possible to prevent the values of pixels from being discontinuous even at a position where blocks are adjacent to each other.

BRIEF DESCRIPTION OF THE DRAWINGS

FIG. 5 is an example of a horizontal interpolation pixel generation table indicative of a relationship between a horizontal magnification factor for performing a scaling calculation in a horizontal direction and the number of interpolation pixels to be generated in correspondence thereto;

FIG. 6 is an example of a vertical interpolation pixel generation table indicative of a relationship between a vertical magnification factor for performing a scaling calculation in a vertical direction and the number of interpolation pixels to be generated in correspondence thereto;

FIG. 12 is a block diagram showing a structure in which horizontal calculation processing blocks are connected in parallel;

FIG. 32 is an example showing a pattern of positions where the interpolation pixels are to be generated when enlarging 8 pixels by 3 times in the horizontal direction;

DESCRIPTION OF PREFERRED EMBODIMENT

First, referring to FIGS. 21 and 22, a general flow of the process according to the present invention, will be explained followed by the detailed features and flows thereof for solving the problem.

Figure 21:
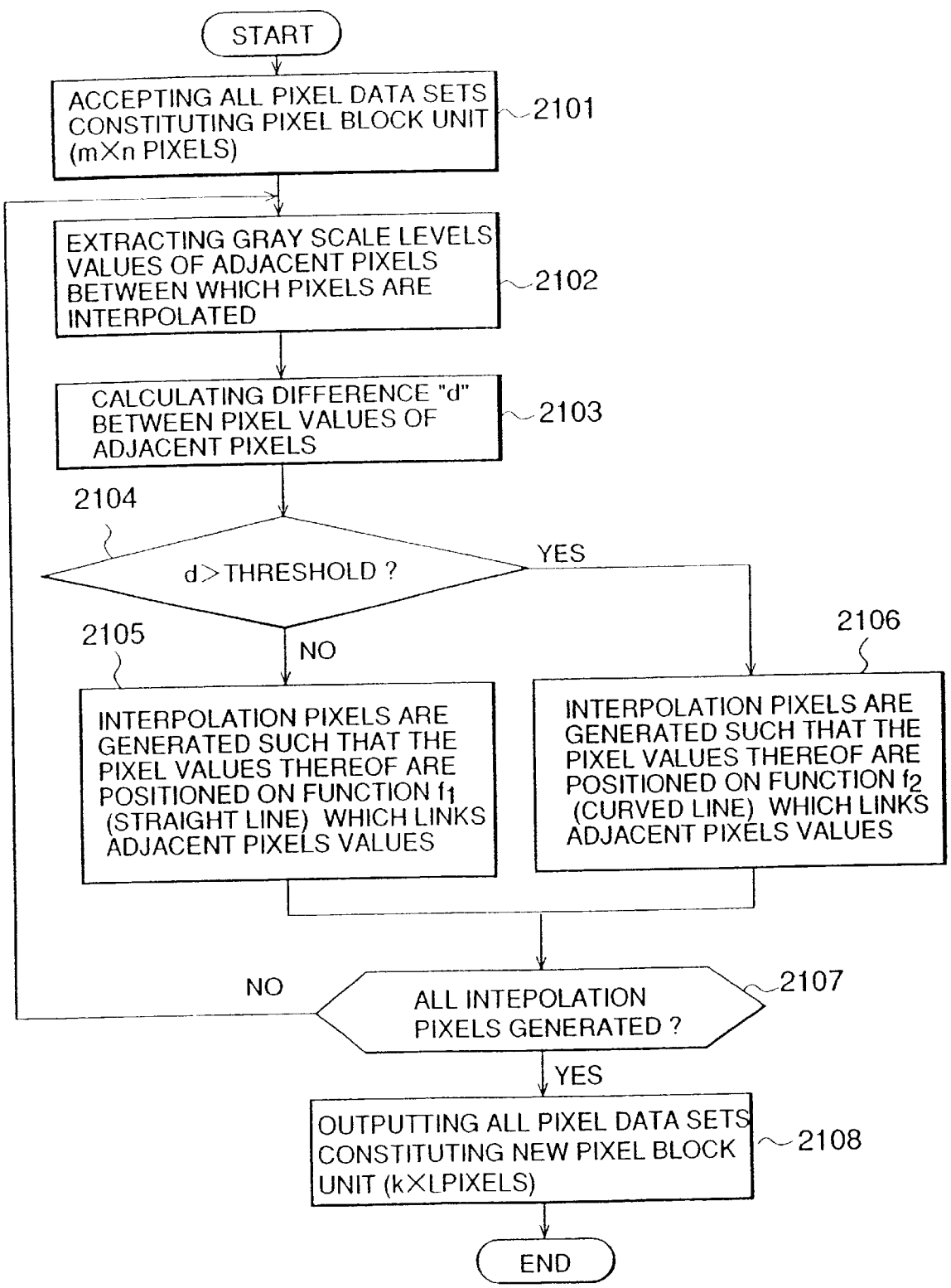
FIG. 21 is a flowchart showing an image scaling processing according to an embodiment of the present invention.

FIG. 21 is a flow chart of a process for converting an original digital image into another digital image having a different number of pixels. In this embodiment, the original image is converted into an enlarged image by generating pixels to be interpolated to increase the number of pixels. In this process, the number of pixels to be interpolated and the position where they are interpolated are determined in advance in accordance with a magnification factor for each pixel block unit having a predetermined number of pixels. The gray scale of the interpolation pixel is determined in accordance with difference in gray scale levels between pixels adjacent to a position where at least one pixel is placed. If the difference in gray scale levels between adjacent pixels is less than a predetermined difference threshold, a function f1 (e.g. a function of a straight line), which is a predetermined first interpolation equation, links the gray scale levels of adjacent pixels so as to generate interpolation pixels such that the gray scale levels thereof are positioned on the function f1. On the other hand, if the difference between the gray scale levels of the adjacent pixels is greater than the predetermined difference threshold, a function f2 (e.g. a function of a curved line), which is a predetermined second interpolation equation, links the gray scale levels of adjacent pixels so as to generate interpolation pixels such that the gray scale levels thereof are positioned on the function f2.

More specifically, an original image of one frame is separated into blocks of P×Q pixels, and pixel data sets included in one block are accepted (S 2101). The pixel data is representative of a gray scale level of a pixel. Next, in accordance with the magnification factor, the positions where pixels are to be interpolated are obtained, and, in accordance with the input pixel data, the gray scale levels of the pixels adjacent to the positions where the pixels are to be interpolated are extracted (S 2102) to calculate the difference "d" between the gray scale levels of the adjacent pixels (S 2103). The adjacent pixels are two pixels adjacent to each other in a horizontal or vertical direction in the original image. Next, whether or not the calculated difference "d" between the gray scale levels is greater than the predetermined threshold is determined (S 2104). If the difference "d" between the gray scale levels is equal to or less than the threshold, the interpolation pixels are generated such that the gray scale levels thereof are positioned on the function f1 (e.g. straight line) which links the gray scale levels of the adjacent pixels (S 2105). On the contrary, if the difference "d" between the gray scale levels is greater than the threshold, the interpolation pixels are generated such that the gray scale levels thereof are positioned on the function f2

(e.g. curved line) which links the gray scale levels of the adjacent pixels (S 2106). The function f1 or f2 is not limited to the fixed straight line or curved line. Whether or not all of the interpolation pixels have been generated is determined, and if some have not yet been generated, the process returns to S 2101 to generate the subsequent interpolation pixels. The interpolation of pixels is executed each for the horizontal and the vertical direction. After all of the interpolation pixels are generated, all pixel data for a new pixel block (k×L pixels) converted in accordance with the above mentioned process are output (S 2108).

Figure 22A:
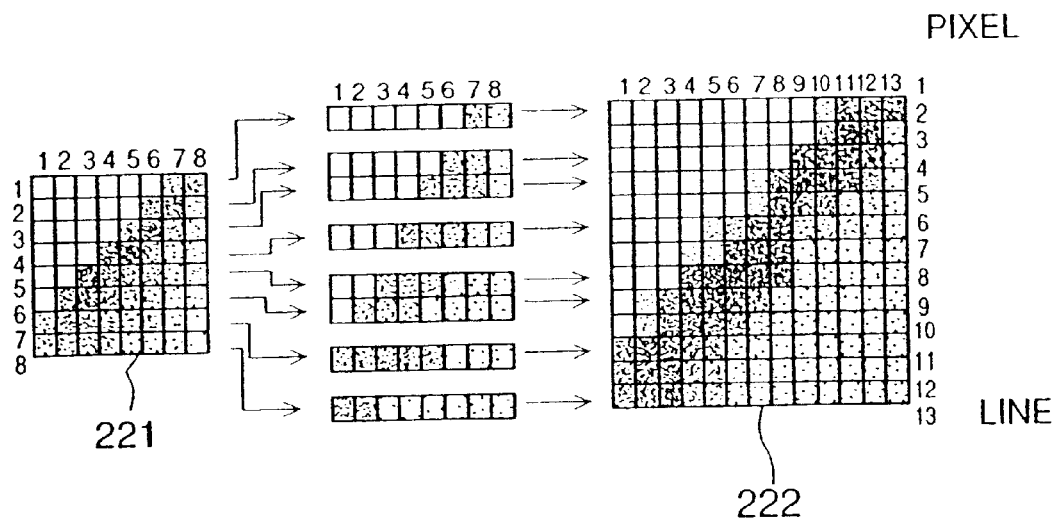
FIGS. 22A–22C are illustrations showing an image obtained through the image scaling processing.
Figure 22B:
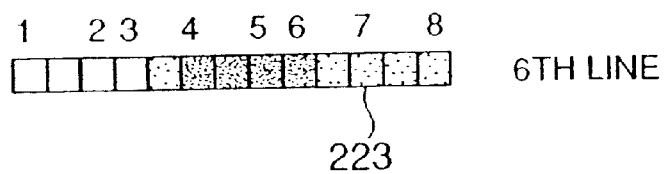
Figure 22C:
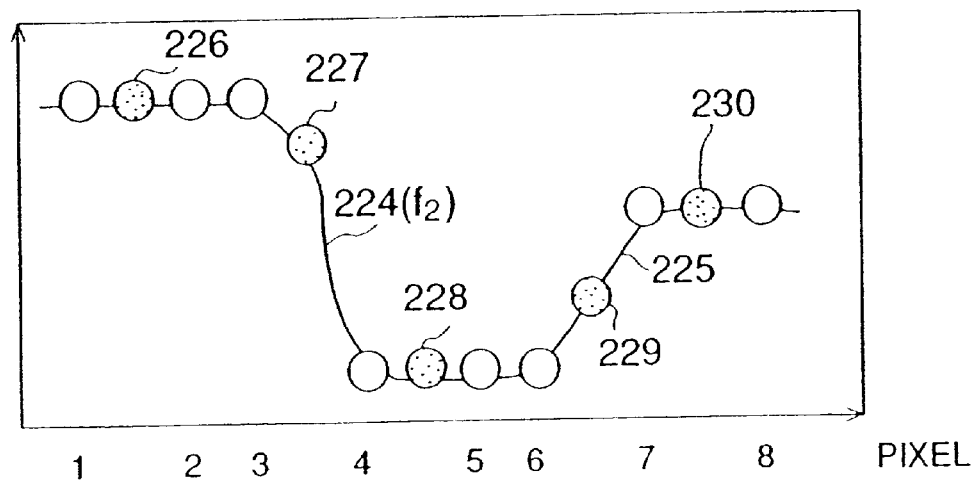

FIGS. 22A–22C show a flow of a process for converting the original digital image into another digital image having a different number of pixels as described with reference to FIG. 21, using pixels. FIG. 22A shows pixel block units before and after the conversion, FIG. 22B shows pixels in the sixth line after the conversion, and FIG. 22C is a graph indicative of the gray scale level of each pixel in the sixth line after the conversion.

Figure 8:
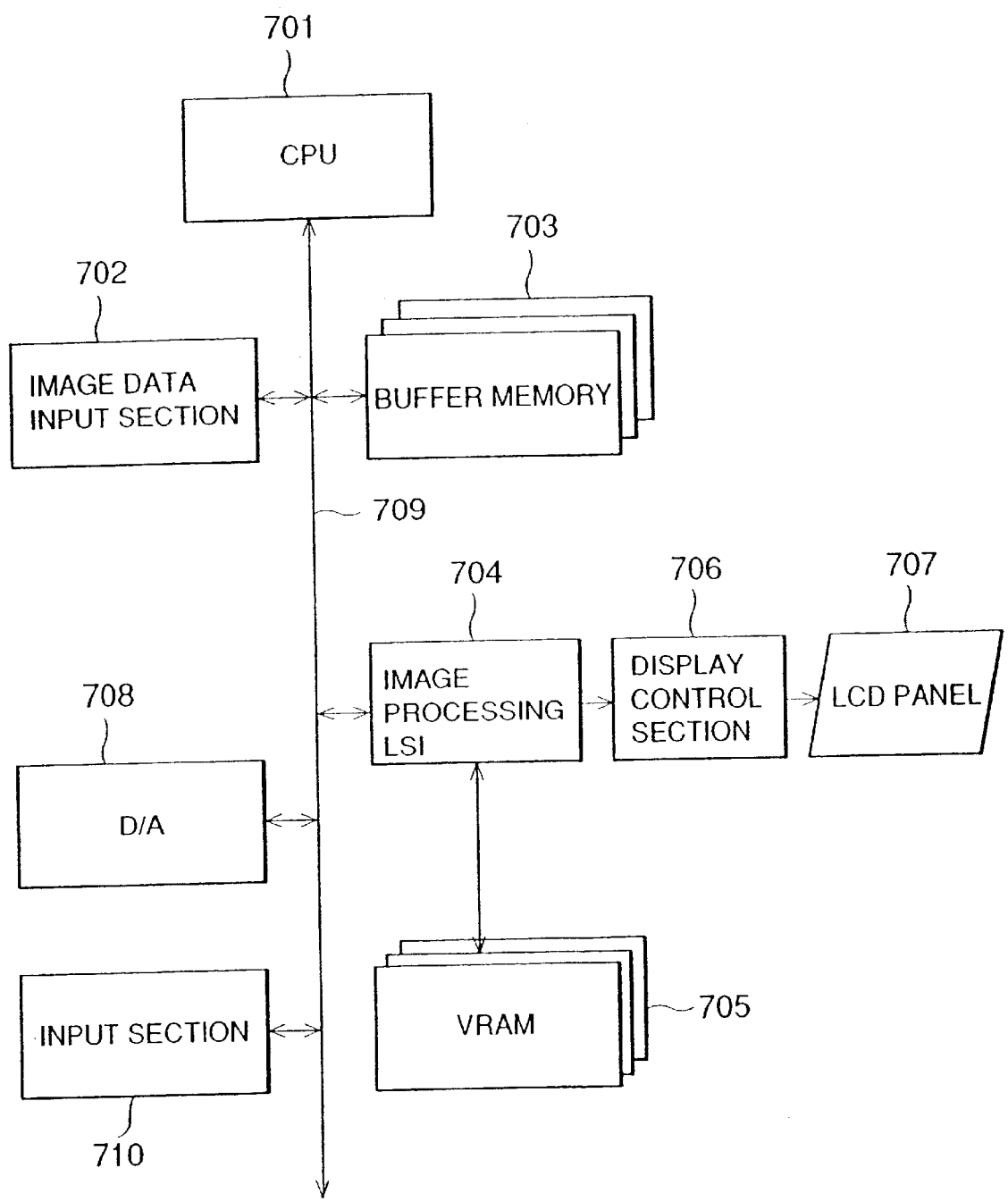
FIG. 8 is a block diagram showing a hardware structure of a system to which an apparatus according to the present invention is applied.

As shown in FIG. 22A, 8 pixels per line are converted into 13 pixels per line in the horizontal direction for each of eight lines of a pixel block unit 221 including 8×8 pixels. Similarly, the number of pixels are converted so as to be 13 pixels per column in the vertical direction. Reference numeral 222 designates a newly generated pixel block unit including 13×13 pixels. In this case, it is understood that the pixel block unit 221 is magnified by 1.625 times. In FIG. 22B, 223 designates pixel data of the sixth line of the converted pixel block unit 222, and numbers 1 to 8 given above for the particular pixels designate the numbers of respective pixels of the pixel block unit 221 before conversion. Pixels above which have no numbers are newly generated interpolation pixels. Upon determining the gray scale levels of the interpolation pixels, the function f1 or f2 is used as described above. In FIG. 22C, for the interpolation pixels 226, 228 and 230, since there is no difference between the gray scale levels of the adjacent pixels, these interpolation pixels are generate so as to have the gray scale levels positioned on the function f1 (straight line) which links the two pixels. For the interpolation pixel 229, although there is a difference between the gray scale levels of the adjacent pixels, since the difference therebetween is less than the threshold, the interpolated pixel is generated so that the gray scale level thereof is positioned on a straight line 225 which links the two pixels. On the contrary, for the interpolate pixel 227, since a difference between the gray scale levels of the adjacent pixels is greater than the threshold, the interpolated pixel is generated such that the gray scale level thereof is positioned on the function f2 (224). The foregoing prevents boundary portions of the image from fading. On the other hand, the portion in the original image where the gray scale levels gradually vary can be converted into the portion in the enlarged image where the gray scale levels gradually vary similarly to the portion of the original image. The position where the interpolation pixels are generated, the threshold of the gray scale level, and the functions f1 and f2 can be determined in advance, in accordance with the kind of image information, such as moving picture or still picture.

Figure 1:
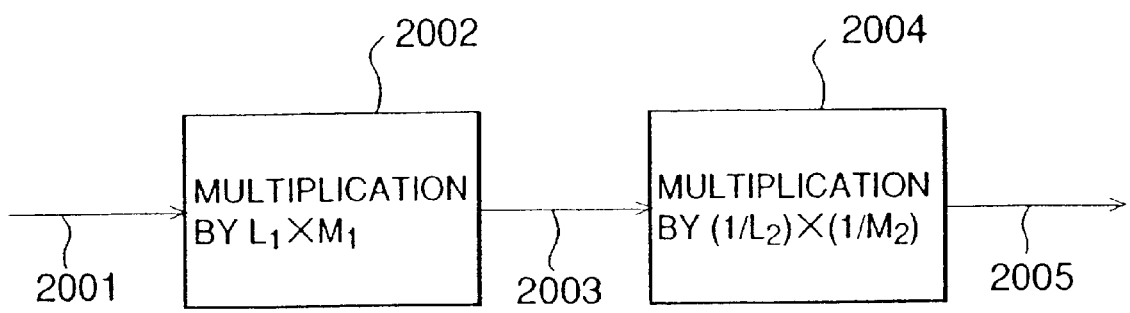
FIG. 1 is a block diagram of a conventional image scaling processing method.
Figure 2:
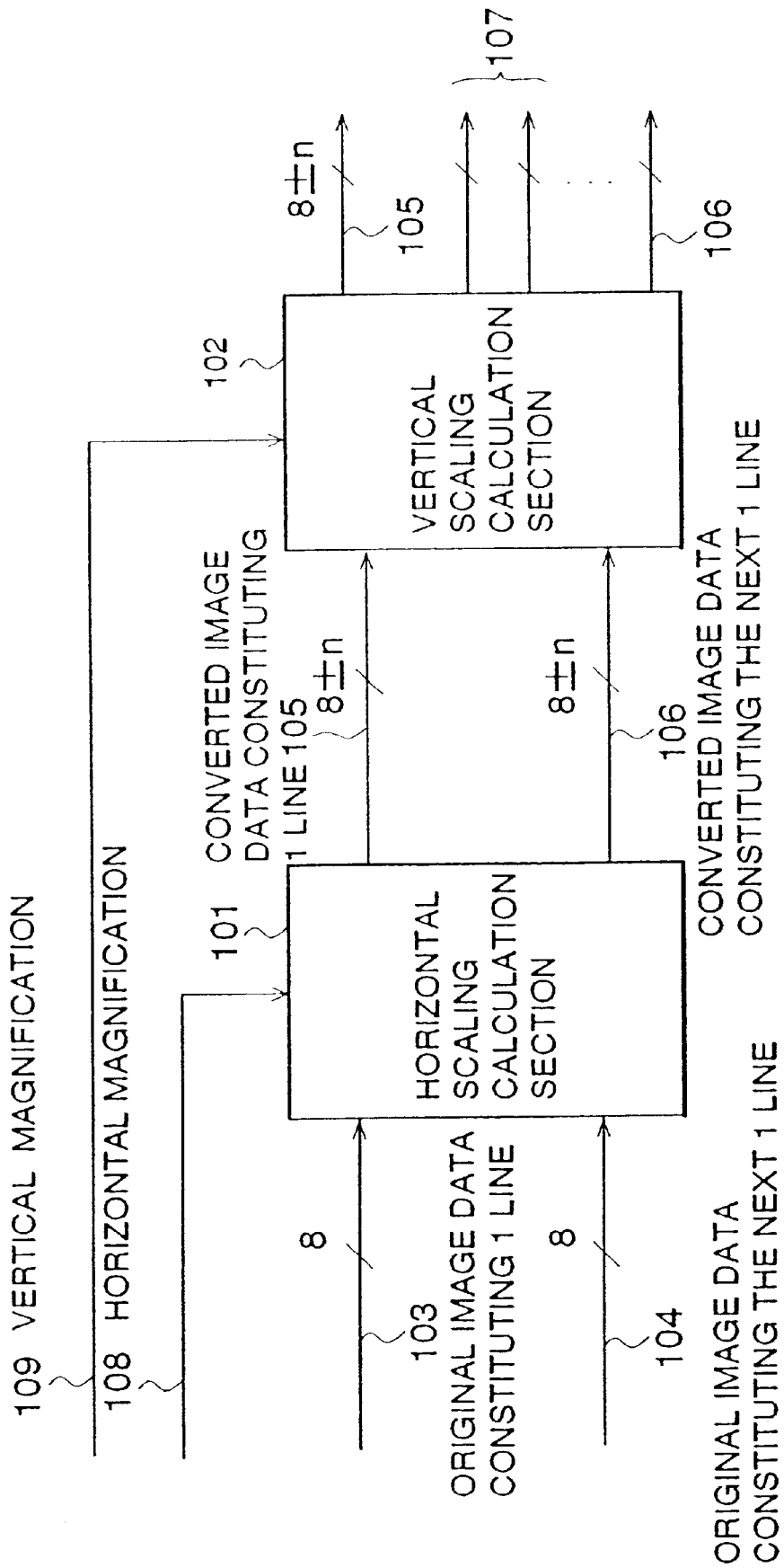
FIG. 2 is a block diagram showing a hardware structure of an apparatus converting an original digital image into a digital image having a different number of pixels according to an embodiment of the present invention.
Figure 3:
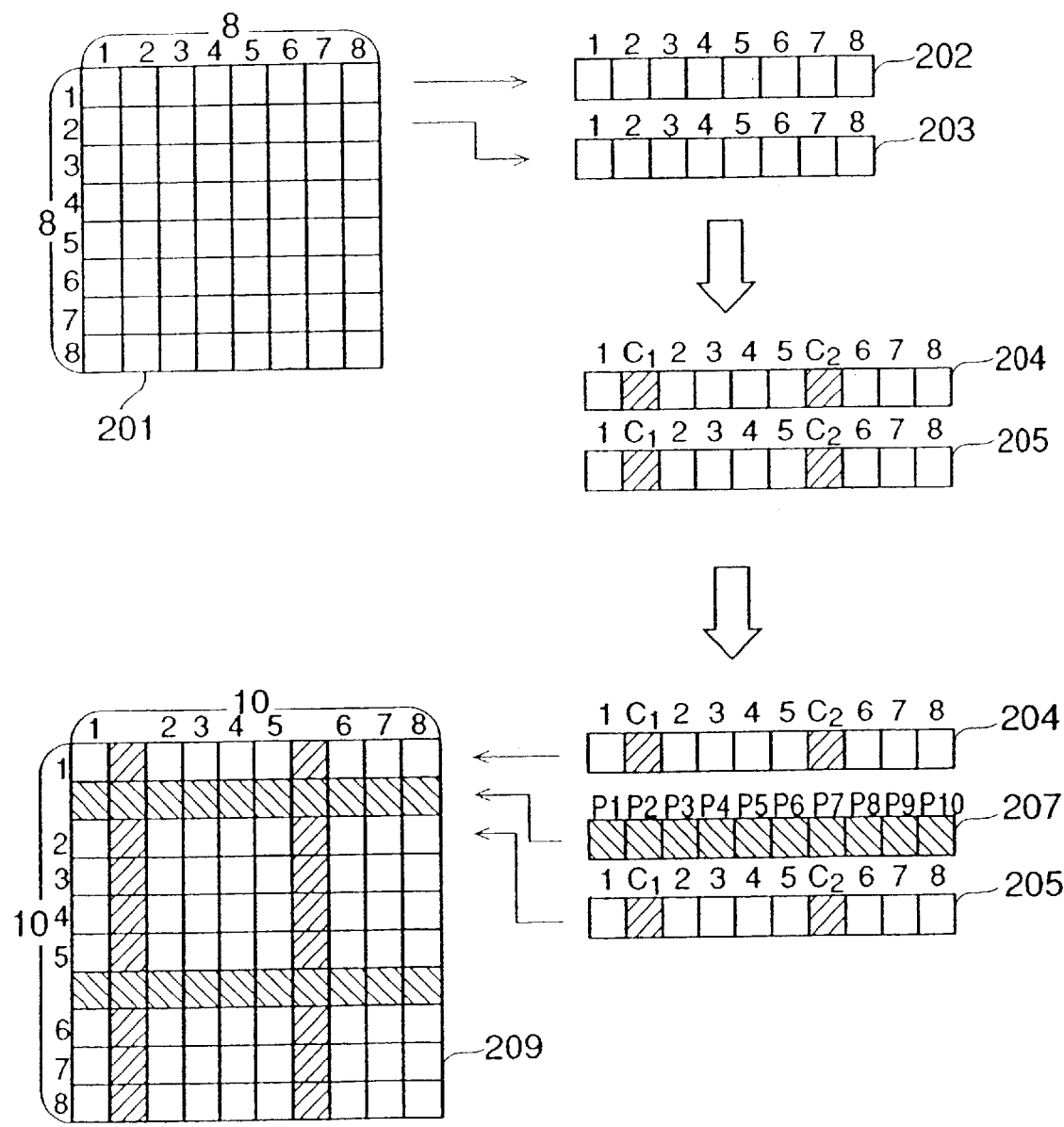
FIG. 3 is a diagrammatic sketch showing a pixel conversion operation of the embodiment.

The hardware of an apparatus according to an embodiment of the present invention, and the conversion operation thereof, will now be explained. FIG. 2 is a block diagram of an apparatus which is an embodiment of the present invention for converting an original digital image into another digital image having a different number of pixels. FIG. 3 schematically shows the conversion of pixels. The apparatus of the present invention is not limited to the arrangement shown in FIG. 2, and it may be a single device which is constituted as a large scaled integrated circuit (LSI) as a peripheral device or may be realized in software. The original digital image data of the still picture, moving picture, or the like, include expanded data of previously compressed data in JPEG, MPEG or similar format, and digitized data of an NTSC signal.

In FIG. 2, a horizontal scaling calculation section 101 receives the original image data and converts the number of pixels in a horizontal direction. The horizontal scaling calculation section 101 receives original image data 103 of 8 pixels which constitute one single horizontal line and another original image data 104 of 8 pixels which constitute a subsequent single horizontal line. In addition, the horizontal scaling calculation section 101 is supplied with a control signal 108 representative of a horizontal magnification factor for indicating how many pixels are to be added to the pixels of the original image in the horizontal direction. As shown in FIG. 3, the horizontal scaling calculation section 101 receives original image data 202 of 8 pixels constituting one single horizontal line and another original image data 203 of 8 pixels constituting a subsequent single horizontal line in one set of original image data of pixel unit block 201 of 8×8 pixels, and converts the number of pixels of both lines so as to output image data 204 of 8±n pixels constituting the line and another image data 205 of 8±n pixels constituting the next line. In FIG. 3, pixels $C_1$, $C_2$, which are shown with hatching, are the interpolation pixels generated by the horizontal scaling calculation section 101.

Next, a vertical scaling calculation section 102 receives the image data, whose horizontal pixel number is converted, obtained by the horizontal scaling calculation section 101, and converts the number of pixels in a vertical direction. The vertical scaling calculation section 102 receives image data 105 of 8±n pixels constituting the line output by the horizontal scaling calculation section 101 and another image data 106 of 8±n pixels constituting the next line output by the horizontal scaling calculation section 101.

In addition, the vertical scaling calculation section 102 is supplied with a control signal 109 representative of a vertical magnification factor for indicating how many pixels are to be added to the pixels of the original image in the vertical direction. As shown in FIG. 3, the vertical scaling calculation section 102 receives the image data 204 of 8±n pixels constituting the line whose horizontal pixel number is converted and the other image data 205 of 8±n pixels constituting the next line whose horizontal pixel number is converted, and outputs them as they are (see the image data 105, 106 in FIG. 2). Furthermore, the vertical scaling calculation section 102 generates image data 207 of pixels constituting one line based upon the image data 204 of 8±n pixels constituting the line whose horizontal pixel number is converted, and the other image data 205 of 8±n pixels constituting the next line. In the image data 207 shown in FIG. 3, pixels P1 to P10 are interpolation pixels generated by the vertical scaling calculation section 102. The vertical scaling calculation section 102 executes the above mentioned process successively for the original image data of the pixel block unit of 8×8 pixels, whereby the image data 107 of a line to be interpolated are generated so as to convert the number of pixels in the vertical direction. In accordance with the above process, as shown in FIG. 3, the original image data 201 of the pixel block unit of 8×8 pixels are converted into the image data 209 of the pixel block unit of 10×10 pixels.

FIG. 8 is a block diagram of a system to which the apparatus in accordance with the present invention is applied. A central processing unit (CPU) 701 processes data.

An image data input section 702 receives compressed digital still picture data or moving picture data. A buffer memory 703 stores the image data. For example, if the image data corresponds to MPEG format compressed moving picture data, the buffer memory 703 is used for storing the image data before and after expansion of the compressed motion picture data, and the memory capacity thereof is at least enough to store 8×8 pixels. An image processing LSI 704 executes the above mentioned conversion of the number of pixels, that is, resolution conversion. A video RAM (VRAM) 705 stores the image data after the resolution conversion. A display control section 706 reads out the image data stored in the VRAM 705 and displays the respective image on a liquid crystal display (LCD) panel 707. A D/A 708 is a digital-to-analogue converter used for audio output. A system bus 709 consists of data buses, address buses and control buses. An input section 710 receives instructions indicative of the magnification factor of the conversion of resolution. In this system, the CPU 701, the buffer memory 703, the image processing LSI 704 for executing the scaling in accordance with the present invention, and display control section 706, can be a single device constituted as an LSI chip.

Figure 4:
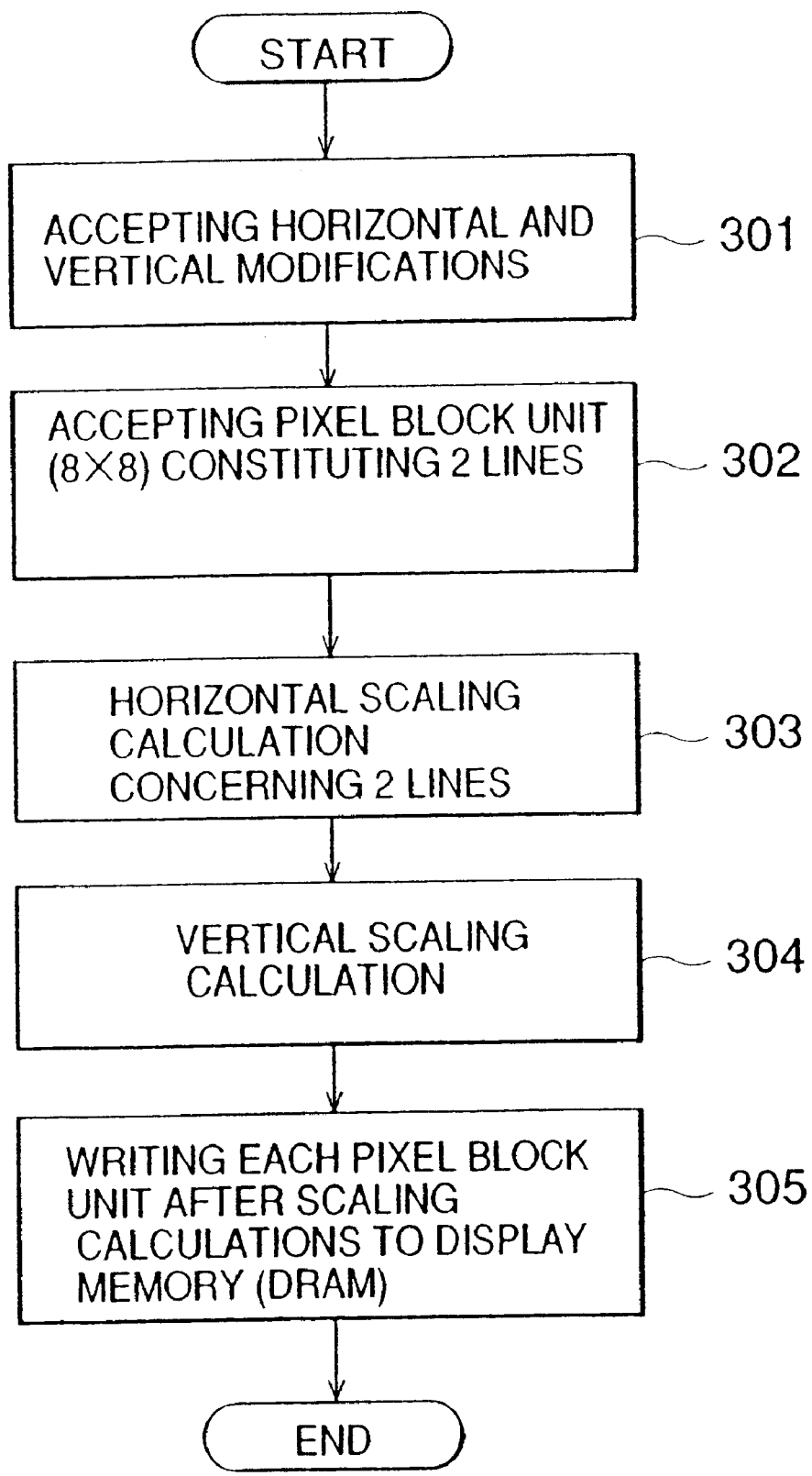
FIG. 4 is a flowchart showing a process in a resolution conversion operation of the present embodiment.

In addition, the LCD panel may be replace with other matrix display devices such as a plasma display, an electroluminescence (EL) display and the like. The resolution conversion will now be explained in detail with reference to FIGS. 4 and 8. FIG. 4 is a flow chart showing the process of resolution conversion.

As shown in FIG. 4, the input section 710 shown in FIG. 8 receives a magnification factor of the conversion of resolution which determines how many times the original image is magnified in the horizontal and the vertical directions (S 301). The CPU 701 stores data concerning the magnification factor of the resolution conversion in a parameter register for setting parameters of the image processing LSI 704. The image data input section 702 receives the image data, separates them into pixel block units of 8×8 pixels and stores the image data of the separated pixel unit blocks in the buffer memory 703. Next, the image processing LSI 704 receives pixel data for pixels constituting two horizontal lines in a pixel block unit of 8×8 pixels stored in the buffer memory 703 (S 302). The image processing LSI 704 generates interpolation pixels in the horizontal direction based upon the received pixel data of pixels constituting the two horizontal lines, and executes a horizontal scaling calculation concerning the two lines (S 303). Next, the image processing LSI 704 generates interpolated pixels in the vertical direction based on the data for pixels constituting the two lines which are subjected to the horizontal scaling calculation, and generates one interpolation line at a time to execute a vertical scaling calculation (S 304). Eventually, the pixel unit block subjected to the horizontal and vertical scaling calculations is stored in the VRAM 705 which is a display memory (S 305).

The calculation of the number of pixels to be interpolated, and the positions where they are interpolated, in accordance with the magnification factor, will now be explained in detail.

FIG. 5 shows a horizontal interpolation pixel generation table indicative of the relationship between the horizontal magnification factor and the number of interpolation pixels to be generated by the horizontal scaling calculation section 101 as shown in FIG. 2, when executing the horizontal scaling calculation.

In this embodiment, since the interpolation pixels are generated every single horizontal line in a pixel block unit of 8×8 pixels, the number of input pixels equals eight. For example, if each of R(red), G(green) and B(blue) is constituted by 8 bits to display a color image, the data length is 24 bits for one pixel. Alternatively, the pixel data can be digital data of YUV represented by a luminance and a color difference. As shown in FIG. 5, the horizontal scaling is accomplished by adding the number of interpolation pixels to be generated to eight, which is the number input of pixels. For example, if the horizontal magnification factor is set to 1.625, the number of interpolation pixels to be generated is five, and therefore, the number of output pixels is thirteen. Although the number of interpolation pixels to be generated can be designated, the position thereof affects the quality of the image. The position where at least one interpolation pixel is generated will be described later.

FIG. 6 shows a vertical interpolation pixel generation table indicative of the relationship between the vertical magnification factor and the number of interpolation lines to be generated by the vertical scaling calculation section 102 as shown in FIG. 2, when executing the vertical scaling calculation. In this embodiment, since vertical interpolation pixels are generated in the pixel block unit of 8×8 pixels so as to obtain interpolation lines, the number of input lines equals 8.

As shown in FIG. 6, the vertical scaling is accomplished by adding the number of interpolation lines to be generated to eight, which is the number input of lines. For example, if the vertical magnification factor is set to 1.375, the number of interpolation lines to be generated is 3, and therefore, the number of output lines is 11. Similarly to the horizontal scaling operation, although the number of interpolation lines to be generated can be designated, the position where the lines are interpolated affects the quality of the image.

Accordingly, the process for designating the number of interpolation pixels based on the horizontal magnification factor and determining the positions where the interpolation pixels are to be generated will now be explained with reference to FIG. 7.

Figure 7:
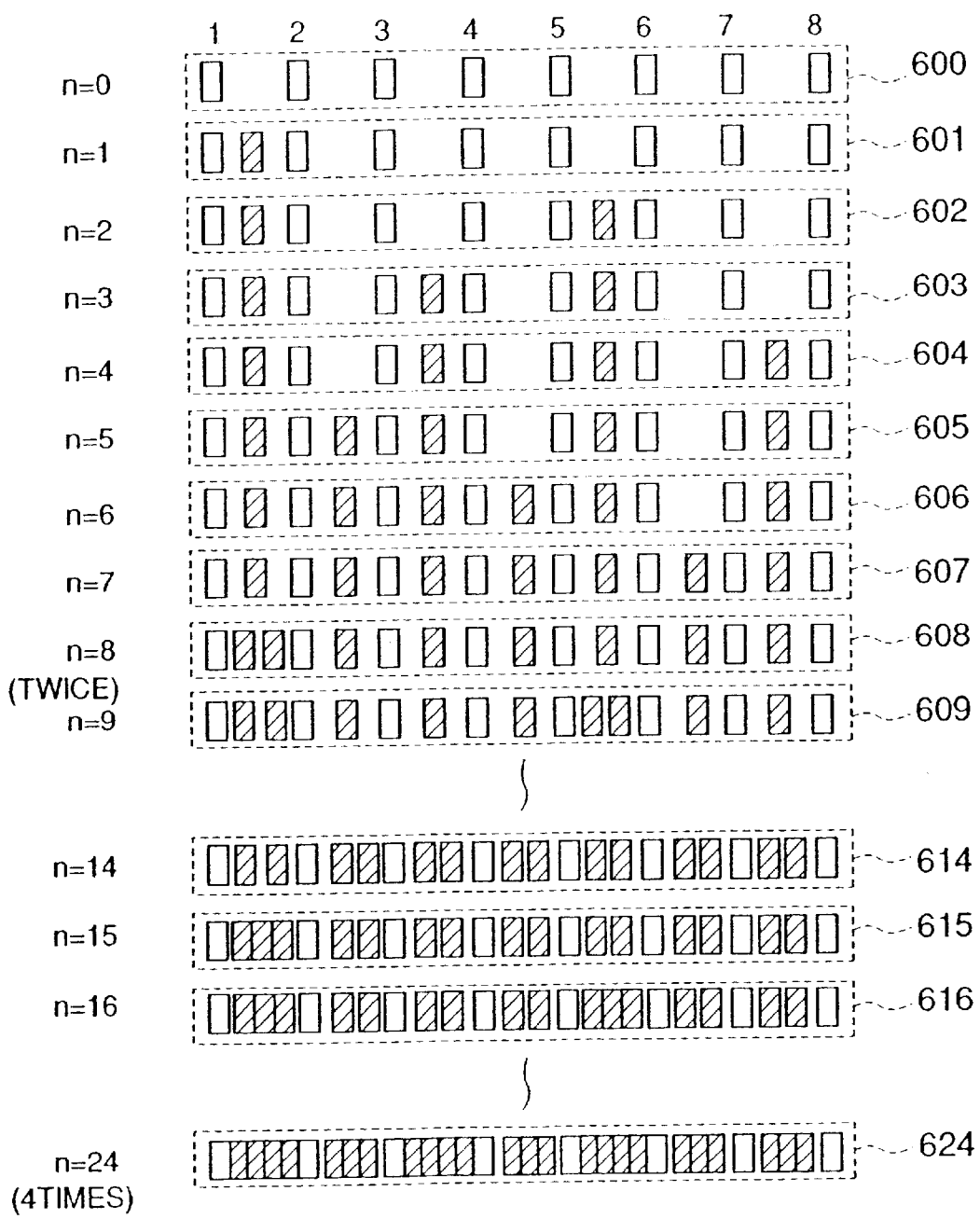
FIG. 7 is an example of positions where the interpolation pixels are to be generated.

FIG. 7 illustrates positions of the interpolation pixels when they are generated based on the original image data of 8 pixels constituting one horizontal line in a pixel block unit of 8×8 pixels. However, the position where at least one interpolation pixel is generated is not limited to the above. In FIG. 7, white-painted rectangles designate 8 pixels constituting one line in the pixel block unit of 8×8 pixels. On the other hand, other rectangles, which are shown with hatching, are interpolation pixels.

The positions where the interpolation pixels are provided can be seen from FIG. 7. In FIG. 7, n is a positive integer and indicates the number of interpolation pixels to be generated.

In FIG. 7, 600 indicates a case where the number of interpolation pixels to be generated n=0, and shows the pixels "1" to "8" of the original image sequentially in ascending numeric order. Reference numeral 601 indicates a case where the number of interpolation pixels to be generated n=1, and shows that one interpolation pixel is generated between the pixels "1" and "2". Reference numeral 602 indicates a case where the number of interpolation pixels to be generated n=2, and shows that one interpolation pixel is generated between the pixels "1" and "2" and another interpolation pixel is generated between the pixels "5" and "6". In this case, the horizontal magnification factor is 1.25, as shown in the horizontal interpolation pixel generation table of FIG. 5.

If the horizontal magnification factor is increased, as in case of numeral 608, the number of interpolation pixels to be generated n=8, and two interpolation pixels are generated between the pixels "1" and "2" of the original image, one interpolation pixel is generated between the pixels "2" and "3", one interpolation pixel is generated between the pixels "3" and "4", one interpolation pixel is generated between the pixels "4" and "5", one interpolation pixel is generated between the pixels "5" and "6", one interpolation pixel is generated between the pixels "6" and "7", and one interpolation pixel is generated between the pixels "7" and "8". In this case, the horizontal magnification factor is 2, as shown in the horizontal interpolation pixel generation table of FIG. 5.

Similarly, interpolation pixels are generated as shown in numerals 603 to 624 in accordance with the number of interpolation pixels to be generated "n". In this way, the number of interpolation pixels and the positions where they are generated can be determined in advance, in accordance with the magnification factor.

Although the above description relates to the positions where the interpolation pixels are generated in the horizontal direction, the positions where the interpolation lines are generated in the vertical direction can be determined in the same way as the determination in the horizontal direction, by replacing the interpolation pixels with the interpolation lines.

A method for determining the optimum gray scale levels of the interpolation pixels will now be explained. As described above, the gray scale level of each of the interpolation pixels is determined in accordance with the difference between the gray scale levels of two pixels adjacent to the position where the pixels are interpolated. If the difference between the gray scale levels of the adjacent pixels is equal to, or less than, the predetermined threshold, the function f1 (e.g. the function of a straight line) which links the gray scale levels of adjacent pixels is used so as to generate the interpolation pixels such that the gray scale levels thereof are positioned on the function f1. On the other hand, if the difference between the gradations of adjacent pixels is greater than the predetermined threshold, the function f2 (e.g. a function indicative of a curved line) which links the gray scale levels of adjacent pixels is used so as to generate the interpolated pixels such that the gray scale levels thereof are positioned on the function f2. For example, a spline function can be used as the function f2.

The spline function of n-th order is a piecewise polynominal function and can be defined with n-th different polynominal curves within small sections.

Figure 14A:
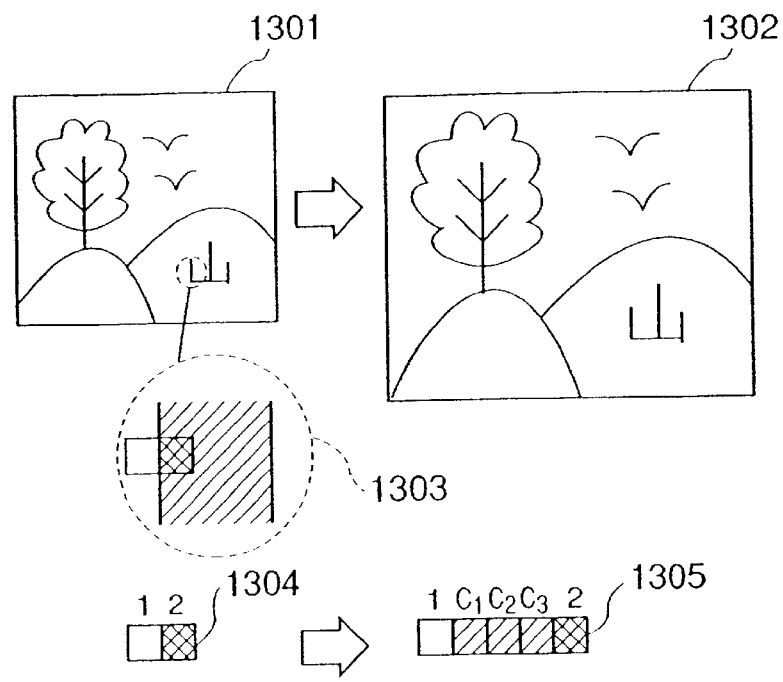
FIGS. 14A and 14B are illustrations for explaining a function used in the present embodiment.

The functions f1, f2 in this embodiment will now be explained with reference to FIGS. 14A and 14B. FIG. 14A shows original image data 1301 and image data 1302 after the conversion in which the original image is magnified by 3 times. In FIG. 14A, the original image data correspond to still picture or moving picture data in which a natural picture and a character "凵 (mountain)" are mixed up.

Particularly, the vicinity of the character is a clearly shaded area which contains a lot of high frequency components (hereinafter referred to as "high frequency component area"). Reference numeral 1303 designates an enlarged portion of the character.

Assuming that pixels "1" and "2" (1304) in the high frequency component area are converted in the horizontal direction, pixels $C_1$, $C_2$ and $C_3$ are generated based upon the pixels "1" and "2" which constitute a portion of the original image data 1301. As a result, after the conversion, the image data corresponding to this portion is constituted by the pixels "1", $C_1$, $C_2$, $C_3$ and "2" (1305). The data values, that is, gray scale levels of pixels $C_1$, $C_2$ and $C_3$ which are the interpolation pixels, affect the quality of the image.

Now, assume that the gray scale level of the pixel "1" is P1 and that of the pixel "2" is P2. FIG. 14B is a graph indicative of the gray scale levels of the pixels "1", "2", $C_1$, $C_2$ and $C_3$. In FIG. 14B, the function f1 (straight line) 1306 links the gray scale level P1 of the pixel "1" and the gray scale level P2 of the pixel "2". If the interpolation pixels are obtained such that the gray scale levels thereof are positioned on the function f1 (straight line), the respective gray scale levels of the pixels $C_1$, $C_2$ and $C_3$ are P2, P3 and P4. If the gray scale levels of interpolation pixels are determined using the straight line, obscurely shaded area containing a lot of low frequency components (hereinafter referred to as "low frequency component area") can be properly reproduced.

However, in the clearly shaded high frequency component area constituting characters, drawings and the like, if the gray scale levels of interpolation pixels are determined using the straight line, a blurred image may be reproduced. This is because the gray scale levels of the pixels $C_1$, $C_2$ and $C_3$ gradually vary and correspond to halftones. On the contrary, as shown by a dotted line, there is an optimum function f2 (curved line) 1307 for determining the gray scale levels of interpolation pixels in connection with the clearly shaded high frequency component area. In view of the above, in the clearly shaded high frequency component area constituting the characters, drawings and the like, the interpolation pixels $C_1$, $C_2$ and $C_3$ are obtained such that the gray scale levels thereof are positioned on the function f2 (curved line) 1307. Accordingly, the respective gray scale levels of the pixels $C_1$, $C_2$ and $C_3$ are P1, P2 and P4.

Figure 14B:
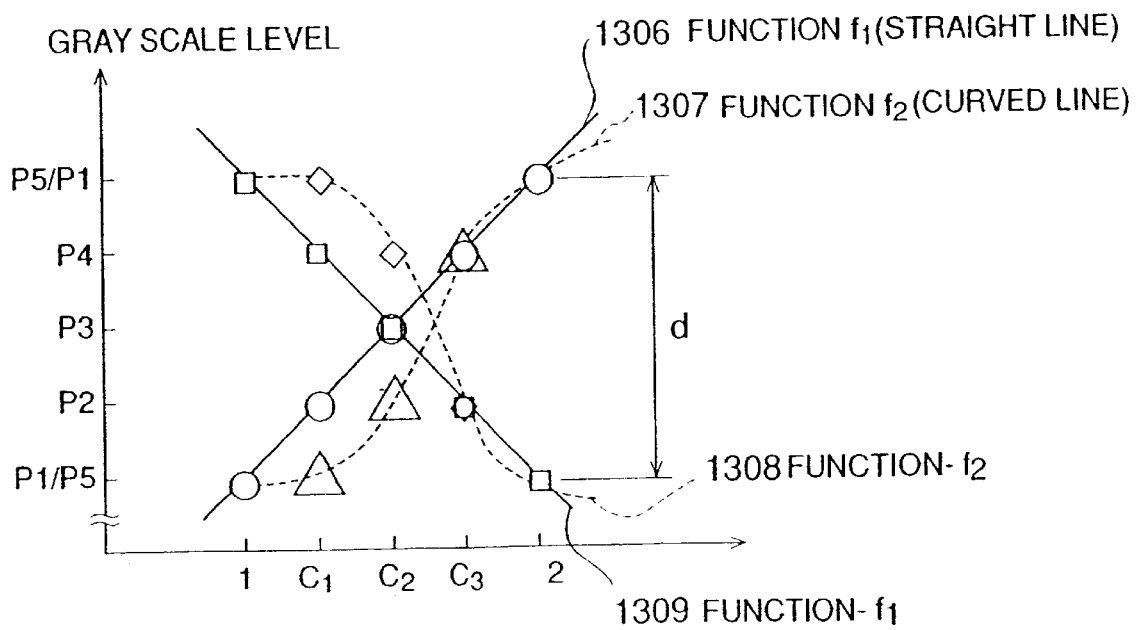

As may clearly be seen in FIG. 14B, a straight line (i.e., function f1 1306) may connect original image data such as pixels 1 and 2. Pixel 1 may have a gray-scale level of P1 and pixel 2 may have a gray-scale level of P5. In this example, an interpolation pixel (such as pixel C1) may be interpolated to be inserted onto the curved line (i.e., the function f2 1307). For example, interpolated pixel C1 may be inserted at a gray-scale level of P1 (on function f2 1307). As may clearly be seen in FIG. 14B, the gray-scale level of C1 on the function f2 1307 has a value smaller than a value of a corresponding gray-scale level on the function f1 1306, which connects the gray-scale levels of pixel 1 and pixel 2.

In actual fact, the gray scale levels may be calculated based on the function f2 (curved line) 1307, or may be obtained using approximate values. Since the original image is constituted by still picture or moving picture data, which contains the natural pictures, characters, drawings and the like, whether the gray scale levels of interpolation pixels are positioned on the function f1 (straight line) or the function f2 (curved line) is switched.

In this embodiment, in order to accomplish such switching, it is determined whether an absolute value d of the difference between the gray scale levels of the adjacent pixels in the clearly shaded high frequency component area is greater than a predetermined constant value. If the absolute value of the difference between the gray scale levels of the adjacent pixels in the obscurely shaded low frequency component area is equal to, or less than, the predetermined constant value, the gray scale levels of the interpolation pixels are determined such that they are positioned on the function f1 (straight line) 1306. On the other hand, if the absolute value thereof in the clearly shaded high frequency component area is greater than the constant value, the gray scale levels of the interpolation pixels are determined such that they are positioned on the optimum function f2 (curved line) 1307.

In this embodiment, the gray scale levels P2, P3 and P4 on the functions f1 (straight line) 1306 and f2 (curved line) 1307 are calculated along with the following equations in order to increase processing speed.

$$P2=P1+|P1-P5|/4$$
$$P3=P1+|P1-P5|/2$$
$$P4=P1+|P1-P5|/4+|P1-P5|/2 \qquad (1)$$

After P2, P3 and P4 are calculated as shown in the equations (1), if the absolute value "d" of the difference between the gray scale levels of the pixels "1" and "2" is equal to, or less than, a constant value, the gray scale levels of the pixels $C_1$, $C_2$ and $C_3$ are determined to be P2, P3 and P4, respectively, so that they are on the function f1 (straight line) 1306. On the other hand, the absolute value "d" thereof is greater than the constant value, the gray scale levels of the pixels $C_1$, $C_2$ and $C_3$ are determined to be P1, P2 and P4, respectively, so that they are on the function f2 (a curved line).

In addition as shown in FIG. 14B, if the gray scale level of the pixel "1" is greater than that of the pixel "2", a line which links the gray scale levels of the pixels "1" and "2" falls from left to right. In this case, whether the function –f1 (straight line) or the function –f2 (curved line) is used to link the gray scale levels of the pixels "1" and "2" is determined in accordance with the difference between the adjacent pixels.

As may clearly be seen in FIG. 14B, a straight line (i.e., function –f1 1309) may connect original image data such as pixels 1 and 2. Pixel 1 may have a gray-scale level of P5 and pixel 2 may have a gray-scale level of P1. In this example, an interpolation pixel (such as pixel C1) may be interpolated to be inserted onto the curved line (i.e., the function –f2 1308). For example, interpolated pixel C1 may be inserted at a gray-scale level of P5 (on function –f2 1308). As may clearly be seen in FIG. 14B, the gray-scale level of C1 on the function –f2 1308 has a value larger than a value of a corresponding gray-scale level on the function –f1 1309, which connects the gray-scale levels of pixel 1 and pixel 2.

The horizontal scaling calculation section will now be explained more specifically with reference to FIGS. 9 to 13A and 13B.

Figure 9:
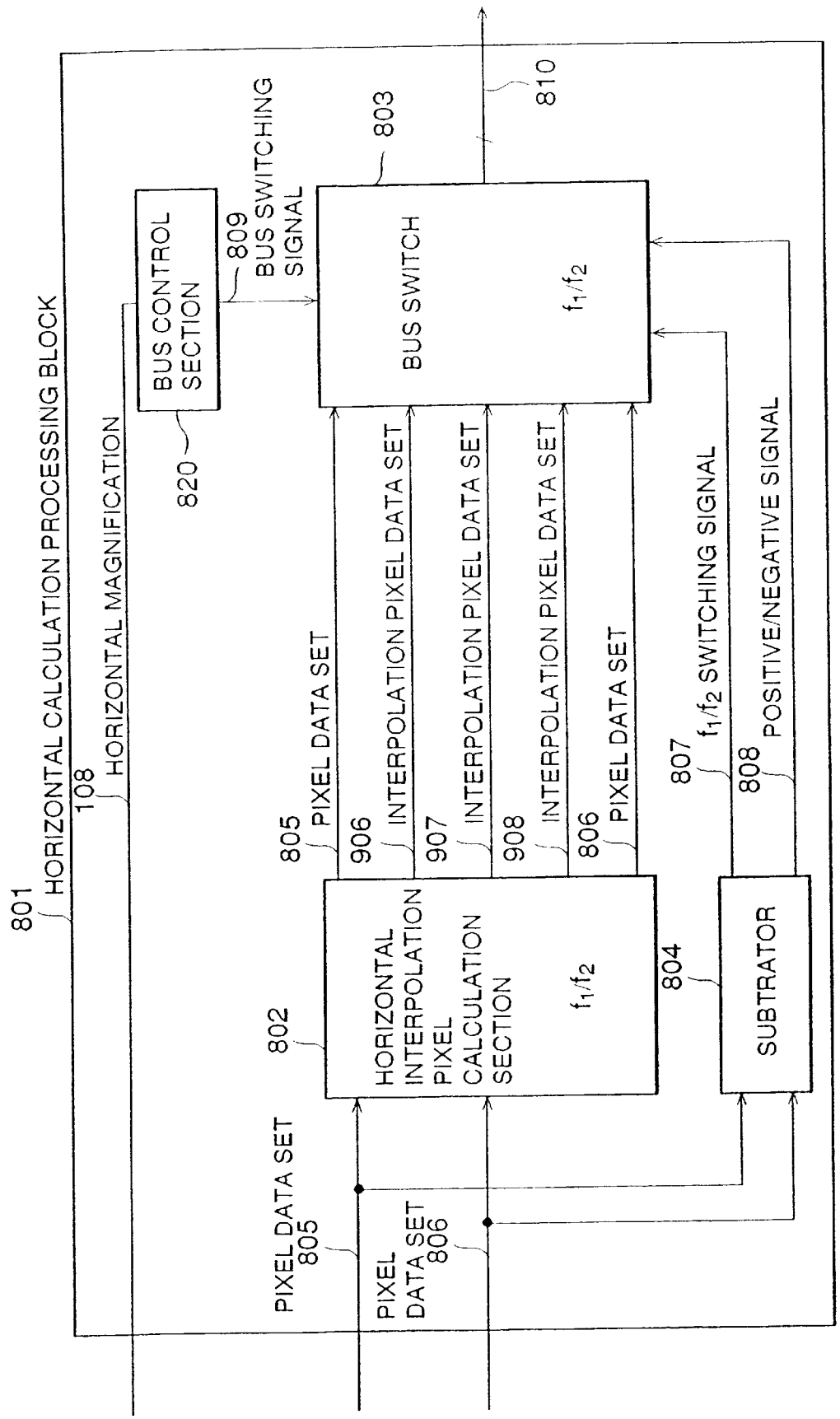
FIG. 9 is a block diagram showing a horizontal scaling calculation section according to the present embodiment in more detail.

FIG. 9 is a block diagram more specifically showing the horizontal scaling calculation section 101 shown in FIG. 2. In FIG. 9, a horizontal calculation processing block 801 receives pixel data of the adjacent pixels to calculate pixel data for the interpolation pixels to be generated. Within the horizontal scaling calculation section 101 shown in FIG. 2, a plurality of the horizontal calculation processing blocks 801 are provided, and the plurality of the horizontal calculation processing blocks 801 receive the pixel data of the respective adjacent pixels to execute processings in parallel. For example, the pixel block unit of 8×8 pixels includes 7 sets of adjacent pixels in each line. Accordingly, seven horizontal calculation processing blocks 801 are arranged in parallel as shown in FIG. 12 to execute the respective processing.

In addition, processing concerning a plurality of lines may be executed simultaneously by further providing a plurality of horizontal calculation processing blocks 801. For example, if the processing concerning two lines is to be executed simultaneously, fourteen horizontal calculation processing blocks 801 are provided.

In FIG. 9, a horizontal interpolation pixel calculation section 802 calculates the data values of the interpolation pixels based upon the data values of the two adjacent pixels in the original image in accordance with the designated horizontal magnification factor 108. Assume that the pixels "1" and "2" are received as the two adjacent pixels in the original image. If the horizontal magnification factor falls within the range of 1.125 to 1.875, the number of pixels to be interpolated between the pixels "1" and "2" equals 1, whereas if the horizontal magnification factor falls within the range of 2 to 2.875, the number thereof equals 2. The horizontal interpolation pixel calculation section 802 calculates the data values of the interpolation pixels to the extent of the number of the pixels to be interpolated.

In FIG. 9, the horizontal interpolation pixel calculation section 802 assumes that the number of pixels to be generated falls within the range of 0 to 3, and receives a pixel data set 805 (whose gray scale level is P1) and a pixel data set 806 (whose gray scale level is P5) and calculates P2, P3 and P4 based upon the equations (1), to output them as interpolation pixel data sets 906 to 908. A subtractor 804 receives the pixel data sets 805, 806 of the adjacent pixels of the original image and subtracts one gray scale level from the other. The subtractor 804 outputs two control signals consisting of a switching signal 807 and a positive/negative signal 808. The switching signal 807 is a control signal for selecting one of the functions f1 and f2, which becomes active if the absolute value of the difference between the data values is greater than the predetermined value. The positive/negative signal 808 indicates whether the result of subtracting data values is positive or negative.

Figure 20:
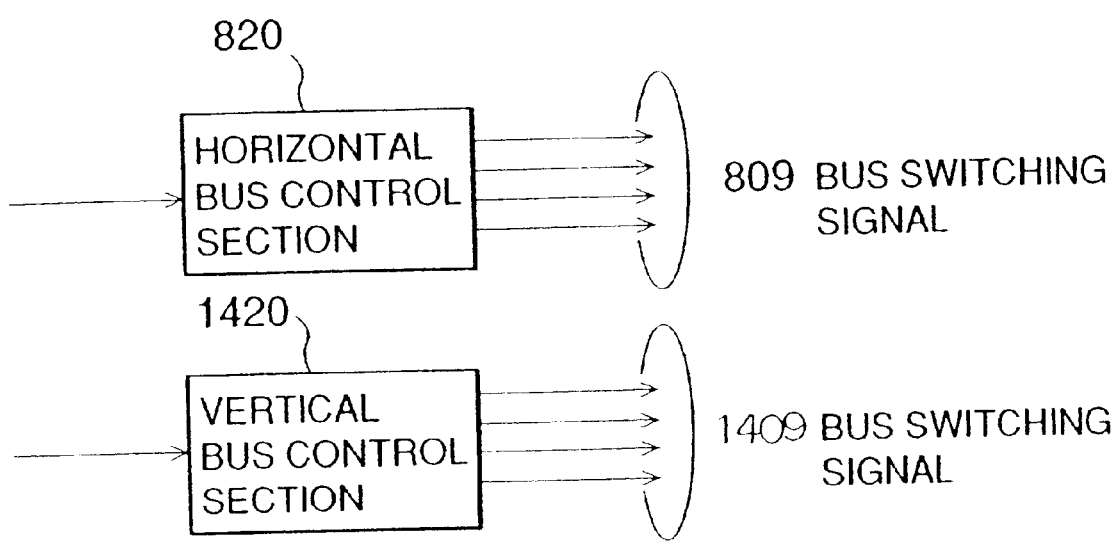
FIG. 20 is a block diagram showing a bus control section according to the present embodiment.

As shown in FIGS. 9 and 20, a bus control section 820 outputs a bus switching signal 809 to a bus switch 803 in accordance with the horizontal magnification factor 108. Since the number of interpolation pixels to be generated and the positions where they are generated are determined in accordance with the horizontal magnification factor as shown in FIGS. 5 and 7, the bus control section 820 outputs the bus switching signal 809 based upon the determination to control tri-state buffers in the bus switch 803.

The bus switch 803 receives the interpolation pixel data sets output from the horizontal interpolation pixel calculation section 802, selects the data values of the interpolation pixels in accordance with the switching signal 807, the positive/negative signal 808 and the bus switching signal 809 in accordance with the magnification factor instructed by the bus control section 820, and outputs them to a local data bus 810. In other words, in accordance with the positive/negative signal 808, whether the line which links the gray scale levels of the pixels "1" and "2" rises or falls from left to right is determined, while, in accordance with the switching signal 807 and the bus switching signal 809, the pixel data values relating to the positions to be interpolated are selected from among the data values P2, P3 and P4 of the pixel data sets provided as the interpolation pixel data sets 906 to 908 and the data values P1 and P5 of the pixel data sets provided as the original pixel data sets to output the selected data sets to the local bus 810.

Figure 10:
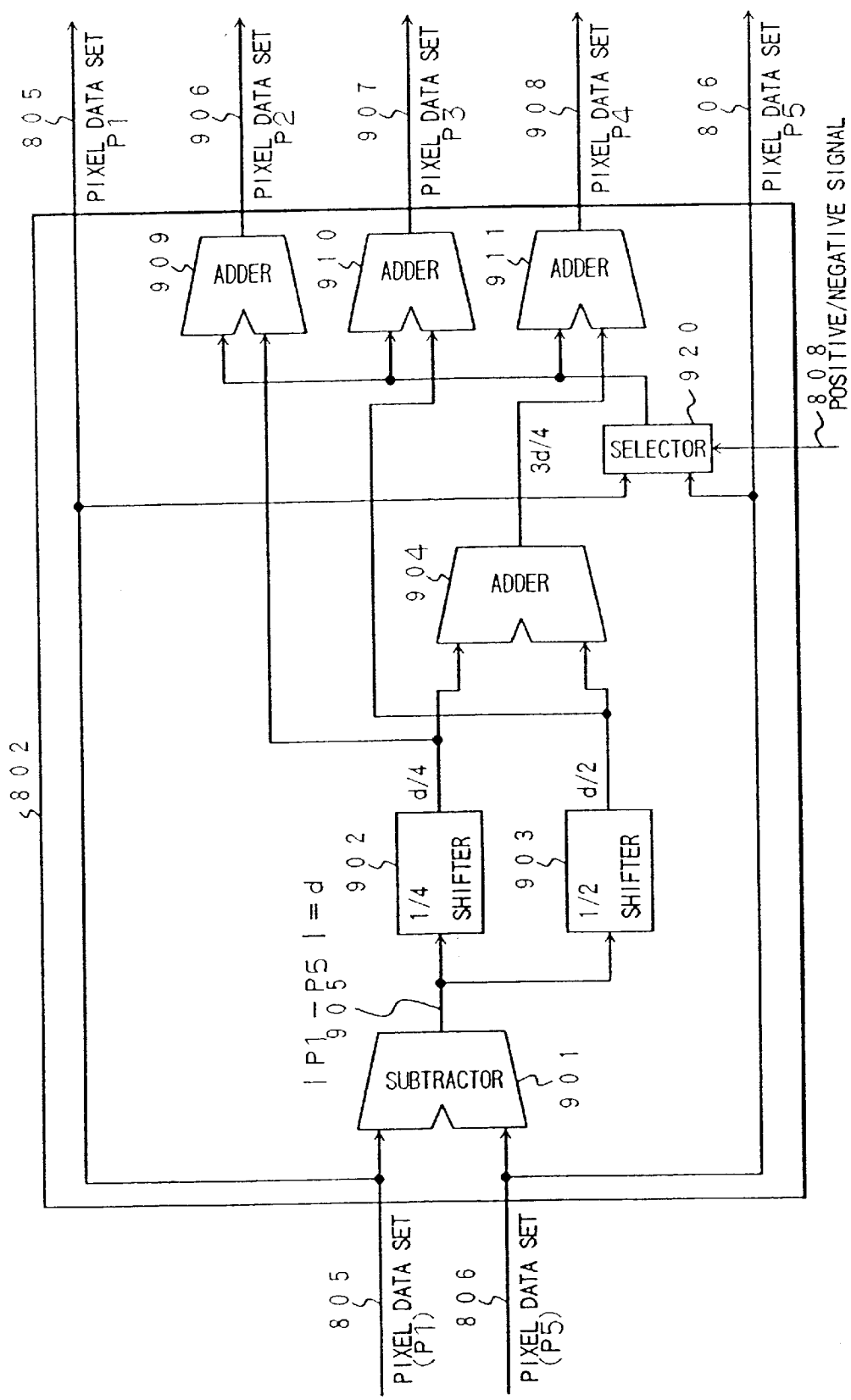
FIG. 10 is a block diagram showing a horizontal interpolation pixel calculation section according to the present embodiment.

The horizontal interpolation pixel calculation section 802 will be now explained more specifically with reference to FIG. 10. FIG. 10 is a block diagram showing the horizontal interpolation pixel calculation section 802. The horizontal interpolation pixel calculation section 802 executes the calculation shown in the equations (1).

In FIG. 10, data values of the pixel data sets 805 and 806 correspond to the gray scale levels P1 and P5 of the two pixels in the original image. A subtractor 901 calculates P1−P5 and outputs |P1−P5| (905). A ¼ shifter 902 multiplies the output data |P1−P5| (905) by a quarter, and a ½ shifter 903 multiplies the output data |P1−P5| (905) by a half. An adder 904 adds the output data |P1−P5|/4 from the ¼ shifter 902 to the output data |P1−P5|/2 from the ½ shifter 903. A selector 920 selects one of the pixel data values P1 (805) and P5 (806) in accordance with the positive/negative signal 808. If the subtraction value of the data values is positive, namely, the pixel data value P1 (805) is greater than P5, the selector 920 selects the pixel data value P5 (806). On the contrary, if the subtraction value of the data values is negative, namely, the pixel data value P5 is greater than P1, the selector 920 selects the pixel data value P1. In this way, the selector 920 outputs the pixel data having a smaller value.

An adder 909 adds the output data |P1−P5|/4 from the ¼ shifter 902 to P1 or P5 output from the selector 920, and outputs P2 (906). An adder 910 adds the output data |P1−P5|/2 from the ½ shifter 903 to P1 or P5 output from the selector 920, and outputs P3 (907). An adder 911 adds the output data |P1−P5|/4+|P1−P5|/2 from the adder 904 to P1 or P5 output from the selector 920, and outputs P4 (908). In view of the above, P2 (906), P3 (907) and P4 (908) are made by adding either P1 or P5 to |P1−P5|/4, |P1−P5|/2 and |P1−P5|/4+|P1−P5|/2, respectively.

In this way, the horizontal interpolation pixel calculation section 802 outputs P1 (805), P5 (806), and the generated interpolation pixel data P2 to P4 as the output pixel data on the basis of the input pixel data sets P1 (805) and P5 (806).

Figure 11:
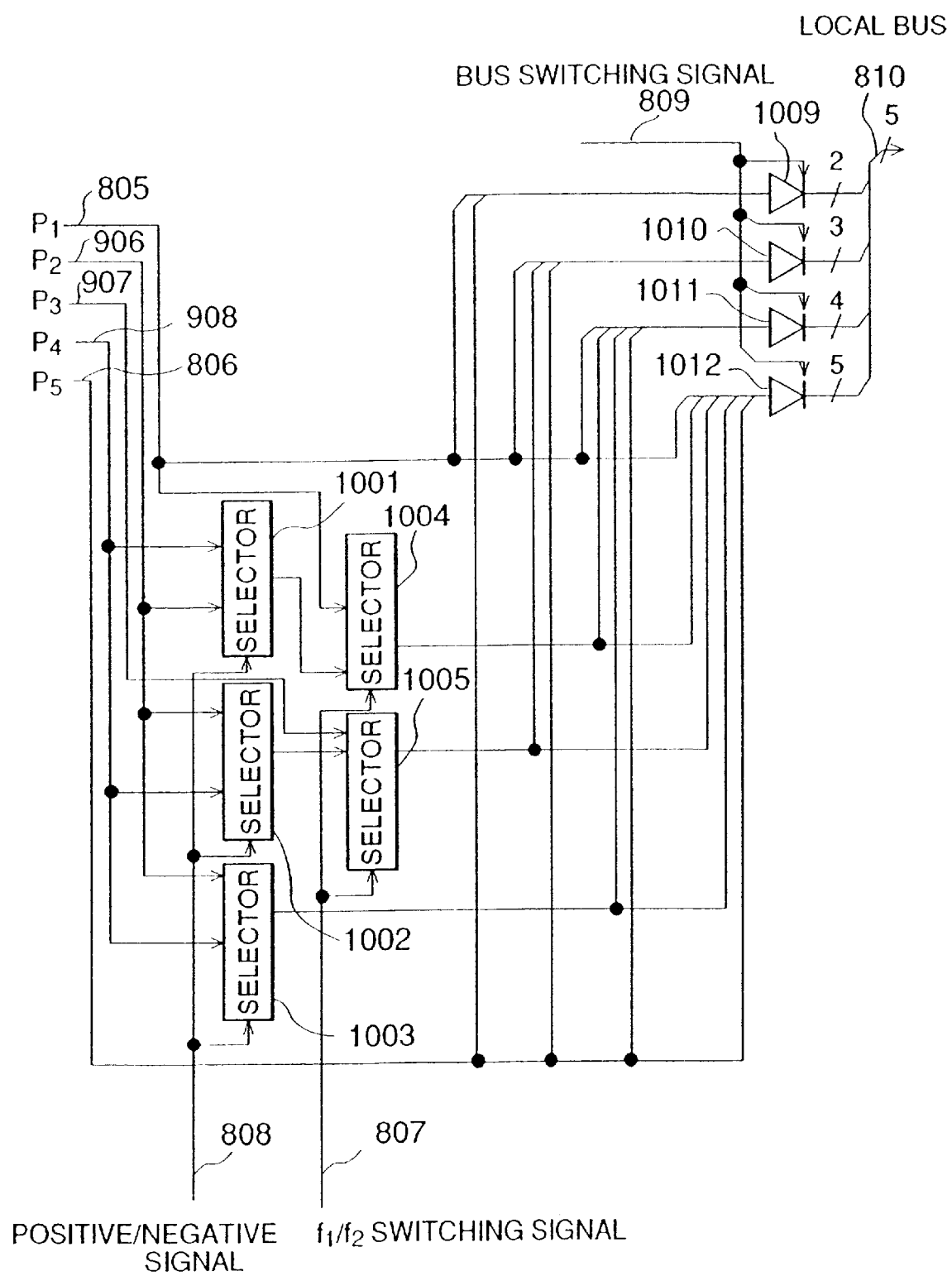
FIG. 11 is a diagram showing a bus switch according to the present embodiment.

The bus switch 803 will now be explained more specifically with reference to FIG. 11. FIG. 11 is a block diagram showing the bus switch 803. The bus switch 803 selects the pixel data calculated by the horizontal interpolation pixel calculation section 802 and outputs the selected data to a common local bus.

In FIG. 11, the bus switch 803 receives the data values of the pixel data P1 (805), P2 (906), P3 (907), P4 (908) and P5 (806) calculated by the horizontal interpolation pixel calculation section 802. Each of selectors 1001 to 1003 selects one of two input signals in accordance with the positive/negative signal 808 to output the selected one, and each of selectors 1004, 1005 selects one of two input signals in accordance with the switching signal 807 to output the selected one. The bus switching signal 809 selects one bus switch from among bus switches 1009 to 1012, and the selected bus switch outputs the image data.

The order of outputting P1 (805), P2 (906), P3 (907), P4 (908) and P5 (806) is changed depending on whether the gray scale levels are increasing or decreasing from left to right as shown in FIG. 14B, while the image data are changed in value depending on the difference between the gray scale levels of the adjacent pixels.

In FIG. 11, the bus switch 803 switches the selectors 1001 to 1005 in accordance with the switching signal 807 and the positive/negative signal 808. If rising from left to right, namely, the gray scale levels are increasing, and the absolute value |P1−P5| of the difference between the gray scale levels of the pixels "1" and "2" is greater than the constant value, while the pixel locates in the clearly shaded high frequency component area, the positive/negative signal 808 indicates negative and the switching signal 807 becomes active so that P1 (805), P1 (805), P2 (906), P4 (908) and P5 (806) are selected, such that the gray scale levels are positioned on the function f2 (curved line) 1307 shown in FIG. 14B by switching the selectors 1001 to 1005.

If rising from left to right, namely, the gray scale levels are increasing, and the absolute value |P1−P5| of the difference between the gray scale levels of the pixels "1" and "2" is equal to or less than the constant value, while the pixel locates in the obscurely shaded low frequency component area, the positive/negative signal 808 indicates negative and the switching signal 807 becomes non-active so that P1 (805), P2 (906), P3 (907), P4 (908) and P5 (806) are selected such that the gray scale levels are positioned on the function f1 (straight line) 1306 shown in FIG. 14B by switching the selectors 1001 to 1005.

On the contrary, if falling from left to right, namely, the gray scale levels are decreasing, and the absolute value |P1−P5| of the difference between the gray scale levels of the pixels "1" and "2" is greater than the constant value, while the pixel locates in the clearly shaded high frequency component area, the positive/negative signal 808 indicates positive and the switching signal 807 becomes active so that P1 (805), P1 (805), P4 (908), P2 (906) and P5 (806) are selected such that the gray scale levels are positioned on the function −f2 (curved line) 1308 shown in FIG. 14B by switching the selectors 1001 to 1005.

If falling from left to right, namely, the gray scale levels are decreasing, and the absolute value |P1−P5| of the difference between the gray scale levels of the pixels "1" and "2" is equal to or less than the constant value, while the pixel locates in the obscurely shaded low frequency component area, the positive/negative signal 808 indicates positive and the switching signal 807 becomes non-active so that P1 (805), P4 (908), P3 (907), P2 (906) and P5 (806) are selected such that the gray scale levels are positioned on the function −f1 (straight line) 1309 shown in FIG. 14B.

Furthermore, since the number of output pixel data changes in accordance with the horizontal magnification factor, bus switches 1009 to 1012 are provided in order to output the data to the local bus 810. The image data whose pixel number complies with the horizontal magnification factor are output by selecting one of the bus switches 1009 to 1012 in accordance with the bus switching signal 809 instructed by the bus control section 820.

Assuming that one pixel is interpolated between the adjacent pixels, the bus switch 1010 is selected to output the pixel data for three pixels to the local bus 810. The local bus 810 contains five bus lines. Accordingly, for example, if the bus switch 1010 is selected, the data for three pixels (three lines) are valid whereas the remaining data of two lines are invalid. These data of invalid lines (hereinafter referred to as "invalid data") are deleted in an adjustment processing block 1108 shown in FIG. 12.

In this way, the image data are output from the bus switch 803 of the horizontal calculation processing block 801.

The case where seven horizontal calculation processing blocks 801 are arranged in parallel will be now explained. FIG. 12 is a block diagram showing the horizontal calculation processing blocks arranged in parallel. In FIG. 12, 1109 to 1116 designate input data for the pixels "1" to "8". The horizontal calculation processing blocks 801-1 to 801-7 output the above mentioned image data. The adjustment processing block 1108 receives the image data output from the horizontal calculation processing blocks 801-1 to 801-7, subjects them to adjustment processing and outputs the image data 1117 of (8+n) pixels, wherein n is the number of the interpolation pixels, subjected to the adjustment processing.

Assuming that the pixel data sets constituting the two lines are to be processed simultaneously, as shown in FIG. 2, fourteen horizontal calculation processing blocks 801 are arranged in parallel, and the adjustment processing blocks are provided per seven horizontal calculation processing blocks. In other words, there are two adjustment processing block outputs which correspond to the numeral 105 and 106 shown in FIG. 2, respectively.

Figure 13A:
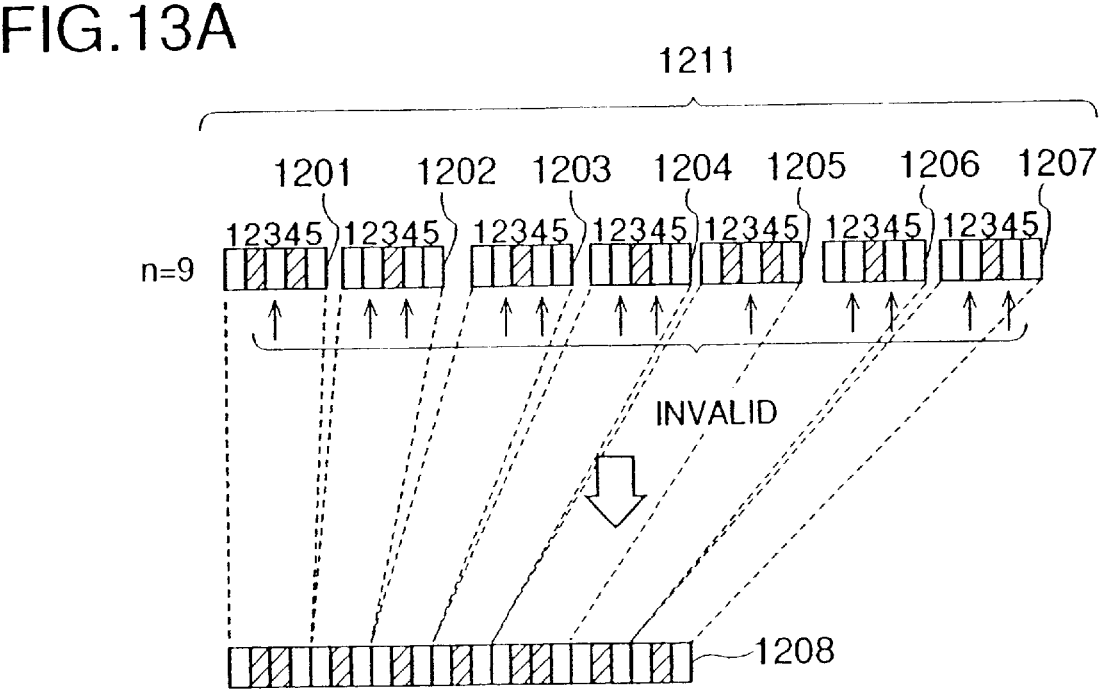
FIGS. 13A and 13B are illustrations for explaining a process of an adjustment processing block according to the present invention.
Figure 13B:
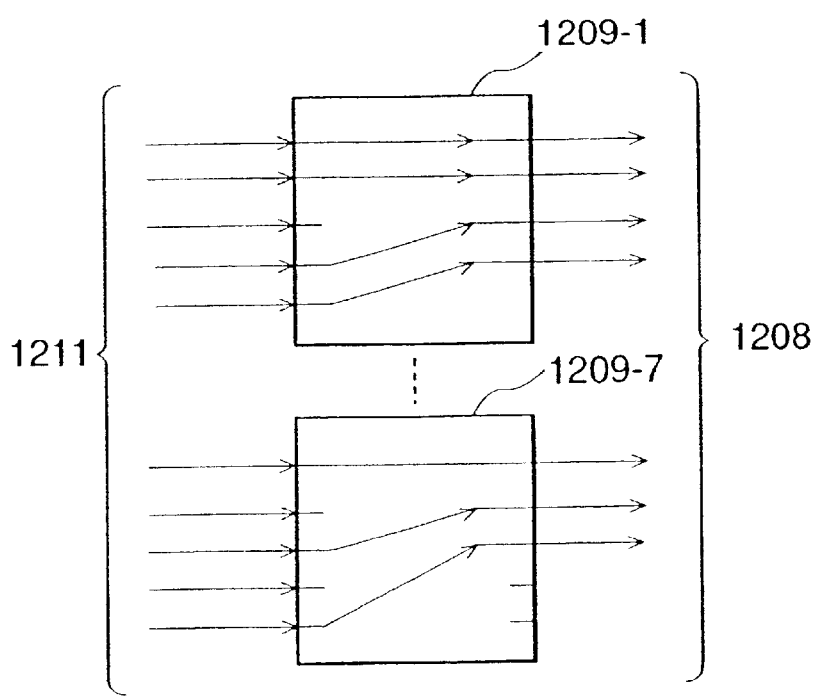

The processing in the adjustment processing block 1108 will be now explained with reference to FIGS. 13A and 13B. FIG. 13A shows the adjustment processing of the image data after the resolution conversion. Assume that the number of interpolation pixels to be generated "n" equals 9. The horizontal calculation processing blocks 801-1 to 801-7 outputs the pixel data 1201 to 1207, respectively. The pixel data 1201 to 1207 output onto the local bus include the invalid data as shown by arrows. Accordingly, the adjustment processing block 1108 is provided with bus transfer sections 1209-1 to 1209-7 corresponding to the horizontal calculation processing blocks 801-1 to 801-7, as shown in FIG. 13B. Each of the bus transfer sections 12091 to 1209-7 thins the invalid data out in accordance with the bus switching signal 809 complying with the horizontal magnification factor to compress data width, and outputs the pixel data sets 1208 subjected to the adjustment processing.

As a result of the above mentioned process, the number of pixels in the horizontal direction is converted.

A vertical scaling calculation section will now be explained more specifically with reference to FIGS. 15 to 19. The conversion in the vertical direction can be accomplished in a similar manner to the above mentioned conversion in the horizontal direction.

Figure 15:
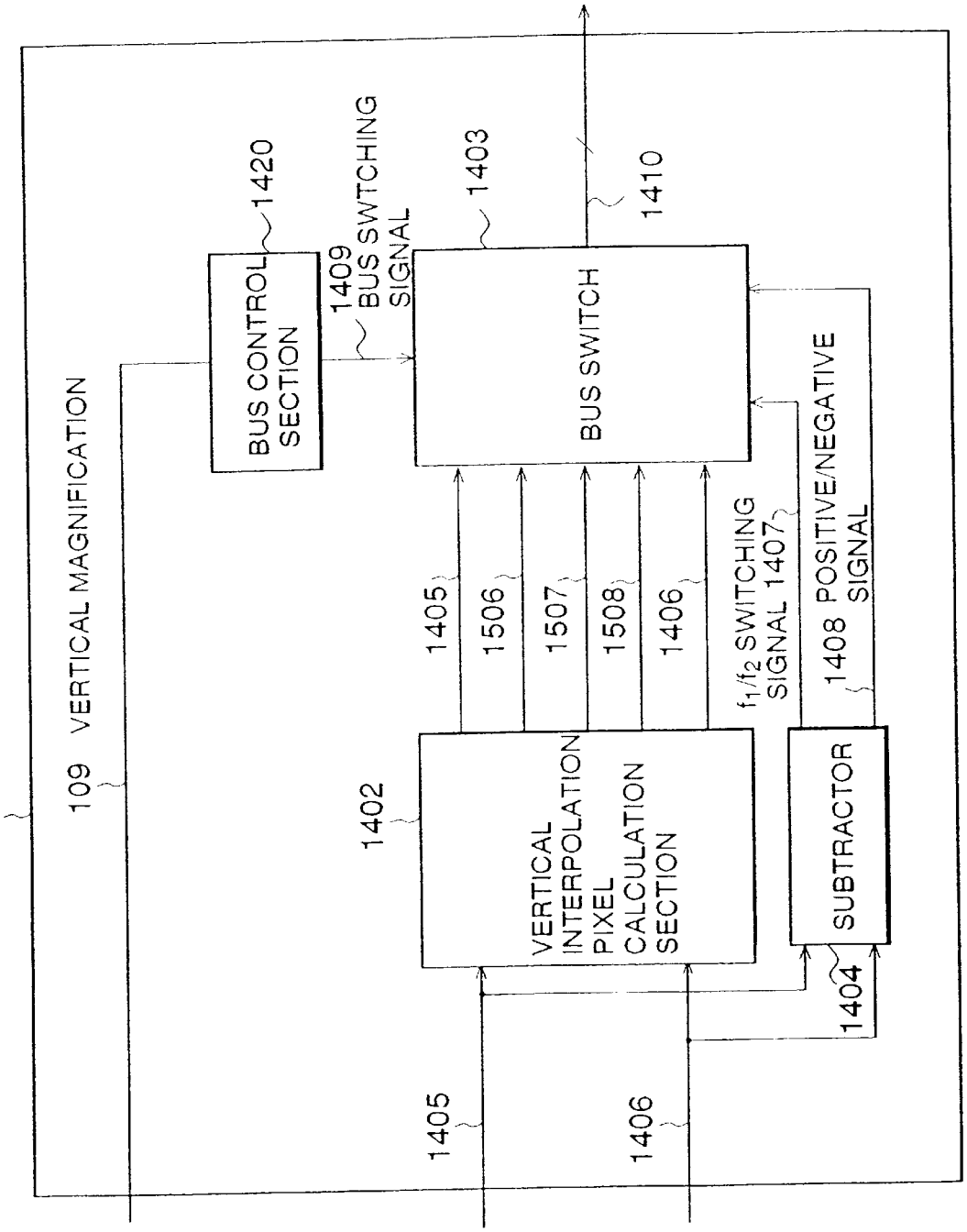
FIG. 15 is a block diagram showing a vertical scaling calculation section according to the present embodiment in detail.

FIG. 15 is a block diagram more specifically showing the vertical scaling calculation section 102. In FIG. 15, the vertical calculation processing block 1401 receives the pixel data of the adjacent pixels in the vertical direction to calculate pixel data for pixels to be generated. Within the vertical scaling calculation section 102 shown in FIG. 2, a plurality of vertical calculation processing blocks 1401 are provided. The plurality of vertical calculation processing blocks 1401 receive the pixel data of the respective adjacent pixels after the conversion in the horizontal direction, and can execute processing in parallel. In order to process data for M pixels in the horizontal direction, M vertical calculation processing blocks 1401-1 to 1401-M are provided. The vertical calculation processing block is supplied with the respective two sets of pixel data (105-1, 106-1), (105-2, 106-2), (105-3, 106-3) . . . , and (105-M, 106-M) having been subjected to the horizontal processing.

In FIG. 15, a vertical interpolation pixel calculation section 1402 calculates the data values of the interpolation pixels based upon the data values of the two adjacent pixels 1405, 1406 in the vertical direction. Herein, the pixels concerning the input data 1405, 1406 correspond to the pixels (e.g. the foremost pixels) concerning the converted data 105, 106 shown in FIG. 2. A subtractor 1404 outputs a switching signal 1407 and a positive/negative signal 1408 as two control signals. The switching signal 1407 is a control signal for selecting one of the functions f1 and f2, which becomes active if an absolute value of the difference between the data values is greater than the predetermined value. The positive/negative signal 1408 indicates whether the result of subtracting data values is positive or negative. Reference numeral 1410 designates pixel data subjected to the vertical scaling.

As shown in FIGS. 15 and 20, a bus control section 1420 outputs a bus switching signal 1409 to a bus switch 1403 in accordance with the vertical magnification factor 109. Since the number of interpolation pixels to be generated and the positions where they are generated are determined in accordance with the vertical magnification factor, as shown in FIGS. 6 and 7, the bus control section 1420 outputs the bus switching signal based upon the determination.

The bus switch 1403 receives the interpolation pixel data sets output from the vertical interpolation pixel calculation section 1402, selects the data values of the interpolation pixels in accordance with the switching signal 1407, the positive/negative signal 1408 and the bus switching signal 1409 in accordance with the magnification factor instructed by the bus control section 1420, and outputs them to a local data bus 1410.

Figure 16:
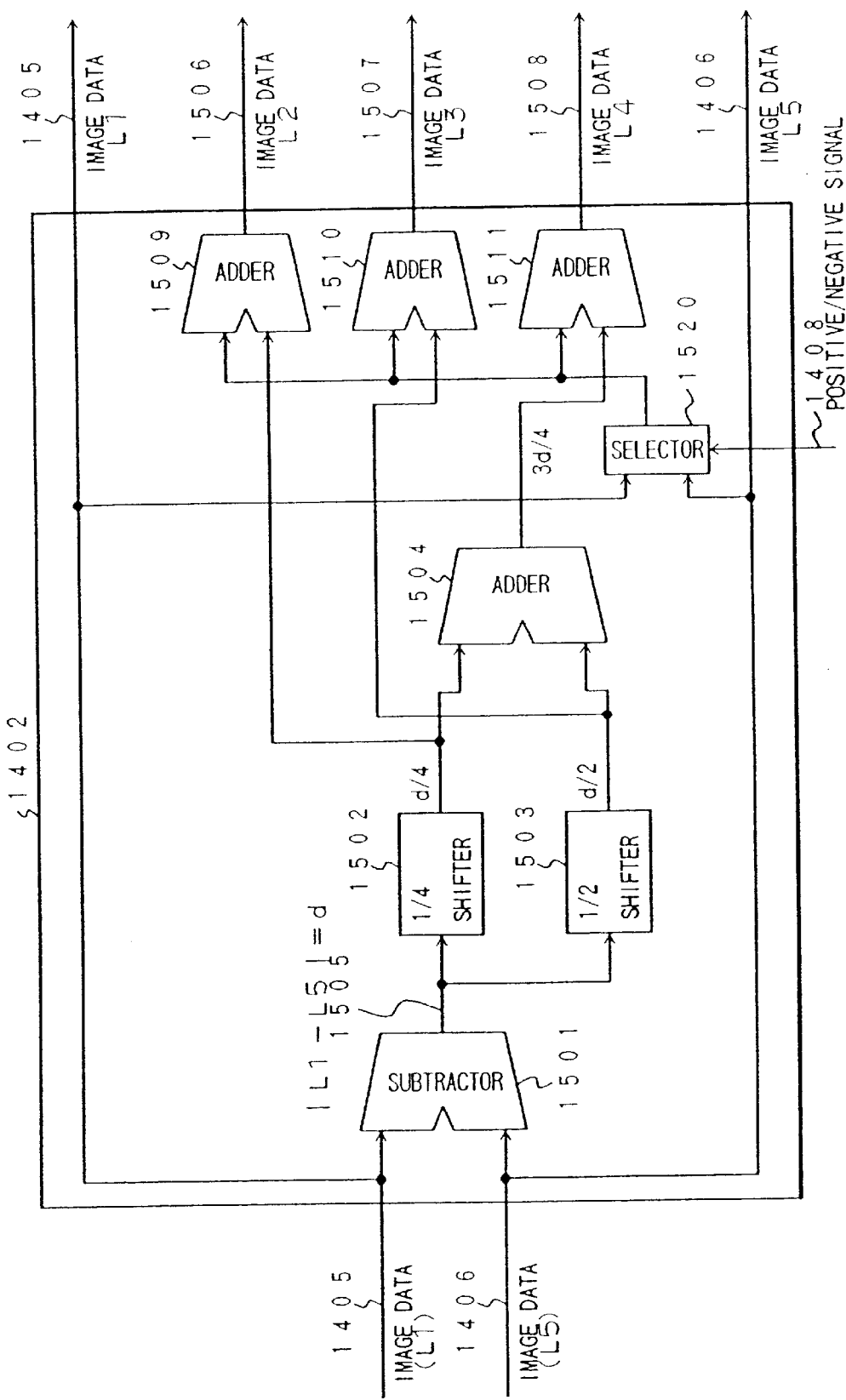
FIG. 16 is a block diagram showing a vertical interpolation pixel calculation section according to the present embodiment.

The vertical interpolation pixel calculation section 1402 will be now explained more specifically with reference to FIG. 16. FIG. 16 is a block diagram showing the vertical interpolation pixel calculation section 1402. The vertical interpolation pixel calculation section 1402 calculates the data values of the interpolation pixels based upon the data values of the two adjacent pixels of the original image in accordance with the equations (1) in a similar manner to the horizontal processing. Hereinafter, in order to distinguish the vertical processing from the horizontal processing, the gray scale level is shown by "L" instead of "P".

Assume that the number of lines to be generated by the vertical interpolation pixel calculation section 1402 equals 3. The vertical interpolation pixel calculation section 1402 receives pixel data 1405 (whose gray scale level equals L1) and pixel data 1406 (whose gray scale level equals L5), calculates L2, L3 and L4 in accordance with the equations (1), and outputs them as the interpolation pixel data 1506, 1507 and 1508.

In FIG. 16, the data values of the pixel data 1405 and 1406 correspond to the gray scale levels L1 and L5 of the two pixels in the original image. A subtractor 1501 calculates L1−L5 and outputs |L1−L5| (1505). A ¼ shifter 1502 multiplies the output data |L1−L5| (1505) by a quarter, and a ½ shifter 1503 multiplies the output data |L1−L5| (1505) by a half. An adder 1504 adds the output data |L1−L5|/4 from the ¼ shifter 1502 to the output data |L1−L5|/2 from the ½ shifter 1503. A selector 1520 selects one of the pixel data values L1 (1405) and L5 (1406) in accordance with the positive/negative signal 1408. If the result of subtracting data values is positive, namely, the pixel data value L1 (1405) is greater than L5, the selector 1520 selects the pixel data value L5 (1406). On the contrary, if the result of subtracting the data values is negative, namely, the pixel data value L5 is greater than L1, the selector 1520 selects the pixel data value L1. In this way, the selector 1520 outputs the pixel data of a smaller value.

An adder 1509 adds the output data |L1−L5|/4 from the ¼ shifter 1502 to L1 or L5 output from the selector 1520, and outputs L2 (1506). An adder 1510 adds the output data |L1−L5|/2 from the ½ shifter 1503 to L1 or L5 output from the selector 1520, and outputs L3 (1507). An adder 1511 adds the output data |L1−L5|/4+|L1−L5|/2 from the adder 1504 to L1 or L5 output from the selector 1520, and outputs L4 (1508). In view of the above, L2 (1506), L3 (1507) and L4 (1508) are made by either L1 or L5 being added to |L1−L5|/4, |L1−L5|/2 and |L1−L5|/4+|L1−L5|/2, respectively.

In this way, the vertical interpolation pixel calculation section 1402 outputs L1 (1405), L2 (1506), L3 (1507), L4 (1508) and L5 (1406) as the output pixel data in accordance with L1 (1405) and L5 (1406).

Figure 17:
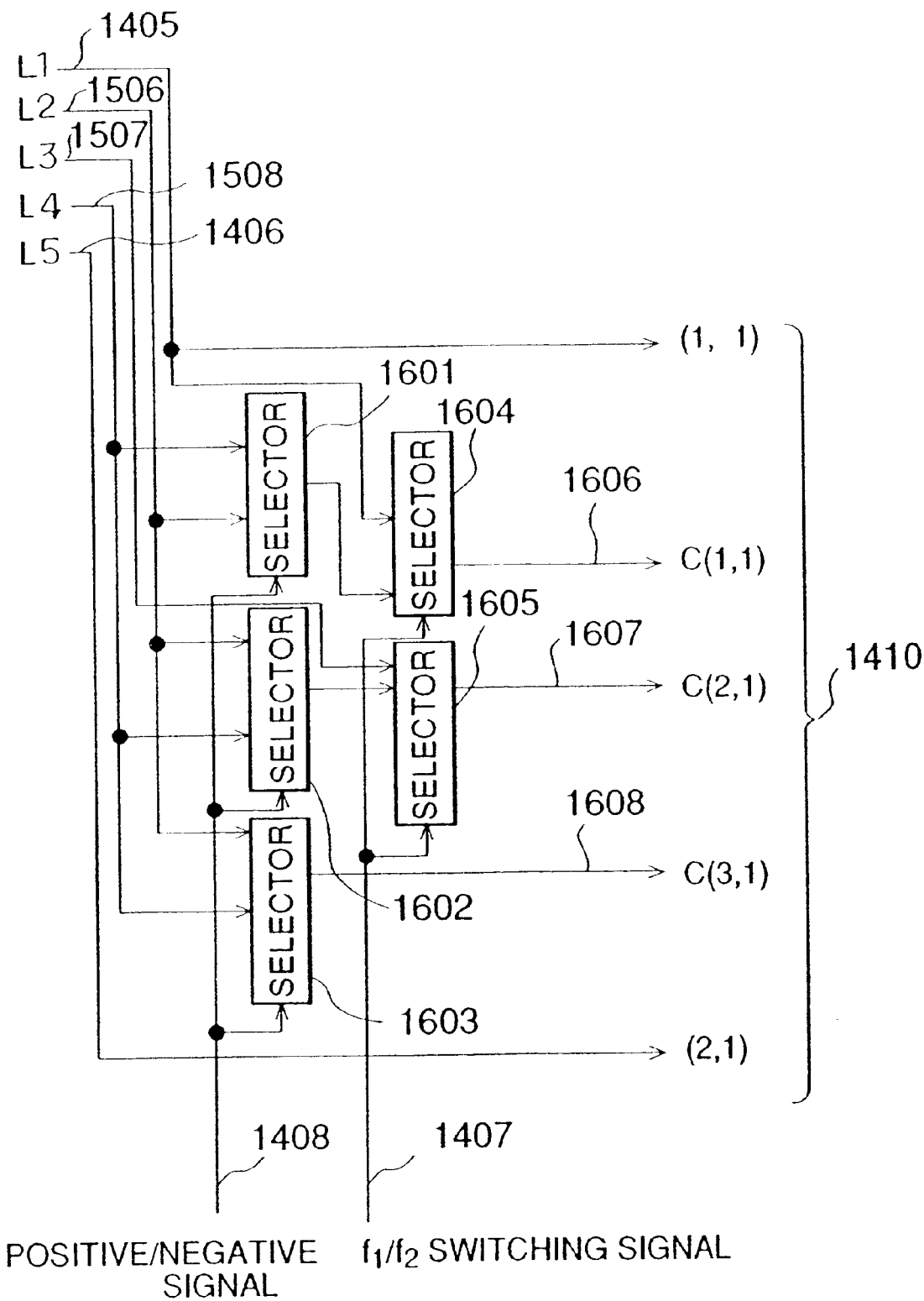
FIG. 17 is a block diagram showing a bus switch according to the present embodiment.

The bus switch 1403 will now be explained more specifically with reference to FIG. 17. FIG. 17 is a block diagram showing the bus switch 1403. The bus switch 1403 selects the pixel data calculated by the vertical interpolation pixel calculation section 1402 and outputs the selected data to a common local bus.

In FIG. 17, the bus switch 1403 receives the data values of the pixel data sets L1 (1405), L2 (1506), L3 (1507), L4 (1508) and L5 (1406) calculated by the vertical interpolation pixel calculation section 1402. Each of selectors 1601 to 1603 selects one of two input signals in accordance with the positive/negative signal 1408 and outputs the selected one, and each of selectors 1604, 1605 selects one of two input signals in accordance with the switching signal 1407 and outputs the selected one.

The order of outputting L1 (1405), L2 (1506), L3 (1507), L4 (1508) and L5 (1406) is changed depending on a condition whether L1 (1405) or L5 (1406) is greater, similarly to the horizontal conversion, while the image data are changed in value according to the difference between the gray scale levels of the adjacent pixels.

In FIG. 17, the bus switch 1403 switches the selectors 1601 to 1605 in accordance with the switching signal 1407 and the positive/negative signal 1408. If L1 (1405) is less than L5 (1406), and the absolute value |L1−L5| of the difference between the gray scale levels of the pixels "1" and "2" is greater than the constant value, which the pixels locates in the clearly shaded high frequency component area is greater than the constant value, the positive/negative signal 1408 indicates negative and the switching signal 1407 becomes active so that L1 (1405), L1 (1405), L2 (1506), L4 (1508) and L5 (1506) are selected such that the gray scale levels thereof are positioned on the function f2 (curved line) 1307 shown in FIG. 14B, by switching the selectors 1601 to 1605.

If L1 (1405) is less than L5 (1406), and the absolute value |L1−L5| of the difference between the gray scale levels of the pixels "1" and "2" is equal to or less than the constant value, which the pixels locates in the obscurely shaded low frequency component area, the positive/negative signal 1408 indicates negative and the switching signal 1407 becomes non-active so that L1 (1405), L2 (1506), L3 (1507), L4 (1508) and L5 (1406) are selected such that the gray scale levels are positioned on the function f1 (straight line) 1306 shown in FIG. 14B by switching the selectors 1601 to 1605.

On the contrary, if L1 (1405) is greater than L5 (1406), and the absolute value |L1−L5| of the difference between the gray scale levels of the pixels "1" and "2" is greater than the constant value, which the pixels locates in the clearly shaded high frequency component area, the positive/negative signal 1408 indicates positive and the switching signal 1407 becomes active so that L1 (1405), L1 (1405), L4 (1508), L2 (1506) and L5 (1506) are selected such that the gray scale levels are positioned on the function −f2 (curved line) 1308 shown in FIG. 14B, by switching the selectors 1601 to 1605.

If L1 (1405) is greater than L5 (1405), and the absolute value |P1−P5| of the difference between the gray scale levels of the pixels "1" and "2" is equal to or less than the constant value, which the pixels locates in the obscurely shaded low frequency component area, the positive/negative signal 1408 indicates positive and the switching signal 1407 becomes non-active so that L1 (1405), L4 (1508), L3 (1507), L2 (1506) and L5 (1406) are selected such that the gray scale levels are positioned on the function f1 (straight line) 1309 shown in FIG. 14B.

The bus switch 1403 combines the input pixel with the generated pixel and outputs the result. In FIG. 17, pixels (1, 1) and (2, 1) are indicative of the forefront (the first) data in the first and second lines in the input pixel data, respectively. C (1, 1) 1606, C (2, 1) 1607 and C (3, 1) 1608 are indicative of the forefront (the first) data on the first, second and third lines of interpolation lines.

As seen from FIGS. 15 and 17, the bus switch 1403 of the vertical calculation processing block 1401 outputs the image data.

Figure 18:
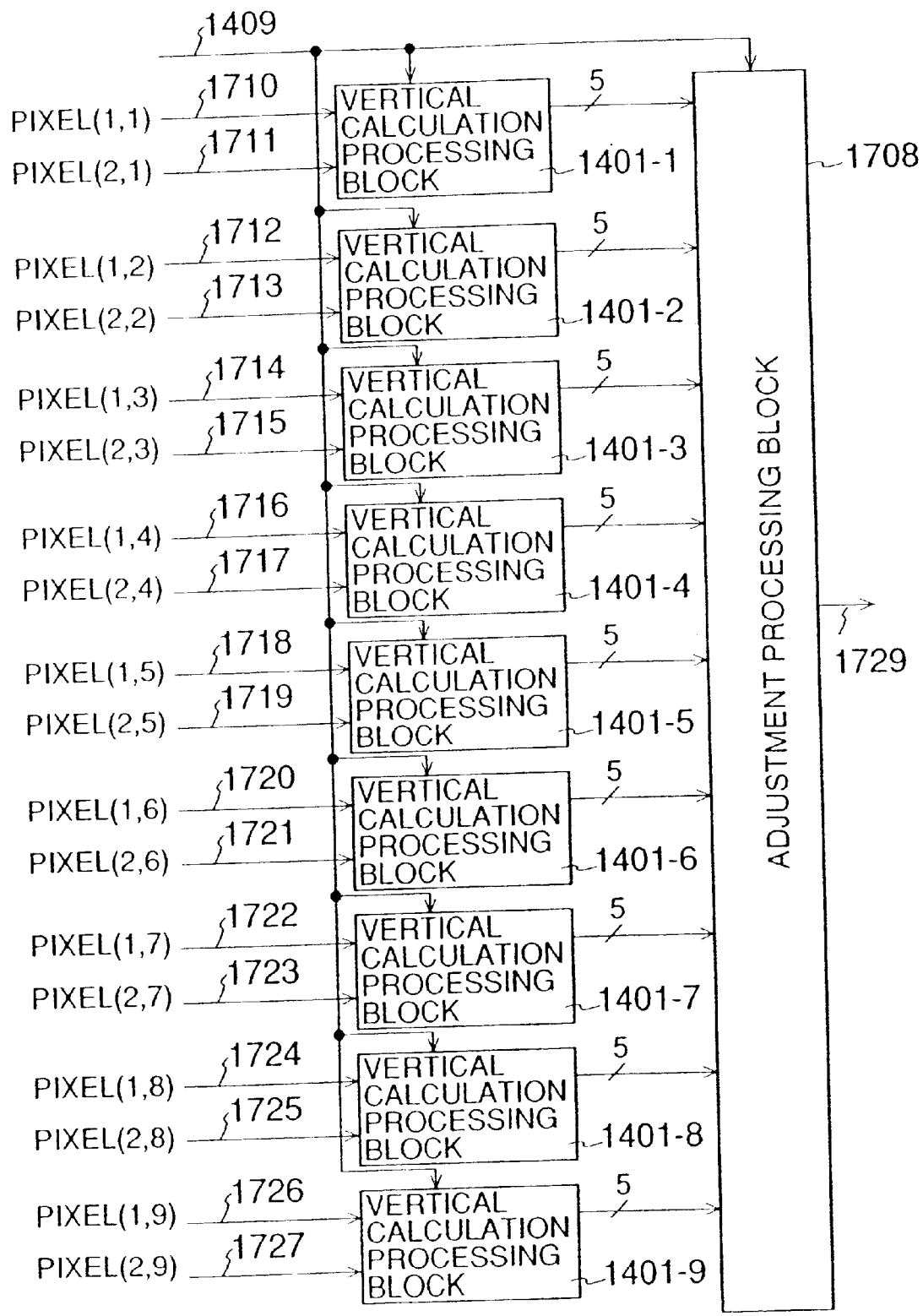
FIG. 18 is a block diagram showing a structure in which vertical calculation processing blocks are connected in parallel.

The case where a plurality of the vertical calculation processing blocks 1401 are arranged in parallel, as shown in FIG. 18, will now be explained. FIG. 18 is a block diagram showing the vertical calculation processing blocks arranged in parallel. The number of the vertical calculation processing blocks 1401 equals a bit number of the converted image data 105 or 106 shown in FIG. 2. In other words, it equals (8+n). In FIG. 18, 1710 to 1727 designate input pixels (1, 1) to (2, 9). For example, the pixel (2, 9) is indicative of the ninth pixel of the second line. In this regard, pixels (1, 1) to (1, 9) constitute the line designated by the numeral 105 in FIG. 2, and pixels (2, 1) to (2, 9) constitute the line designated by the numeral 106 in FIG. 2. In FIG. 18, the vertical calculation processing blocks 1401-1 to 1401-9 output the above mentioned image data. The adjustment processing block 1708 receives the image data output from the horizontal calculation processing blocks, and subjects them to adjustment processing to output the image data 1729 subjected to the adjustment processing.

Figure 19:
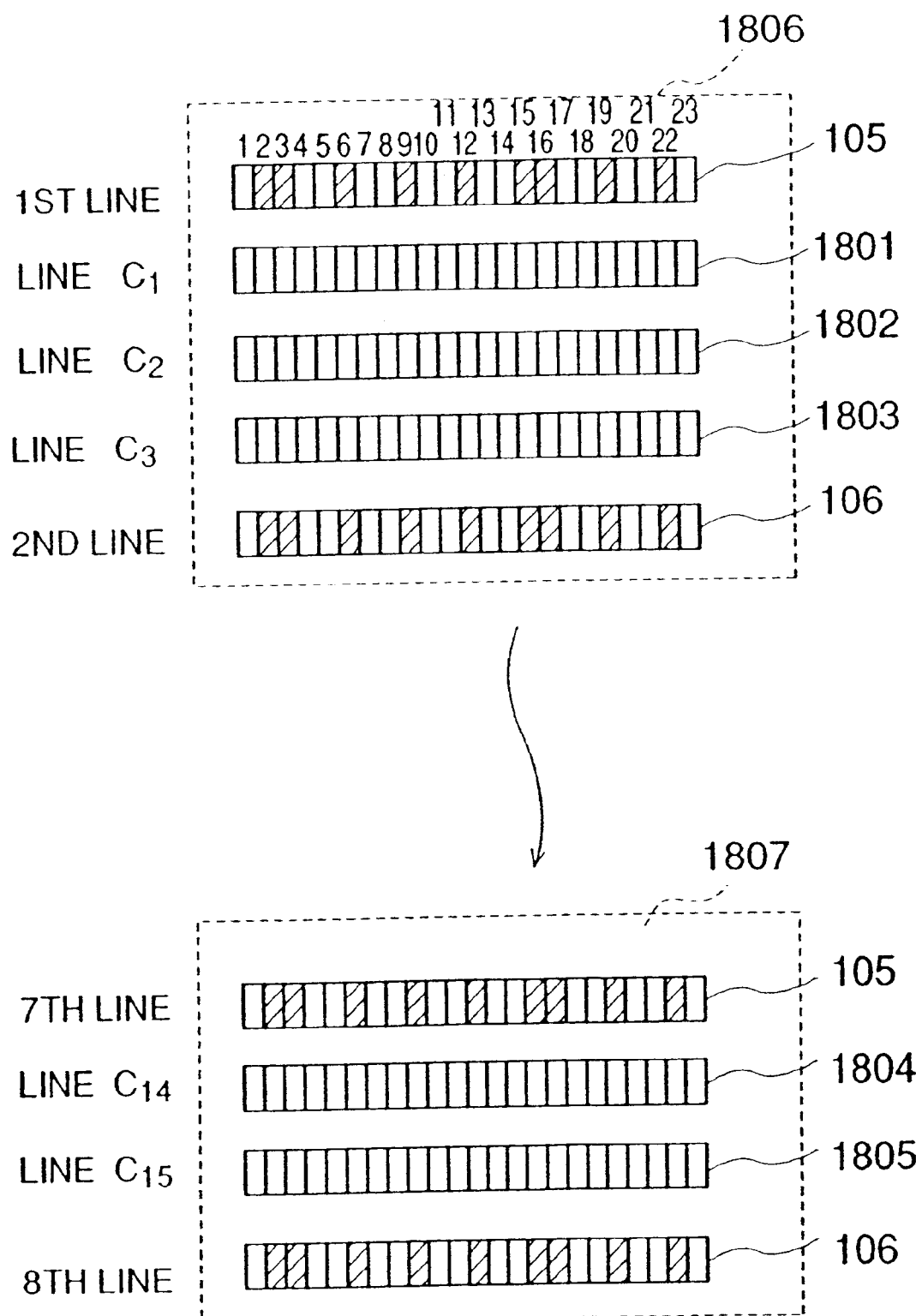
FIG. 19 is an example of image data after image conversion in horizontal and vertical directions.

The processing in the adjustment processing block 1708 will be now explained with reference to FIG. 19. FIG. 19 shows the image data after the resolution conversion in the vertical direction. In FIG. 19, the number of interpolation lines to be generated in the vertical direction N=15.

In FIG. 19, 1806 and 1807 designate the pixels output from the adjustment processing blocks, and 1801 to 1805 designate the interpolation lines generated. The adjustment processing block 1708 receives the image data of five lines after the conversion output from the vertical calculation processing blocks 1401, and thins out some lines if it is useless to output the image data subjected to the adjustment processing. The image data 1729 shown in FIG. 18 consists of the pixel data for (8+n)×(2+m) pixels, wherein n is the number of interpolation pixels in the horizontal direction and m is the number of lines to be interpolated between the first and second lines. In pixel group 1806 shown in FIG. 19, for example, m equals 3, and in pixel group 1807, m equals 2.

As a result of the above mentioned processing, the pixel number is converted in the horizontal and vertical directions.

According to this embodiment, the number of pixels to be interpolated and the positions of interpolation can be determined in advance in accordance with the magnification factor. In addition, a boundary between the light and shade of the image is recognized based upon the difference between the pixel values of the adjacent pixels, which allows the pixel data of the interpolation pixels to be determined.

Furthermore, according to this embodiment, in the conversion of the resolution for increasing the number of pixels of the original image, a very noticeable aliasing mosaic image is prevented, and the images of high quality can be obtained. In addition, it is possible to maintain the high frequency components in the portion of the image such as a boundary portion where light and shade is clearly distinguishable and to obtain images of high quality. Moreover, a high-speed resolution conversion capable of dealing with digital motion pictures is accomplished. Further, even if the hardware structure can be reduced to minimum, an arbitrary resolution conversion of resolution can be accomplished.

As mentioned above, according to the present invention, in the conversion of resolution for converting the original digital image into another digital image of different pixels to display on the display device, images of high quality can be reproduced. Furthermore, it is possible to convert the resolution at high speed and to allow the system to be manufactured at low cost.

Next, a second embodiment of the present invention will be described. As in the above description regarding the first embodiment, the general structure and flow of the process according to the present embodiment will be described first, followed by, the detailed structures and flows.

Similar to the first embodiment, according to the second embodiment, interpolation pixels are generated to increase the number of pixels so that an original image is converted into an enlarged image. During the process, the number of interpolation pixels and positions where the pixels are interpolated are determined in accordance with a magnification factor for each pixel block unit having a predetermined number of pixels, and image data of the pixels to be interpolated in the position where the pixels are to be interpolated are generated in accordance with a predetermined interpolation equation in which a coefficient is determined based on the positions of the pixels in the block and the pixel data. That is, gray scale levels of the interpolation pixels are so determined that, when a gray scale level of a pixel in a pixel block unit is shown in a predetermined function (interpolation equation), the positions of the pixels to be interpolated are placed on the function.

Figure 23:
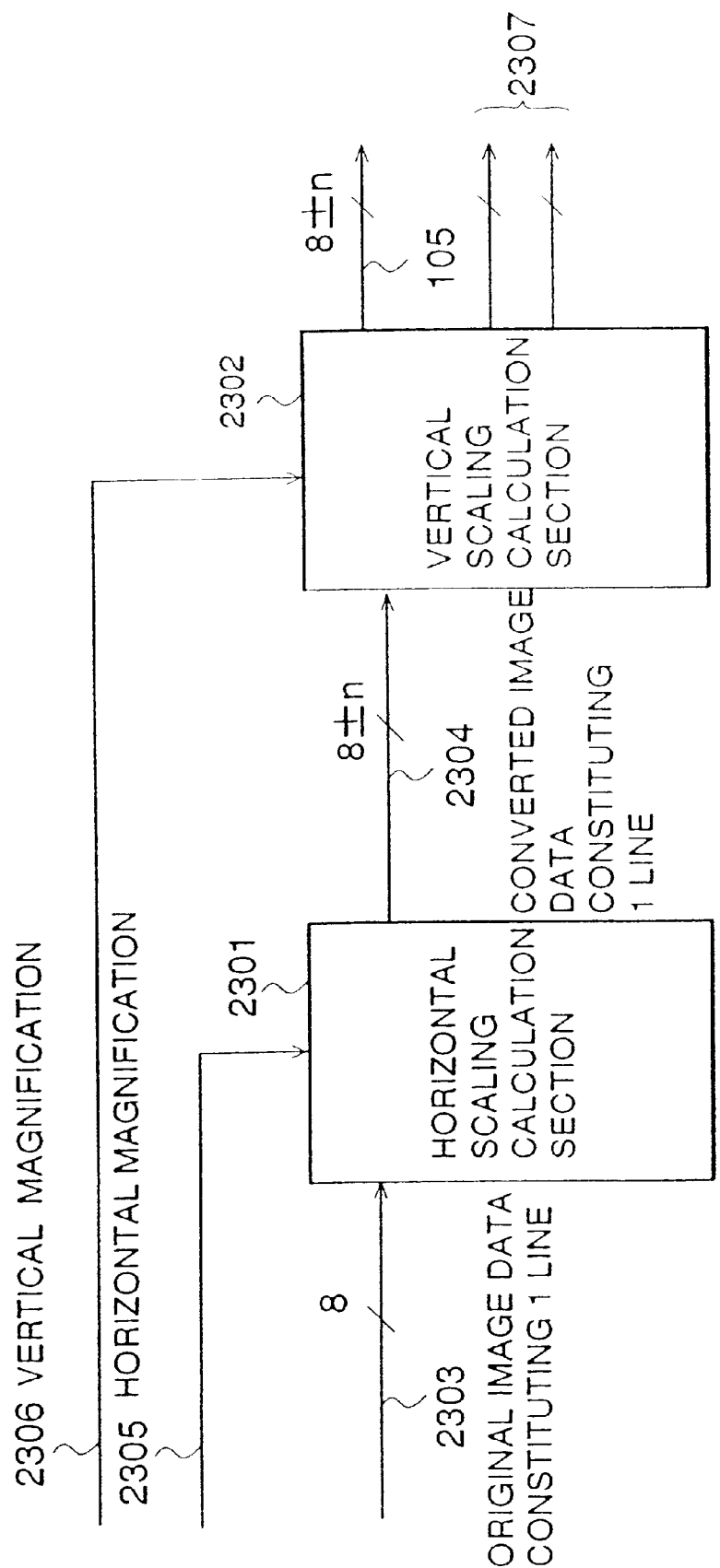
FIG. 23 is a block diagram showing a hardware structure of an apparatus for converting an original digital image into a digital image having a different number of pixels according to the second embodiment of the present invention.
Figure 24:
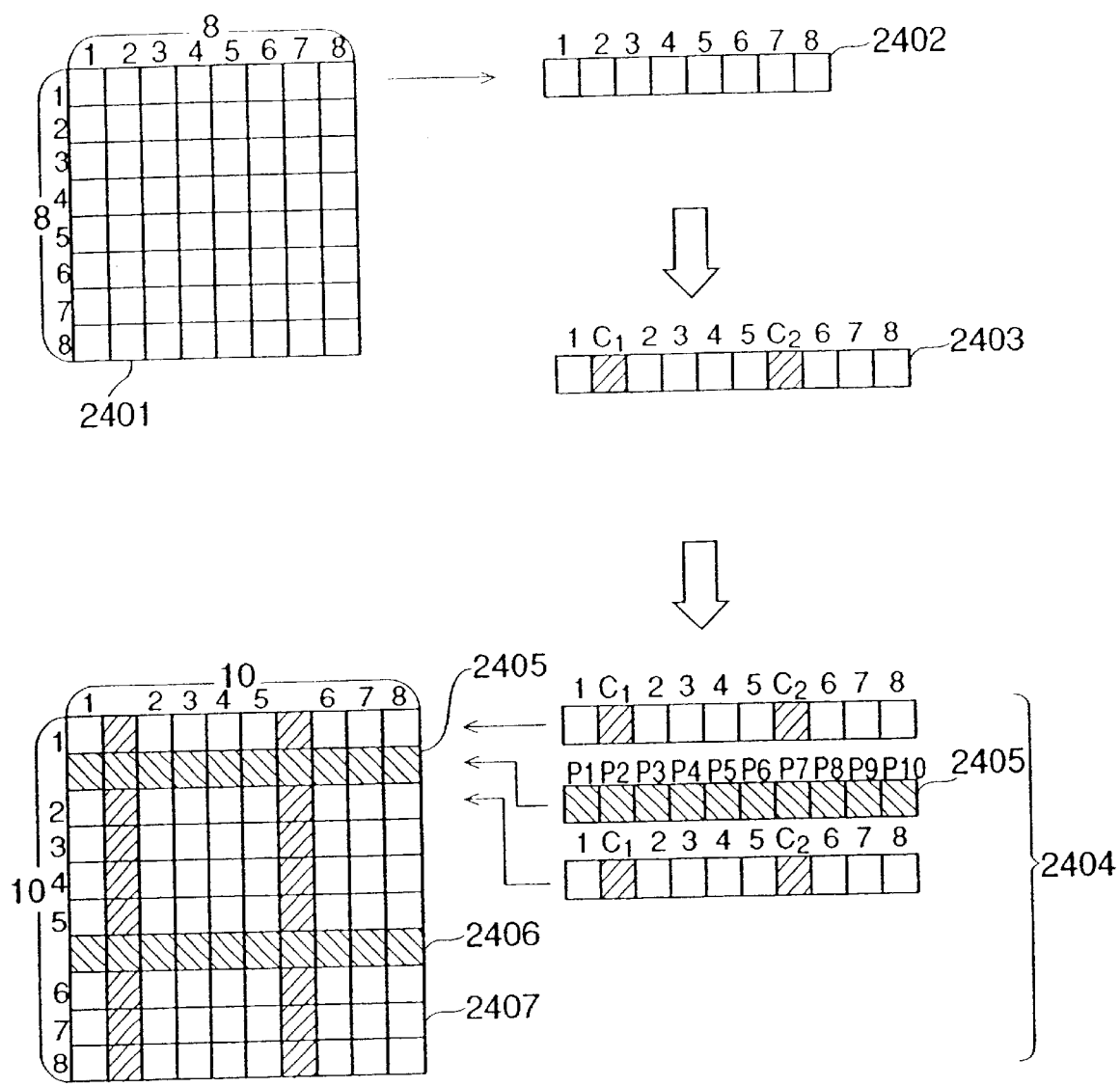
FIG. 24 is an illustration showing conversion of the number of pixels according to the second embodiment.

FIG. 23 is a block diagram showing a hardware structure of a device for converting an original digital image into a digital image having a different number of pixels. FIG. 24 shows a process for converting pixels.

As in the first embodiment, a device according to the second embodiment is not necessarily limited to a structure shown in FIG. 23 and it may be a single element which is large-scale integrated as a micro-computer peripheral device or an element operated by software.

In FIG. 23, a horizontal scaling calculation section 2301 receives original image data and converts the number of pixels in a horizontal direction. The horizontal scaling calculation section 2301 receives the original image data 2303 of 8 pixels constituting one single line in the horizontal direction. The horizontal scaling calculation section 2301 also receives a control signal 2305 indicating a horizontal magnification factor for representing how many pixels are to be added to the pixels of the original image in the horizontal direction. As shown in FIG. 24, the horizontal scaling calculation section 2301 receives original image data 2402 of 8 pixels constituting one single line in the horizontal direction from among original image data in a pixel block unit 2401 of 8×8 pixels so as to convert the number of pixels and output image data 2403 of 8+n pixels constituting one single line. In FIG. 24, among the image data 2403 of 8+n pixels constituting one single line, hatched pixels $C_1$ and $C_2$ are interpolation pixels generated by the horizontal scaling calculation section 2301.

Next, a vertical scaling calculation section 2302 receives image data in which the number of pixels in the horizontal direction is converted, which was obtained by the horizontal scaling calculation section 2301, so as to convert the number of pixels in a vertical direction. The vertical scaling calculation section 2302 receives image data 2304 of 8±n pixels constituting one single line in the horizontal direction, which was outputted from the horizontal scaling calculation section 2301. The vertical scaling calculation section 2302 also receives a control signal 2306 indicating a vertical magnification factor for representing how many pixels are to be added to the pixels of the original image in a vertical direction. As shown in FIG. 24, the vertical scaling calculation section 2302 receives image data of 8 lines, such as the image data 2304 of 8±n pixels constituting one single line in which the number of pixels in the horizontal direction is converted, so as to output image data 2404 in which the number of pixels in the vertical direction is converted, in accordance with the 8-line image data. In the image data 2404 in FIG. 24, hatched pixels P1 to P10 correspond to interpolation pixels generated by the vertical scaling calculation section 2302. The vertical scaling calculation section 2302 generates interpolation lines 2405 and 2406 in accordance with the above-described processes, which makes it possible to convert the original image data 2401 of the pixel block unit having 8×8 pixels into image data 2409 of pixel block unit having 10×10 pixels.

A structure of a system in which a device according to the second embodiment of the present invention is similar to that of the first embodiment shown in FIG. 8. Such a process of resolution conversion of a system according to the second embodiment will now be described with reference to FIG. 25 showing a flowchart indicating the process of resolution conversion according to the present embodiment.

Figure 25:
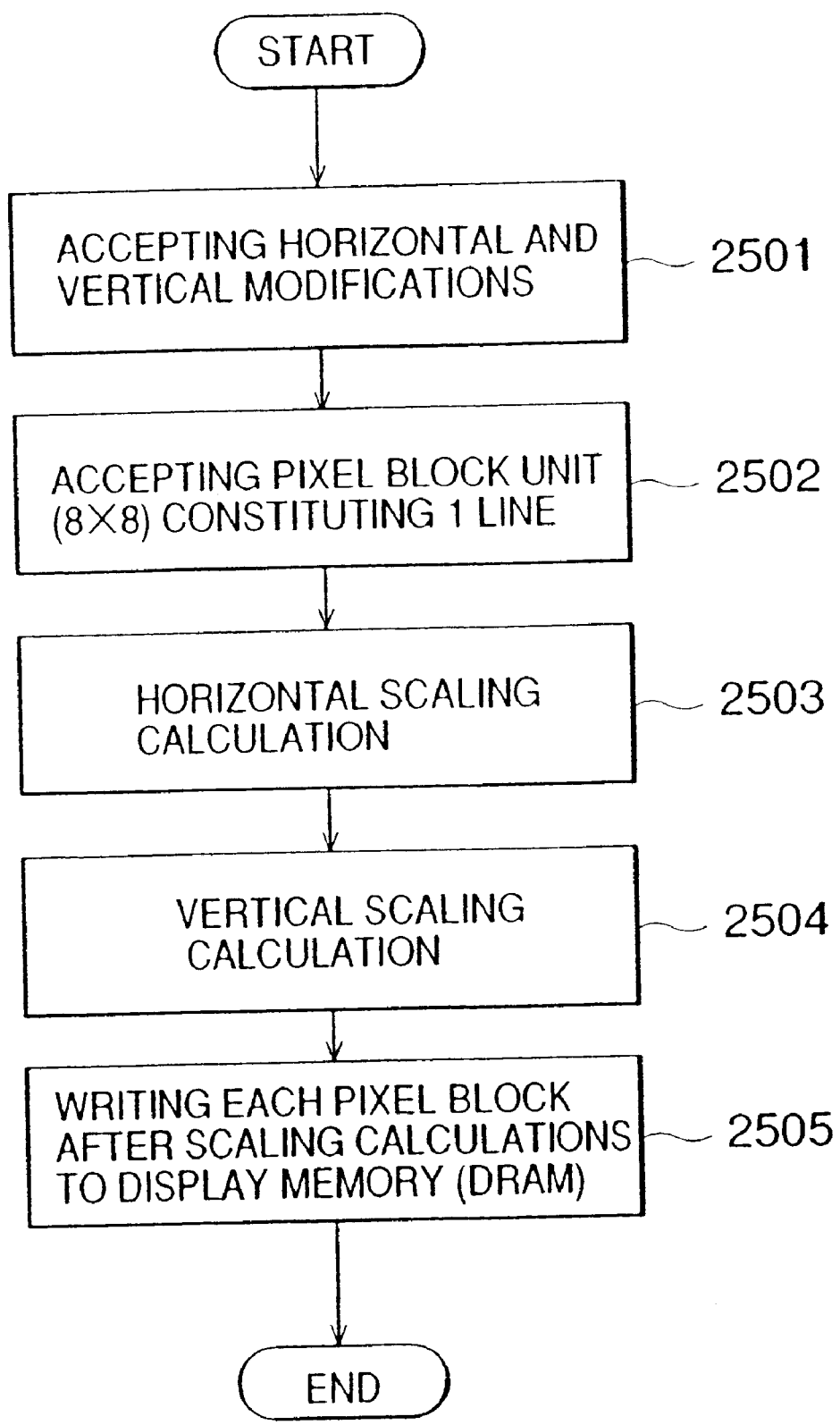
FIG. 25 is a flowchart showing resolution conversion processing according to the second embodiment.

As shown in FIG. 25, an input section 710 shown in FIG. 8 receives a resolution conversion magnification factor for determining how many times the original image should be enlarged in the horizontal direction or in the vertical direction (S 2501). The CPU 701 stores magnification factor data for resolution conversion in a parameter register for setting a parameter of an image processing LSI 704. An image data input section 702 receives image data and divides the image data into pixel block units each having 8×8 pixels so as to store the image data of the divided pixel block units in a buffer memory 703. Next, the image processing LSI 704 receives pixel data of the pixels constituting a line in the horizontal direction in the original image data of the pixel block unit having 8×8 pixels stored in the buffer memory 703 (S 2502). The image processing LSI 704 generates interpolation pixels in the horizontal direction based on the input pixel data constituting a horizontal line so as to perform a scaling calculation for 8 lines in the horizontal direction (S 2503). Next, the image processing LSI 704 generates interpolation pixels in the vertical direction with respect to the pixel data of the pixels constituting the 8 lines on which the scaling calculation in the horizontal direction has been performed and generates interpolation lines one at a time so as to perform the scaling calculation in the vertical direction (S 2504). At last, the pixel block units after the scaling calculations in the horizontal and vertical directions are written in a VRAM 705 being a display memory (S 2505).

In the above-described processes, the number of pixels to be interpolated in accordance with a magnification factor and position where the pixels are interpolated are determined with reference to a horizontal interpolation pixel generation table shown in FIG. 5 and a vertical interpolation pixel generation table shown in FIG. 6, as in the first embodiment. The process in which the positions where the interpolation pixels are generated are determined according to the number of interpolation pixels determined in accordance with the magnification factor in the horizontal direction is also performed as in the first embodiment (See FIG. 7).

Figure 26:
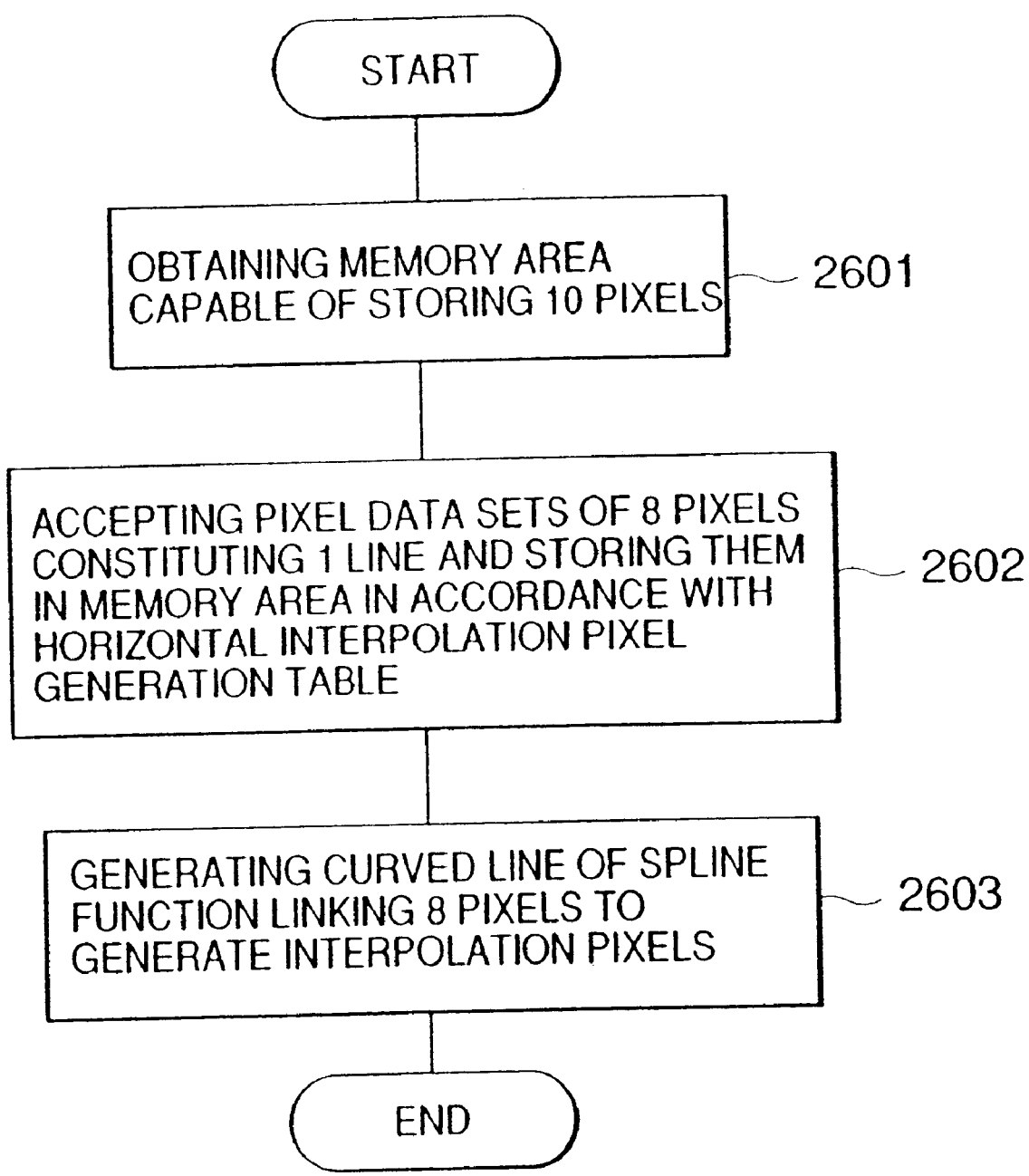
FIG. 26 is a flowchart showing a case where processing for enlarging by 1.25 times in the horizontal direction is performed by a horizontal scaling calculation section.

Next, the scaling calculations in the horizontal and vertical directions will be specifically described. FIG. 26 is a flowchart showing a case where a process of enlarging by 1.25 times in the horizontal direction is performed at the horizontal scaling calculation section 2301. When enlarging by 1.25 times in the horizontal direction, the number of interpolation pixels to be generated n=2, as shown in the horizontal interpolation pixel table of FIG. 5. Accordingly, pixel data of 8 pixels constituting one single line are converted into pixel data of 10 pixels.

In FIG. 26, the horizontal scaling calculation section 2301 maintains a memory area for storing pixel data of 10 pixels corresponding to the number of pixels after conversion (S 2601), receives pixel data for one single line and stores the data in the memory area maintained at S 2601 (S 2602). At that time, in accordance with the horizontal interpolation pixel generation table and the number of interpolation pixels to be generated shown in FIGS. 5 and 7, the pixel data are stored so as to provide open spaces at positions where the interpolation pixels are to be interpolated, that is, between the first pixel and the second pixel and between the fifth pixel and the sixth pixel. Next, a curve according to a spline function based on data values of the pixel data of 8 pixels given at S 2603 is obtained, and interpolation pixels are generated in accordance with values of the spline function, so that the pixel data of the interpolation pixels are stored in the memory area allocated beforehand.

Figure 27:
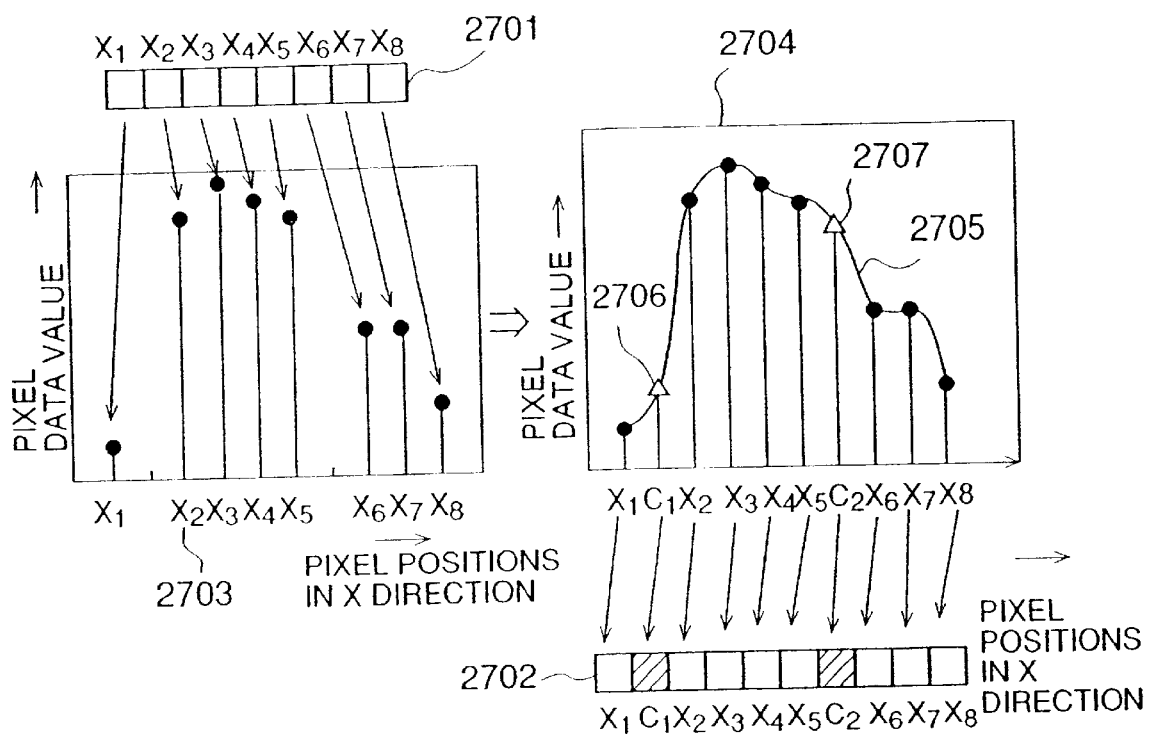
FIG. 27 is an illustration explaining a method for obtaining a curve according to a spline function.

How the curve is generated will be now described with reference to FIG. 27. FIG. 27 is a graph showing positions of pixels after the number of pixels has been converted by the scaling calculation in the horizontal direction and values of pixel data corresponding thereto. In FIG. 27, the horizontal axis represents positions of pixels and the vertical axis represents values of pixel data (luminance).

Figure 36:
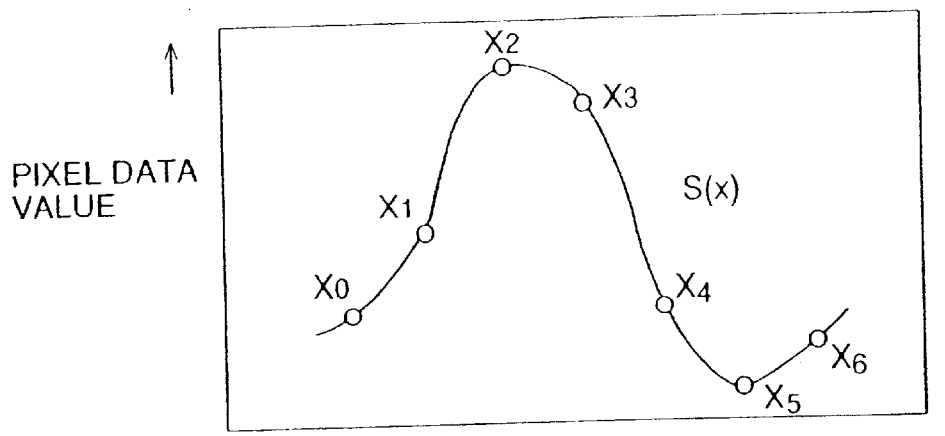
FIG. 36 is a schematic diagram of m-th order spline function.

In FIG. 27, 2701 represents eight pixels before the conversion in the number of pixels, and 2702 represents 10 pixels after the conversion. At S 2602 in FIG. 26, each pixel is placed on the horizontal axis as shown with the number 2703 in FIG. 27, in accordance with the horizontal direction interpolation pixel generation table shown in FIG. 5 and the positions of interpolation pixels shown in FIG. 7. Thereafter, as shown with the number 2704 in FIG. 27, on the basis of the data values of the eight pixels, a curve 2705 according to the spline function is generated. Herein, the spline function is a piecewise polynominal function as shown in FIG. 36, and thus, within small sections, the function is defined with at most m-th order different polynominal curves so that the curves are connected to one another as smoothly as possible.

Values of intersections of the curve 2705 and positions $C_1$ and $C_2$ where the interpolation pixels are generated are data values (luminance) 2706, 2707 of the interpolation pixels. The horizontal scaling calculation section 2301 generates the interpolation pixel data in this way, and finishes the scaling calculation for one single line, so as to output the pixel data 2702 of 10 pixels constituting one single line to the vertical scaling calculation section 2302. In this way, the horizontal scaling calculation section 2301 performs scaling calculations for every single line in order so as to output the obtained pixel data to the vertical scaling calculation section 2302.

Of course, processes other than the process of enlarging by 1.25 times in the horizontal direction can also be similarly performed.

Figure 28:
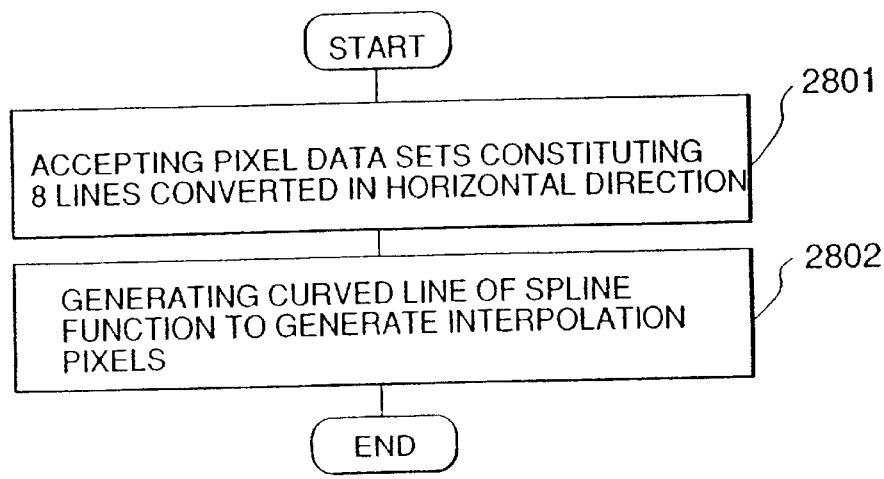
FIG. 28 is an illustration explaining resolution conversion processing in the vertical direction according to the second embodiment.
Figure 29:
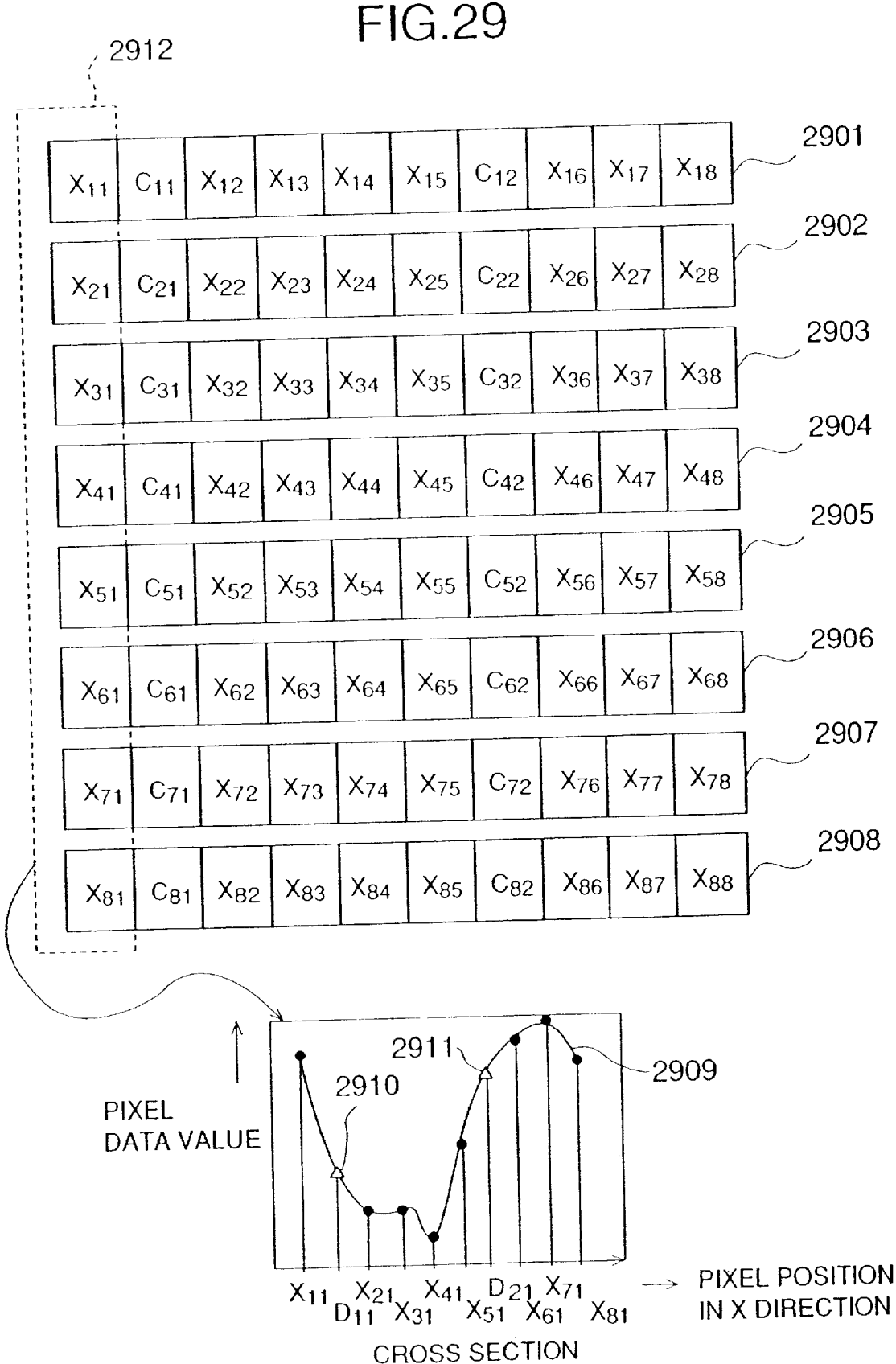
FIG. 29 is an illustration explaining the resolution conversion processing in the vertical direction according to the second embodiment.

Next, resolution conversion processing in the vertical direction will now be described with reference to FIGS. 28 and 29. FIG. 28 is a flowchart showing a case where a process of enlarging by 1.25 times in the vertical direction is performed by the vertical scaling calculation section 2302, and FIG. 29 is a diagram explaining pixel data corresponding to each pixel in a case where the number of pixels is converted by the scaling calculation in the vertical direction. When enlarging by 1.25 times in the vertical direction, the number of lines to be generated n=2, as shown in FIG. 6. Accordingly, in such a case, pixel data corresponding to a pixel group of 8 lines are converted to pixel data corresponding to a pixel group of 10 lines.

In the vertical scaling calculation section 2302, an area capable of storing pixel data of (the number of pixels (8+n) after enlarging in the horizontal direction)×(8 lines) is maintained in its memory. When enlarging by 1.25 times in the vertical direction, since n=2, an area capable of storing pixel data of 10×8=80 pixels is maintained in the memory.

The vertical scaling calculation section 2302 sequentially stores pixel data 2901–2908 of pixels constituting the eight lines whose number of pixels in the horizontal direction is converted, which is given by the horizontal scaling calculation section 2301, in the area in the memory, and starts the scaling calculation in the vertical direction after pixel data of 8 lines are stored.

In FIG. 28, the vertical scaling calculation section 2302 receives pixel data for every line of the 8 lines stored in the memory, for example, pixel data 2912 of a groups of 8 pixels in the first column (S 2801). Next, the vertical scaling calculation section 2302 generates interpolation pixel data for the received column (S 2802).

In FIG. 29, a curve 2909 according to the spline function is obtained, in a similar way to the process in the horizontal scaling calculation section 2301, on the basis of data values of a group of eight pixels, $X_{11}, X_{21}, X_{31}, X_{41}, X_{51}, X_{61}, X_{71}$ and $X_{81}$ included in the first column in the vertical direction. At that time, in accordance with the vertical interpolation pixel generation table shown in FIG. 6, interpolation pixels are generated at positions where interpolation lines are to be inserted, that is, between the first line and the second line ($D_{11}$) and between the fifth line and the sixth line ($D_{21}$). Here, values of intersection points 2910, 2911 of the curve 2909 and $D_{11}$, $D_{21}$, respectively, are the values of interpolation pixel data.

Figure 30:
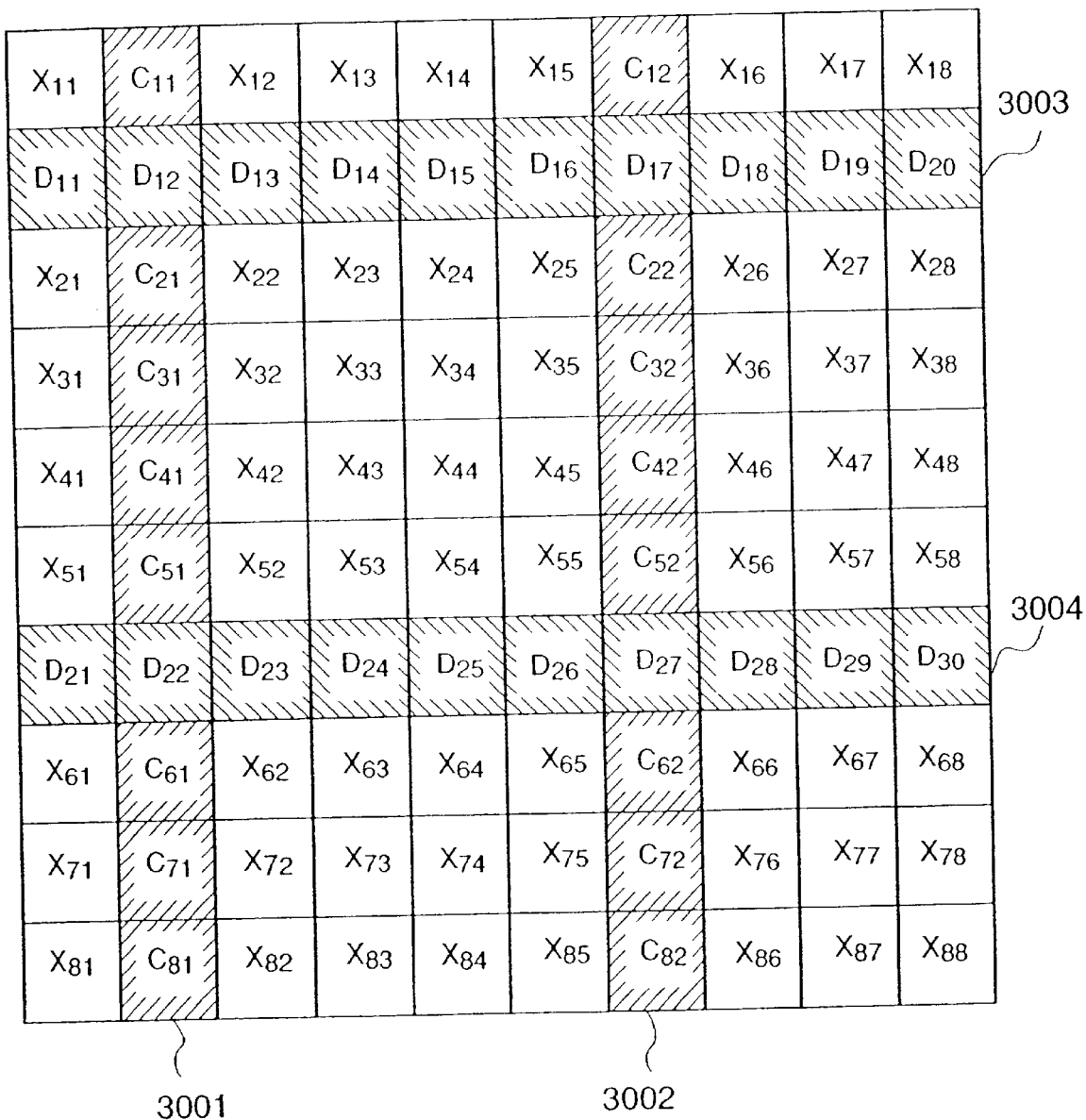
FIG. 30 is a view showing pixels included in a pixel block unit after the number of pixels is converted.

Thereafter, the pixel data of $X_{11}, X_{21}, X_{31}, X_{41}, X_{51}, X_{61}, X_{71}$ and $X_{81}$ and the interpolation pixels $D_{11}, D_{21}$ are directly written into the VRAM. With regard to pixels $C_{11}$–$C_{81}$ which constitute the next column, interpolation pixel data can also be obtained in the same way. Pixels of a pixel block unit after the conversion are shown in FIG. 30. As shown in FIG. 30, a pixel group 3001 comprising $C_{11}$ to $C_{81}$, a pixel group 3002 comprising $C_{12}$ to $C_{82}$, a pixel group 3003 comprising $D_{11}$ to $D_{20}$ and a pixel group 3004 comprising $D_{21}$ to $D_{30}$ are obtained as the interpolation pixels. In this way, the pixel block unit comprising 8×8 of pixels are converted into the pixel block unit comprising 10×10 pixels, and the scaling calculation is finished.

Figure 31:
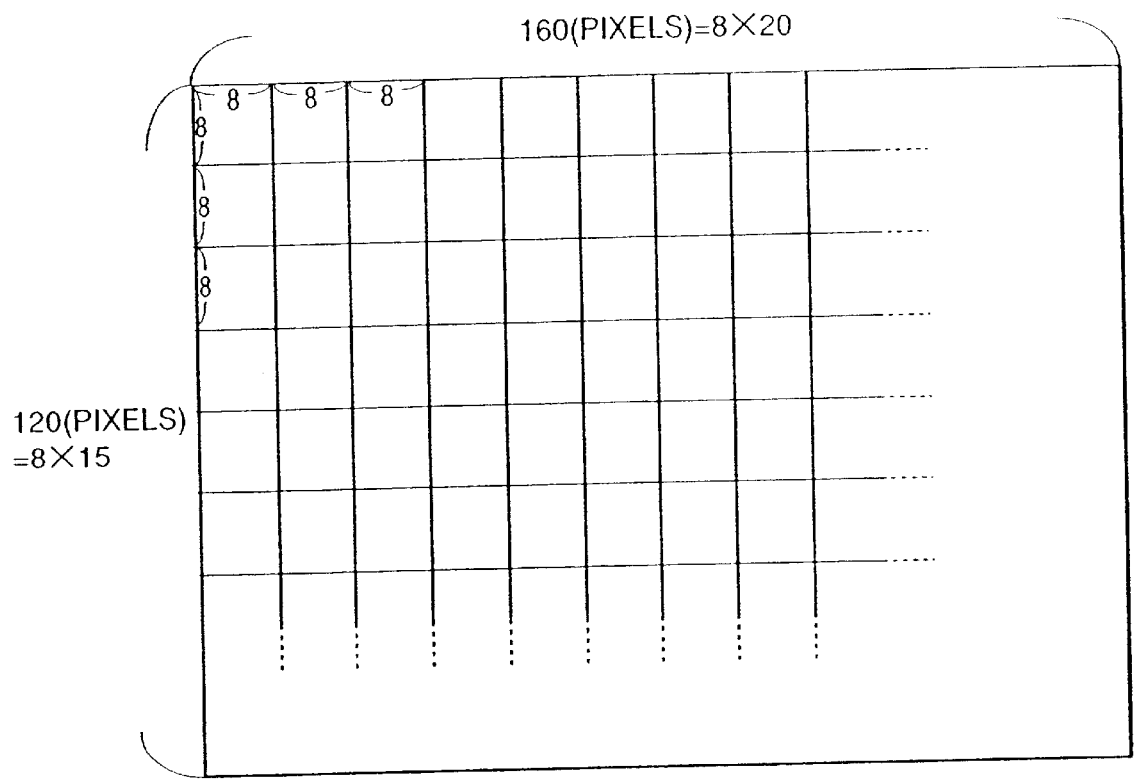
FIG. 31 is an illustration for explaining the number of times of scaling calculation to be repeated according to the second embodiment.

This process is repeated a predetermined number of times in accordance with the resolution of the original image data. For example, if the resolution of an original image data is 160×120 pixels, since 20×15=300 blocks of 8×8 pixel units exist, as shown in FIG. 31, the scaling calculation of 8×8 pixel unit should be repeated 300 times. According to this process, the image having 160×120 pixels is converted into an image having 200×150 pixels.

Figures 38A, 38B, 38C:
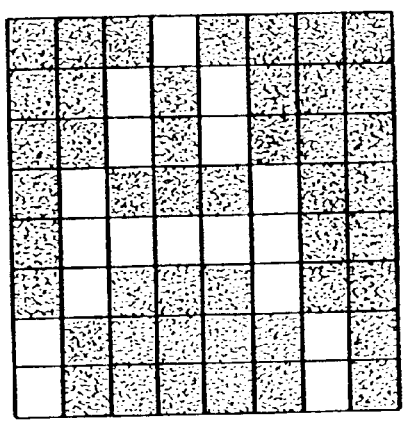
FIGS. 38A–38C are illustrations for explaining an image enlarged according to the second embodiment.

Next, the second embodiment will be more precisely described using a more specific example. FIG. 38A is a diagram showing pixel data of an original image of "A" having 8×8 pixels. Numeral values in the figure correspond to data values of the respective pixels and represent their luminance values. The pixel data are 8-bit data (0–255). An enlarged image in which interpolation pixels are generated in accordance with a conventional linear interpolation method when enlarging an image comprising such pixels by 1.25 times is shown in FIG. 38B, and an enlarged image in which interpolation pixels are generated in accordance with the interpolation method based on the spline function according to the second embodiment is shown in FIG. 38C.

Comparing luminance values of the interpolation pixels after being enlarged, values of the interpolation pixels generated by the interpolation method based on the spline function, which is shown in FIG. 38C, are closer to luminance values of adjacent pixels than those of the interpolation pixels generated by the linear interpolation, which is shown in FIG. 38B, are. Accordingly, it is possible to obtain an image blurred at a contour portion of a letter or the like in the image, even after the enlarging process when generating the interpolation by the interpolation method using the spline function.

According to the second embodiment, it is possible to define the number of pixels to be interpolated and positions where the pixels are to be interpolated in accordance with a magnification factor, in advance. It is also possible to determine interpolation pixels having a data value which is positioned on a curve obtained based on the spline function, in accordance with image data of pixels in the horizontal direction or the vertical direction of a pixel block unit.

Furthermore, according to the second embodiment, in resolution conversion in which the number of pixels of an original image is increased, it is possible to avoid an image in which mosaic-type aliasing is noticeable so as to realize a high-quality image. Furthermore, a high-speed resolution conversion which satisfies digital moving picture processing can be realized. In addition, an arbitrary resolution conversion can be realized with a minimum amount of hardware.

Next, the third embodiment of the present invention will be described. The second embodiment described above is constituted to generate interpolation pixels in the pixels of a pixel block unit. However, in the third embodiment, interpolation pixels are generated at a portion where a pixel block unit is adjacent to another, that is, outside of the pixel block units, so that values of pixel data are not discontinuous even at the above mentioned adjacent portion of the pixel block units.

FIG. 32 is an example of a pattern of positions where the interpolation pixels are generated when enlarging eight pixels three times in the horizontal direction. In FIG. 32, interpolation pixels 3201 to 3208 have data values based on a cubic spline curve 3209 from pixels 3211 to 3218 of an original image. In this case, the interpolation pixel 3208 is generated outside the original pixel 3218.

When the interpolation pixels are obtained by a curve interpolation using the spline function, the cubic spline curve 3209 is generated based on the pixel data of the original pixels 3211 to 3218. Accordingly, it is possible to determine data values of the interpolation pixels 3201 to 3207 which are positioned between the original pixels 3211 to 3218. However, a data value of the interpolation pixel 3208 cannot be obtained without a data value of a next pixel (See a point 3210 in FIG. 32). If a value of pixel data of the pixel 3217 is used as a value of pixel data positioned at the next point 3210, a juncture to a pixel group comprising 8×8 pixels to be processed next may possibly be discontinuous.

Figure 33A:
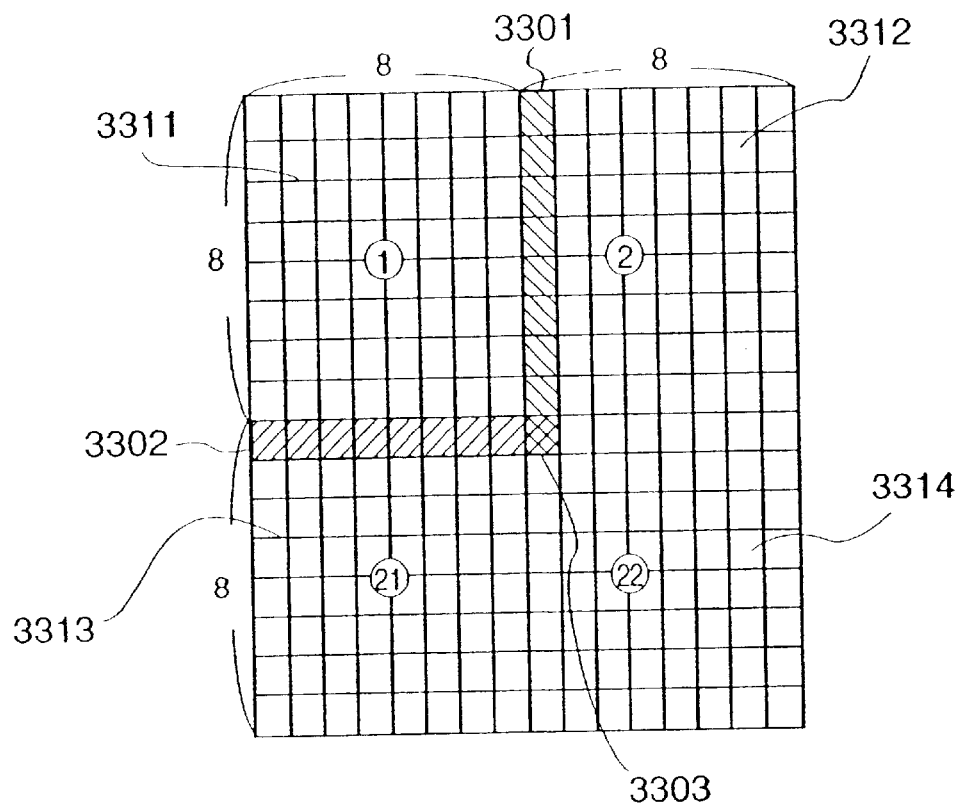
FIGS. 33A and 33B are illustrations for explaining a conversion processing of the number of pixels according to the third embodiment of the present invention.
Figure 33B:
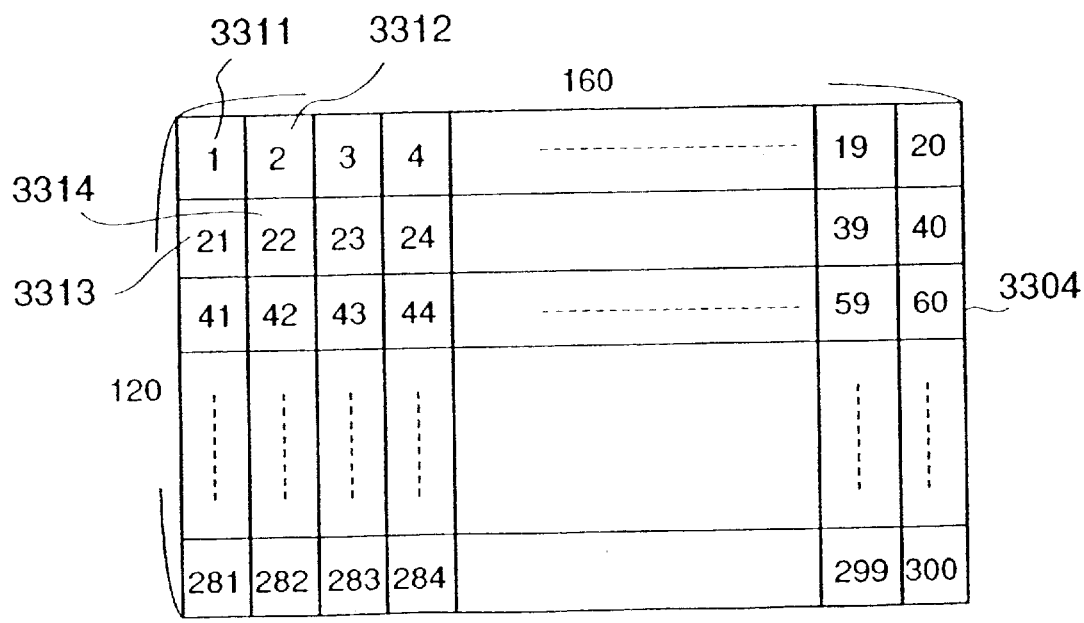

In the third embodiment, the following processing is executed. As shown in FIGS. 33A and 33B, there are 300 pixel block units (See rectangles 1 to 300 in FIG. 33B). In a case of generating interpolation pixels in the horizontal and vertical directions according to the pixel block units, a spline function is obtained based on a first pixel block unit 3311 comprising 8×8 pixels, a column of a pixel group 3301 positioned at the left end of a second pixel block unit 3312 adjacent to the right side of the pixel block unit 3311, a line of a pixel block group 3302 positioned at the top of a 21st pixel block unit 3313 adjacent to the lower side of the pixel block unit 3311 and a pixel 3303 positioned at an upper left end of a 22nd pixel block unit 3314 so that a scaling processing with regard to the first pixel block unit 3311 is carried out by an interpolation using the spline function.

The process will now be described in detail with reference to a flowchart shown in FIG. 34. The flowchart shown in FIG. 34 shows processing orders of a scaling processing for magnifying an image of 160×120 pixels (300 pixel block units) by m×n times, in pixel block units.

Figure 34:
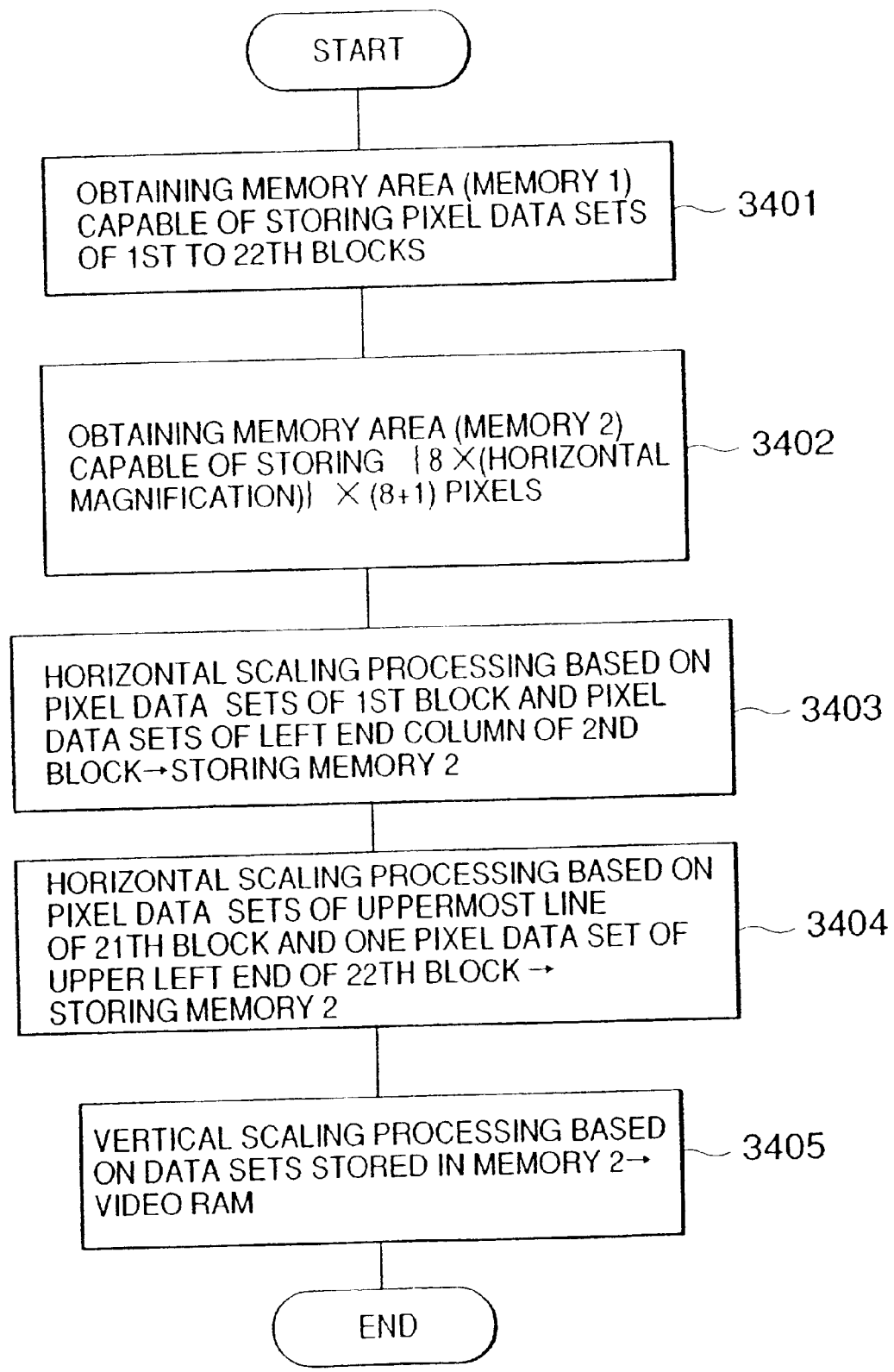
FIG. 34 is a flowchart showing the conversion processing of the number of pixels according to the third embodiment of the present invention.

In FIG. 34, the horizontal scaling calculation section 2301 maintains an area for storing pixel data of the first pixel block unit 3311 comprising 8×8 pixels, the column of the pixel group 3301 positioned at the left end of the second pixel block unit 3312 adjacent to the right side of the pixel block unit 3311, the line of the pixel block group 3302 positioned at the top of the 21st pixel block unit 3313 adjacent to the lower side of the pixel block unit 3311 and the pixel 3303 positioned at the upper left end of the 22nd pixel block unit 3314, as shown in FIG. 33A.

Alternatively, in a case where pixel data for each block unit are sequentially given to the horizontal scaling calculation section 2301, an area (memory 1) for storing pixel data of the first block unit 3311 to the 22nd block unit 3313, that is, pixels of 22 blocks (8×8×22=1408 pixels) may be maintained in a memory (S 3401) so as to store the pixel data. Furthermore, the vertical scaling calculation section 2302 maintains another area (memory 2) for storing pixel data after being converted in the horizontal direction. This area (memory 2) is capable of storing the pixel data of the first to the 20th block units and those of the first line of the 21st block to the 40th block units, that is, pixel data of {8×(magnification factor in the horizontal direction m)}×(8+1). The area (memory 2) is used as a storage area for storing a result of a vertical scaling calculation, in the memory (S 3402).

Then, the horizontal scaling calculation processing section 2301 reads out from the area (memory 1) in the memory the pixel data of the first block unit and those of the left end column of the second block unit. The horizontal scaling calculation processing section 2301 executes the horizontal scaling calculation based on pixel data of nine pixels constituting a line, repeats the above mentioned calculation for each line (eight times), and stores obtained data in another area (memory 2) (S 3403).

Figure 35:
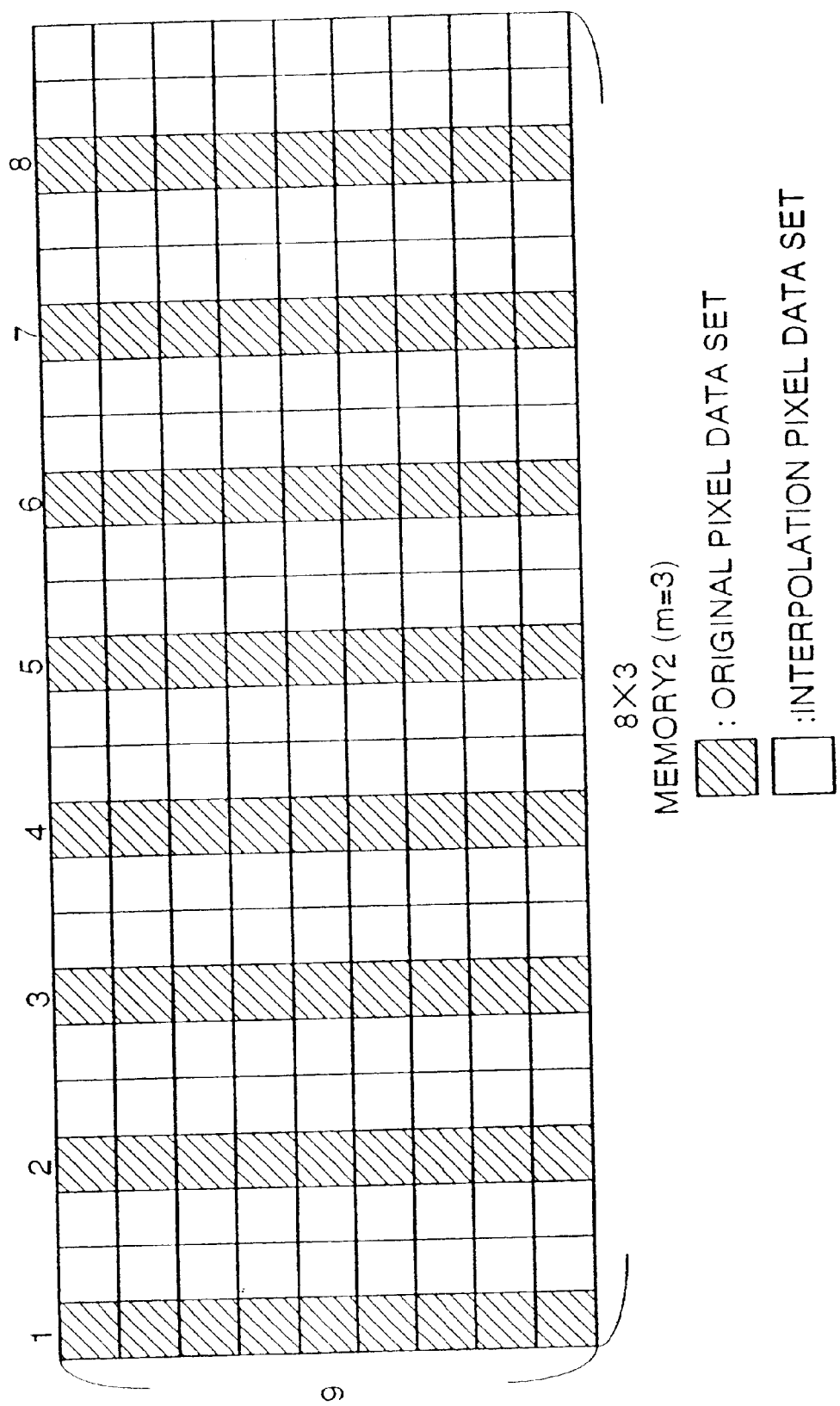
FIG. 35 is a view showing data stored in another area (memory 2) in a memory.

Next, the horizontal scaling calculation section 2301 reads out pixel data of pixels included in an upper end line of the 21st block unit and pixel data of pixels positioned at an upper left end of the 22nd block unit, that is, pixel data of 9 pixels in total, from the predetermined area (memory 1) in the memory. Based on the pixel data of these 9 pixels, the horizontal scaling calculation is performed and a result of the calculation is stored in another area (memory 2) in the memory (S 3404). According to this, as shown in FIG. 35, data for a pixel group of 9 lines which was enlarged by m times in the horizontal direction are stored in another area (memory 2) in the memory. At the time, pixel data of pixels included in the column 3301 in FIG. 33A, at the left end of the second block unit, being the ninth pixel in the original pixel, are not stored in another area (memory 2).

Next, the vertical scaling calculation section 2302 executes the vertical scaling calculation for each column, as in the process for the horizontal direction, based on data representing a result of the horizontal calculation stored in another area (memory 2), so as to write an obtained result in the VRAM shown in FIG. 8 (S 3405). Accordingly, the enlargement process of the first block unit is finished.

After the process of the first block unit is finished, an enlargement process of the second block unit is sequentially executed in the same way. In this way, all processes for all block units are finished.

In addition, in a pixel group 3304 shown in FIG. 33B, the 20th block unit and the 40th block unit, which are positioned at the right end, do not have adjacent blocks on their right side. In this way, there are some cases where pixels which correspond to the pixel group 3301 of the left end column of the second block unit or the pixel 3303 positioned at the upper left end of the 22nd block unit, which was explained in connection with the first block unit in FIG. 33A, do not exist. In such a case, a horizontal scaling process by the interpolation method based on the spline function may be executed by, for example, setting a value of the seventh pixel from the left end of the block unit 20 as a data value of the ninth pixel.

Similarly, in the pixel group 3304 shown in FIG. 33B, with regard to the vertical direction, the 281st block unit to the 300th block unit do not have blocks adjacent to their lower end. In this way, there is a case where the pixel group 3302 included in the upper end line of the 21st block unit, which was explained in connection with the first block unit in FIG. 33A, does not exist. In such a case, the vertical scaling process by the interpolation method based on the spline function may be executed by, for example, setting values of pixel data included in the seventh line from the upper end of the 281st block unit to the 300th block unit as data values of pixels in the ninth line.

According to the third embodiment, it is possible to generate appropriate interpolation pixels at a portion where a pixel block unit is adjacent to another, that is, outside of the pixel block units, so that an image is not discontinuous even at the above mentioned adjacent portion of the pixel block units.

Figure 37:
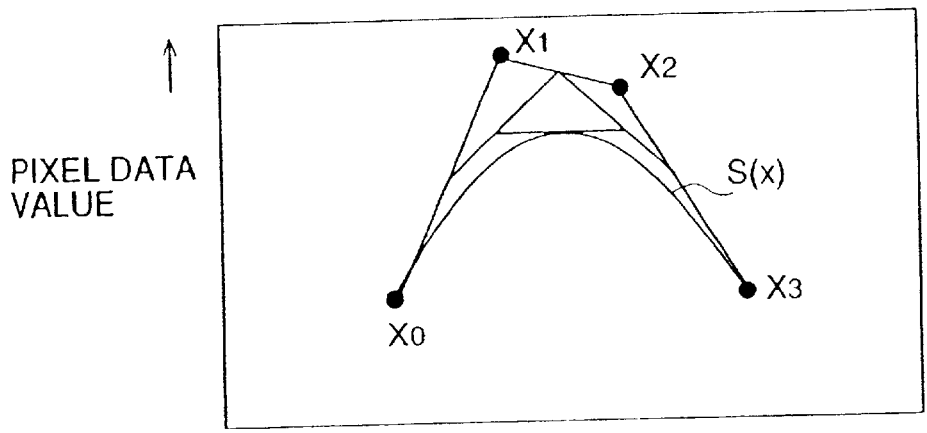
FIG. 37 is a schematic diagram of a cubic Bezier function.

In the second and third embodiments described above, when executing the interpolation method, the interpolation was executed with the spline function as shown in FIG. 36, however, the spline function is not limited to that shown in FIG. 36, but a mixed spline function which is a simplified m-th order spline function or a base spline function may be used. In addition, the interpolation may be executed with a cubic Bezier curve, as shown in FIG. 37, or the interpolation may be executed using other interpolation equations.

According to the present invention, it is possible to reproduce a high quality image in a resolution conversion system and a conversion method which convert an original digital image to a digital image having a different number of pixels and display the resultant image. Furthermore, a high speed and low cost resolution conversion process will be achieved.

What is claimed is:

1. A display device that interpolates inputted original image data and displays converted image data thus interpolated, comprising:

a display unit that displays said converted image data;

an image processing unit that generates an interpolation pixel based on said original image data, inserts said interpolation pixel into said original image data, and generates said converted image data; and a display control unit that outputs said converted image data to said display unit, wherein, said image processing unit determines a gray-scale level of at least one interpolation pixel to be inserted between two pixels of said original image data, said gray-scale level having a value larger than a value on a straight line connecting values of gray-scale level of said two pixels of said original image data.

2. A display device according to claim 1, wherein, when a difference between the values of gray-scale level of said two pixels of said original image data is larger than a threshold value, said gray-scale level of said at least one interpolation pixel has a value larger than said value on the straight line, and when a difference between the values of gray-scale level of said two pixels of said original image data is not larger than said threshold value, said gray-scale level of said at least one interpolation pixel has a value on the straight line.

3. A display device according to claim 1, wherein, said gray-scale level of said at least one interpolation pixel has a value on a spline curve or a cubic Bezier curve that connects the values of gray-scale level of said two pixels of said original image data.

4. A display device according to claim 1, wherein, said converted image data comprises image data that has been converted by enlarging said original image data.

5. A display device according to claim 4, wherein, said image processing unit determines a number of said interpolation pixel to be generated and at least one position where said interpolation pixel is inserted based on an enlargement factor for enlargement conversion.

6. A display device according to claim 5, wherein, said image processing unit determines the number of said interpolation pixel to be generated based on a table defining a relationship between said enlargement factor and the number of said interpolation pixel to be generated.

7. A display device according to claim 1, further comprising a memory that stores said converted image data, wherein, said display control unit reads out said converted image data from said memory and outputs said converted image data thus read out to said display unit.

8. A display device according to claim 1, wherein, said image processing unit includes:

a horizontal direction image processing unit that inserts said interpolation pixel in a line direction of said original image data by a line unit, so as to generate said converted image data by line unit, and a vertical direction image processing unit that inserts said interpolation pixel by a line unit in a vertical direction of said converted image data by a line unit, so as to generate said converted image data.

9. A display device according to claim 1, wherein, a resolution of said display unit is larger than a resolution of said original image data.

10. A display device that interpolates inputted original image data and displays converted image data thus interpolated, comprising:

a display unit that displays said converted image data;

an image processing unit that generates an interpolation pixel based on said original image data, inserts said interpolation pixel into said original image data, and generates said converted image data; and, a display control unit that outputs said converted image data to said display unit, wherein, said image processing unit determines a luminance of at least one interpolation pixel to be inserted between two pixels of said original image data, said luminance having a value larger than a value on a straight line connecting values of luminance of said two pixels of said original image data.

11. A display device that interpolates inputted original image data and displays converted image data thus interpolated, comprising:

a display unit that displays said converted image data;

an image processing unit that generates an interpolation pixel based on said original image data, inserts said interpolation pixel into said original image data, and generates said converted image data; and, a display control unit that outputs said converted image data to said display unit, wherein, said image processing unit determines a gray-scale level of at least one interpolation pixel to be inserted between two pixels of said original image data, said gray-scale level having a value smaller than a value on a straight line connecting values of gray-scale level of said two pixels of said original image data.

12. A display device according to claim 11, wherein, when a difference between the values of gray-scale level of said two pixels of said original image data is larger than a threshold value, said gray-scale level of said at least one interpolation pixel has a value smaller than said values on the straight line, and when a difference between the values of gray-scale level of said two pixels of said original image data is not larger than said threshold value, said gray-scale level of said at least one interpolation pixel has a value on the straight line.

13. A display device according to claim 11, wherein, said gray-scale level of said at least one interpolation pixel has a value on a spline curve or a cubic Bezier curve that connects that values of gray-scale level of said two pixels of said original image data.

14. A display device according to claim 11, wherein, said converted image data comprises image data that has been converted by enlarging said original image data.

15. A display device according to claim 14, wherein, said image processing unit determines a number of said interpolation pixel to be generated and at least one position where said interpolation pixel is inserted based on an enlargement factor for enlargement conversion.

16. A display device according to claim 15, wherein, said image processing unit determines the number of said interpolation pixel to be generated based on a table defining a relationship between said enlargement factor and said interpolation pixel to be generated.

17. A display device according to claim 11, further comprising a memory that stores said converted image data, wherein, said display control unit reads out said converted image data from said memory and outputs said converted image data thus read out to said display unit.

18. A display device according to claim 11, wherein, said image processing unit includes:
a horizontal direction image processing unit that inserts said interpolation pixel in a line direction of said original image data by a line unit, so as to generate said converted image data by line unit, and
a vertical direction image processing unit that inserts said interpolation pixel by a line unit in a vertical direction of said converted image data by a line unit, so as to generate said converted image.

19. A display device according to claim 11, wherein, a resolution of said display unit is larger than the resolution of said original image data.

20. A display device that interpolates inputted original image data and displays converted image data thus interpolated, comprising:

a display unit that displays said converted image data;

an image processing unit that generates an interpolation pixel based on said original image data, inserts said interpolation pixel into said original image data, and generates said converted image data; and a display control unit that outputs said converted image data to said display unit, wherein, said image processing unit determines a luminance of at least one interpolation pixel to be inserted between two pixels of said original image data, said luminance having a value smaller than a value on a straight line connecting values of luminance of said two pixels of said original image data.

21. A display device that interpolates original image data and displays converted image data thus interpolated, the display device comprising:

a display unit that displays said converted image data;

an image processing unit that generates an interpolation pixel based on said original image data, inserts said interpolation pixel into said original image data, and generates said converted image data; and a display control unit that outputs said converted image data to said display unit, wherein, said image processing unit determines, based on two pixels of said original image data, reference values of said interpolation pixel to be inserted between said two pixels of said original image data, and a value of said interpolation pixel is selected so as to be inserted between said two pixels of said original image data, out of said reference values, in accordance with a function, which is set in such a manner that at least one gray-scale value of said interpolation pixel has a value larger than values on a straight line connecting said two pixels of said original image data, in a graph having pixel locations on a horizontal axis and gray-scale values on a vertical axis.

22. The display device according to claim 21, wherein said image processing unit comprises:

a subtractor for calculating a difference between said two pixels of said original image data;

a shifter for multiplying said difference by a predetermined rate;

an adder for adding a value obtained as a result of said multiplying, to one of said two pixels of said original image data, so as to decide reference values of said interpolation pixel; and a selector for selecting a value of said interpolation pixel, so as to be inserted between said two pixels of said original image data, out of said reference values, in accordance with a function, which is set in such a manner that at least one gray-scale value of said interpolation pixel has a value larger than values on a straight line connecting to said two pixels of said original image data, on a graph having pixel locations in a horizontal axis and gray-scale values on a vertical axis.

* * * * *